United States Patent
Mascari et al.

(10) Patent No.: US 10,532,477 B2
(45) Date of Patent: Jan. 14, 2020

(54) POWER OPERATED ROTARY KNIFE

(71) Applicant: Bettcher Industries, Inc., Birmingham, OH (US)

(72) Inventors: Nicholas A. Mascari, Wellington, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 105 days.

(21) Appl. No.: 15/829,080

(22) Filed: Dec. 1, 2017

(65) Prior Publication Data

US 2018/0085957 A1    Mar. 29, 2018

Related U.S. Application Data

(62) Division of application No. 14/873,982, filed on Oct. 2, 2015, now Pat. No. 9,833,919.

(51) Int. Cl.
*B26B 25/00*   (2006.01)
*A22C 17/04*   (2006.01)

(52) U.S. Cl.
CPC ............ *B26B 25/002* (2013.01); *A22C 17/04* (2013.01)

(58) Field of Classification Search
CPC ......... B26B 25/002; B26B 7/00; A22C 17/04; A22C 17/12; A22B 5/165
(Continued)

(56) References Cited

U.S. PATENT DOCUMENTS

| 1,220,345 | A | 3/1917 | Koster |
| 1,374,988 | A | 4/1921 | Cooper |

(Continued)

FOREIGN PATENT DOCUMENTS

| CA | 2796222 | 10/2011 |
| CA | 2883924 | 3/2014 |

(Continued)

OTHER PUBLICATIONS

International Search Report and Written Opinion dated Feb. 16, 2017 for PCT International Application No. PCT/US2016/054485, filed Sep. 29, 2016; PCT International Application No. PCT/US2016/054485 claims priority from and corresponds to the parent application (U.S. Appl. No. 14/873,982, filed Oct. 2, 2015, issued as U.S. Pat. No. 9,833,919, issue date Dec. 5, 2017) of the present application. (12 pages).

(Continued)

*Primary Examiner* — Jason Daniel Prone
(74) *Attorney, Agent, or Firm* — Tarolli, Sundheim, Covell & Tummino LLP

(57) ABSTRACT

A power operated rotary knife including an annular rotary knife blade supported for rotation in a blade housing. The rotary knife blade including a body and a blade section extending from the body. The body section including an outer wall including an upper, middle and lower portions. The upper portion of the outer wall including a bearing race extending radially inwardly into the outer wall. The lower portion of the outer wall including the driven gear. In one embodiment, the intermediate portion includes an annular land having an outer surface defining a radially outermost portion of the outer wall of the body, the outer surface of the annular land being radially outward of the driven gear and the bearing race. In another embodiment, the intermediate portion includes an annular channel having an inner surface being radially inward of first and second ends of the bearing race and the driven gear.

20 Claims, 38 Drawing Sheets

(58) Field of Classification Search
USPC .......................................................... 30/276
See application file for complete search history.

(56) References Cited

U.S. PATENT DOCUMENTS

| | | | |
|---|---|---|---|
| 1,476,345 A | 12/1923 | McGee | |
| 2,266,888 A | 12/1941 | McCurdy et al. | |
| 2,656,012 A | 10/1953 | Thorpe | |
| 2,827,657 A | 3/1958 | Bettcher | |
| 3,024,532 A | 3/1962 | Bettcher | |
| 3,150,409 A | 9/1964 | Wilcox | |
| RE25,947 E | 12/1965 | Bettcher | |
| 3,269,010 A | 8/1966 | Bettcher | |
| 3,349,485 A | 10/1967 | Bettcher | |
| 3,461,557 A | 8/1969 | Behring | |
| 3,512,519 A | 5/1970 | Hall | |
| 3,592,519 A | 7/1971 | Martin | |
| 3,688,403 A | 9/1972 | Bettcher | |
| 3,816,875 A | 6/1974 | Duncan et al. | |
| 3,852,882 A | 12/1974 | Bettcher | |
| 4,082,232 A | 4/1978 | Brewer | |
| 4,170,063 A | 10/1979 | Bettcher | |
| 4,178,683 A | 12/1979 | Bettcher | |
| 4,198,750 A | 4/1980 | Bettcher | |
| 4,236,531 A | 12/1980 | McCullough | |
| 4,267,759 A | 5/1981 | Sullivan et al. | |
| 4,326,361 A | 4/1982 | McGill | |
| 4,336,651 A | 6/1982 | Caro | |
| 4,363,170 A | 12/1982 | McCullough | |
| 4,418,591 A | 12/1983 | Astle | |
| 4,439,924 A | 4/1984 | Bettcher | |
| 4,492,027 A | 1/1985 | Bettcher | |
| 4,494,311 A | 1/1985 | McCullough | |
| 4,509,261 A | 4/1985 | Bettcher | |
| 4,516,323 A | 5/1985 | Bettcher | |
| 4,575,937 A | 3/1986 | McCullough | |
| 4,575,938 A | 3/1986 | McCullough | |
| 4,590,576 A | 5/1986 | Elpiner | |
| 4,590,676 A | 5/1986 | Bettcher | |
| 4,609,227 A | 9/1986 | Wild et al. | |
| 4,637,140 A | 1/1987 | Bettcher | |
| 4,829,860 A | 5/1989 | VanderPol | |
| 4,854,046 A | 8/1989 | Decker | |
| 4,858,321 A | 8/1989 | McCullough | |
| 4,865,473 A | 9/1989 | De Vito | |
| 4,909,640 A | 3/1990 | Nakanishi | |
| 4,942,665 A | 7/1990 | McCullough | |
| 5,031,323 A | 7/1991 | Honsa et al. | |
| 5,033,876 A | 7/1991 | Kraus | |
| 5,071,264 A | 12/1991 | Franke et al. | |
| 5,099,721 A | 3/1992 | Decker et al. | |
| 5,230,154 A | 7/1993 | Decker et al. | |
| 5,331,877 A | 7/1994 | Ishii | |
| 5,419,619 A | 5/1995 | Lew | |
| 5,499,492 A | 3/1996 | Jameson | |
| 5,522,142 A | 6/1996 | Whited | |
| 5,529,532 A | 6/1996 | Desrosiers | |
| 5,582,041 A | 12/1996 | Spiess | |
| 5,664,332 A | 9/1997 | Whited | |
| 5,692,307 A | 12/1997 | Whited | |
| 5,749,661 A | 5/1998 | Moller | |
| 5,761,817 A | 6/1998 | Whited | |
| 5,940,972 A | 8/1999 | Baris | |
| 5,971,413 A | 10/1999 | El-Kassouf | |
| 6,247,847 B1 | 6/2001 | Lob | |
| 6,354,949 B1 | 3/2002 | Baris et al. | |
| 6,364,086 B1 | 4/2002 | Blaurock et al. | |
| 6,604,288 B2 | 8/2003 | Whited et al. | |
| 6,615,494 B2 | 9/2003 | Long et al. | |
| 6,655,033 B2 | 12/2003 | Hermann et al. | |
| 6,662,452 B2 | 12/2003 | Whited | |
| 6,665,940 B2 | 12/2003 | Sanders et al. | |
| 6,694,649 B2 | 2/2004 | Whited et al. | |
| 6,751,872 B1 | 6/2004 | Whited et al. | |
| 6,769,184 B1 | 8/2004 | Whited | |
| 6,857,191 B2 | 2/2005 | Whited et al. | |
| 6,938,348 B2 | 9/2005 | Roncaglia | |
| 6,978,548 B2 | 12/2005 | Whited et al. | |
| 7,000,325 B2 | 2/2006 | Whited | |
| 7,107,887 B2 | 9/2006 | Whited | |
| 7,207,114 B2 | 4/2007 | Rosu et al. | |
| 7,340,840 B2 | 3/2008 | Whited | |
| 8,074,363 B2 | 12/2011 | Whited | |
| 8,448,340 B2 | 5/2013 | Whited | |
| 8,505,207 B2 | 8/2013 | Thien | |
| 8,661,692 B2 | 3/2014 | Whited | |
| 8,671,580 B2 | 3/2014 | Whited | |
| 8,695,222 B2 | 4/2014 | Whited | |
| 8,726,524 B2 | 5/2014 | Whited et al. | |
| 8,739,416 B2 | 6/2014 | Mascari | |
| 8,745,881 B2 | 6/2014 | Thompson | |
| 8,806,761 B2 | 8/2014 | Whited | |
| 8,950,076 B2 | 2/2015 | Whited | |
| 8,968,107 B2 | 3/2015 | Rapp | |
| 9,089,980 B2 | 7/2015 | Whited | |
| 9,121,438 B2 | 9/2015 | Mascari | |
| 9,186,171 B2 | 11/2015 | Esarey | |
| 9,211,650 B2 | 12/2015 | Mascari | |
| 9,221,183 B2 | 12/2015 | Whited | |
| 9,227,332 B2 | 1/2016 | Thompson | |
| 9,265,263 B2 | 2/2016 | Whited | |
| 9,364,962 B2 | 6/2016 | Whited | |
| 9,475,203 B2 | 10/2016 | Whited et al. | |
| 9,522,473 B2 | 12/2016 | Mascari | |
| 9,573,283 B2 | 2/2017 | Thompson | |
| 9,592,076 B2 | 3/2017 | Esarey | |
| 9,623,577 B2 | 4/2017 | Whited | |
| 9,833,919 B2 * | 12/2017 | Mascari | B26B 25/002 |
| 10,040,211 B2 * | 8/2018 | Whited | B26B 25/002 |
| 2003/0070301 A1 | 4/2003 | Hermann | |
| 2003/0084576 A1 | 5/2003 | Whited | |
| 2003/0131482 A1 | 7/2003 | Long | |
| 2003/0196333 A1 | 10/2003 | Whited | |
| 2004/0134326 A1 | 7/2004 | Long | |
| 2005/0126015 A1 | 6/2005 | Whited | |
| 2005/0217119 A1 | 10/2005 | Rapp | |
| 2006/0037200 A1 | 2/2006 | Rosu et al. | |
| 2006/0137193 A1 | 6/2006 | Whited | |
| 2006/0211966 A1 | 9/2006 | Hatton | |
| 2007/0283574 A1 | 12/2007 | Levsen | |
| 2008/0022537 A1 | 1/2008 | Clarke et al. | |
| 2008/0098605 A1 | 5/2008 | Whited et al. | |
| 2009/0227192 A1 | 9/2009 | Luthi et al. | |
| 2010/0101097 A1 | 4/2010 | Thien | |
| 2010/0170097 A1 | 7/2010 | Levsen | |
| 2011/0185580 A1 | 8/2011 | Whited | |
| 2011/0247220 A1 | 10/2011 | Whited | |
| 2012/0011980 A1 | 1/2012 | Kroger | |
| 2012/0030952 A1 | 2/2012 | Levsen | |
| 2013/0025134 A1 | 1/2013 | Mascari | |
| 2013/0025136 A1 | 1/2013 | Whited | |
| 2013/0025137 A1 | 1/2013 | Whited | |
| 2013/0025138 A1 | 1/2013 | Whited | |
| 2013/0025139 A1 | 1/2013 | Whited | |
| 2013/0185944 A1 | 7/2013 | Thompson et al. | |
| 2013/0243358 A1 | 9/2013 | Stork | |
| 2014/0074120 A1 | 2/2014 | Esarey | |
| 2016/0082612 A1 | 3/2016 | Mascari | |
| 2016/0106451 A1 | 4/2016 | Esarey | |
| 2016/0279818 A1 | 9/2016 | Whited | |
| 2016/0345996 A1 | 12/2016 | Esarey | |
| 2018/0333880 A1 * | 11/2018 | Whited | B26B 25/002 |
| 2018/0345514 A1 * | 12/2018 | Whited | B26B 25/002 |

FOREIGN PATENT DOCUMENTS

| | | |
|---|---|---|
| DE | 19958802 | 7/2001 |
| EP | 0689905 | 1/1996 |
| EP | 0816026 | 1/1998 |
| EP | 1226907 | 7/2002 |
| EP | 1356902 | 10/2003 |
| EP | 1403012 | 8/2004 |
| EP | 1527853 | 5/2005 |
| EP | 1527854 | 5/2005 |

(56) References Cited

FOREIGN PATENT DOCUMENTS

| | | |
|---|---|---|
| EP | 1916075 | 4/2008 |
| EP | 2353805 | 8/2011 |
| EP | 2497366 | 9/2012 |
| EP | 2557935 | 6/2016 |
| EP | 2736684 | 1/2017 |
| FR | 1216947 | 4/1960 |
| JP | 2000052293 | 2/2000 |
| WO | WO 01/41980 | 6/2001 |
| WO | WO 0124977 | 12/2001 |
| WO | WO 2008/107490 | 9/2008 |
| WO | WO 2011/130057 | 10/2011 |
| WO | WO 2013/016019 | 1/2013 |
| WO | WO 2013/016020 | 1/2013 |
| WO | WO 2013/016021 | 1/2013 |
| WO | WO 2013/016022 | 1/2013 |
| WO | WO 2013/016024 | 1/2013 |
| WO | WO 2013/016344 | 1/2013 |
| WO | WO 2014/039601 | 3/2014 |
| WO | WO 2014/039609 | 3/2014 |
| WO | WO 2014/159349 | 10/2014 |
| WO | WO 2014/160043 | 10/2014 |

OTHER PUBLICATIONS

Oct. 3, 2011 Decision and Opinion of the United States Court of Appeals for the Federal Circuit (Appeal No. 2011-1038, -1046) regarding the case styled *Bettcher Industries, Inc.* v. *Bunzi USA, Inc. and Bunzl Processor Distribution, LLC*, Case No. 3:08 CV 2423, U.S. District Court for the Northern District of Ohio, Judge Zouhary. The Decision and Opinion relates to U.S. Pat. No. 7,000,325, owned by the assignee of the present application. (47 pages).

\* cited by examiner

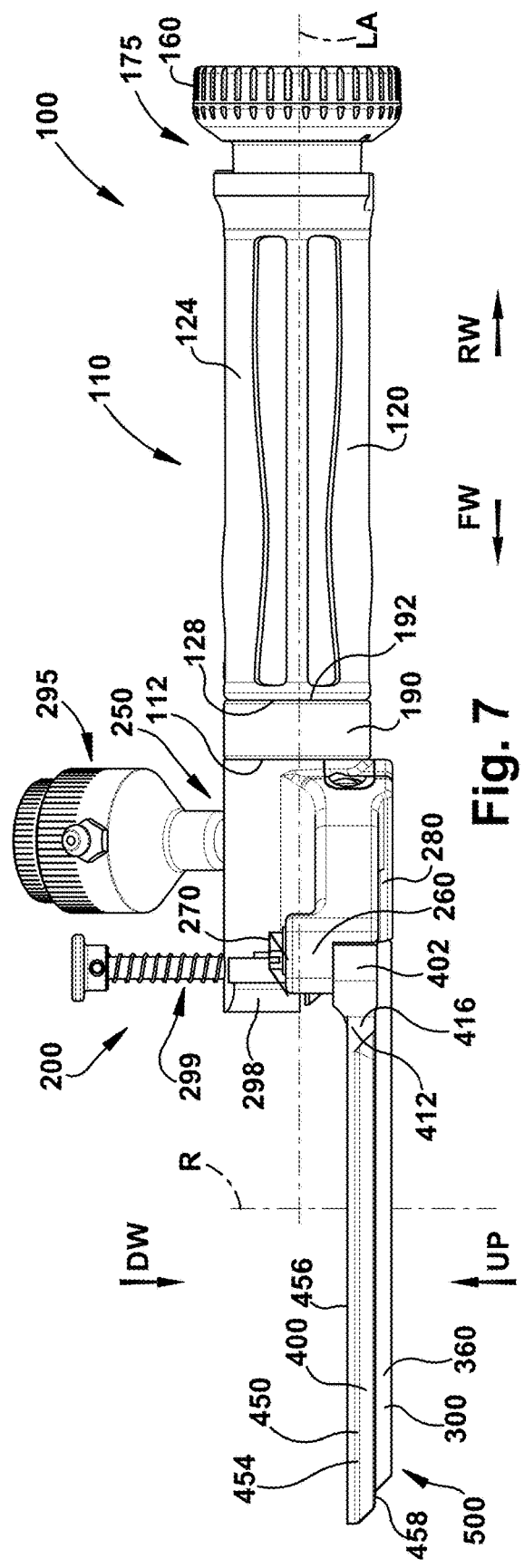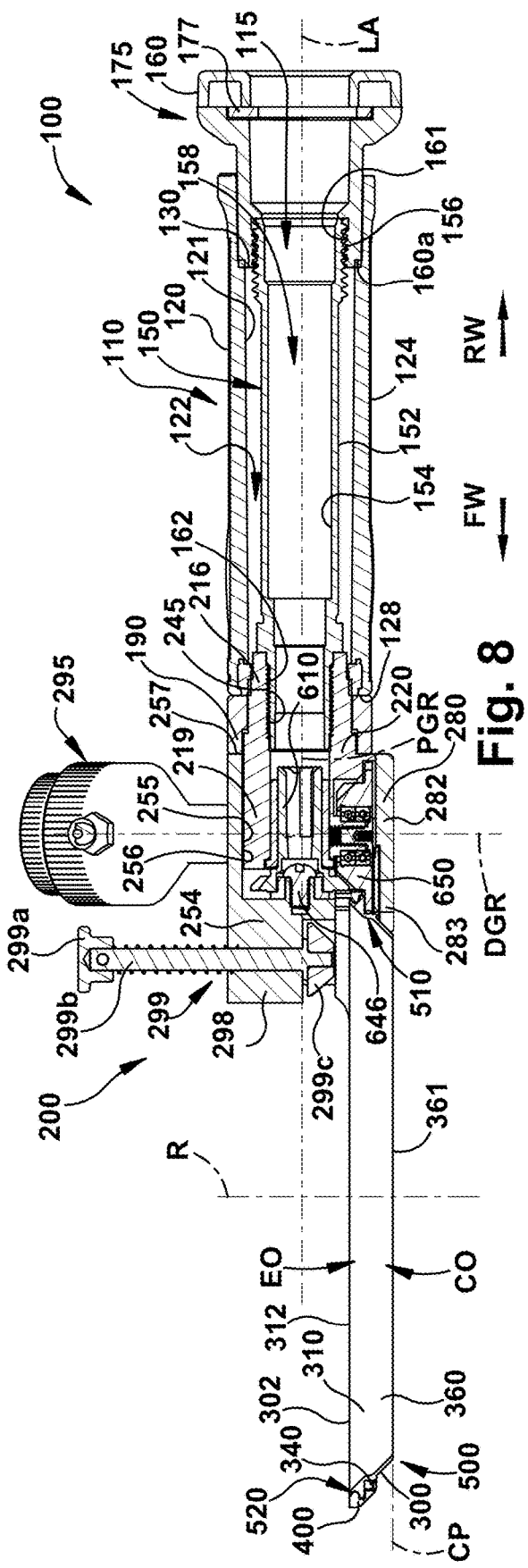

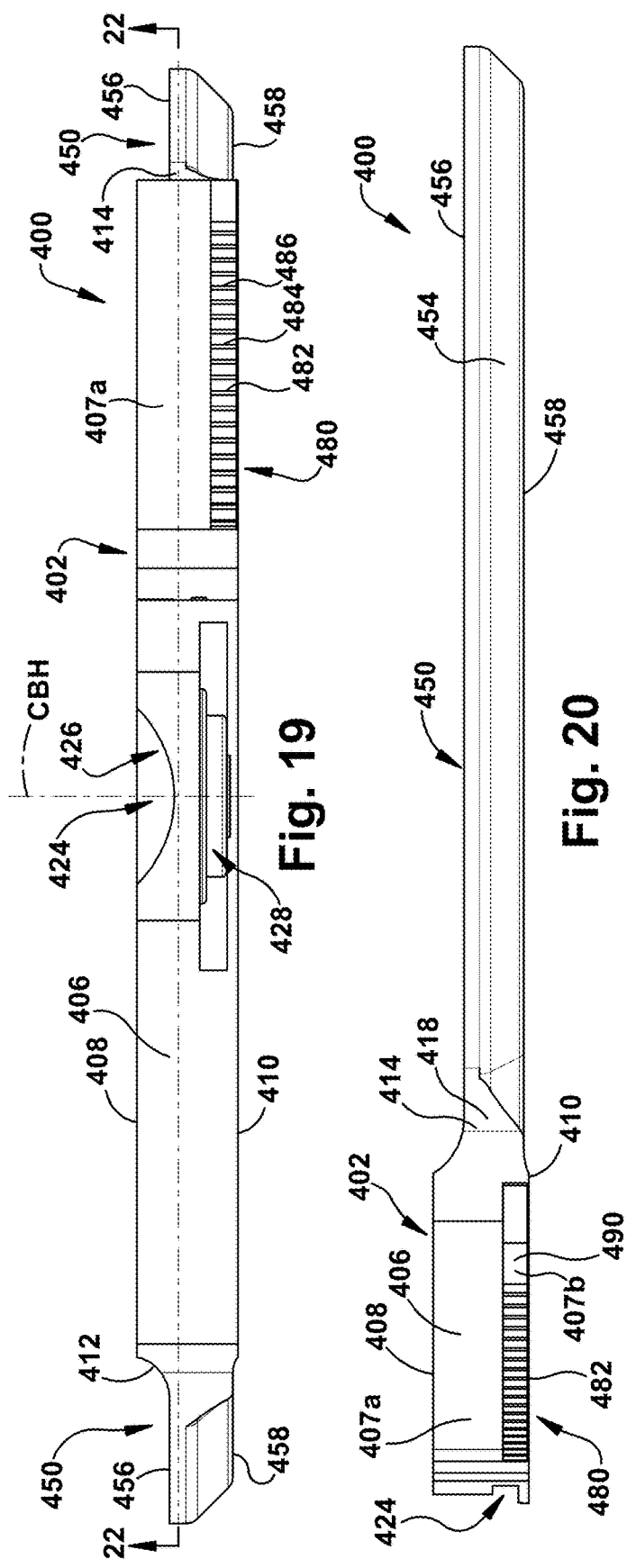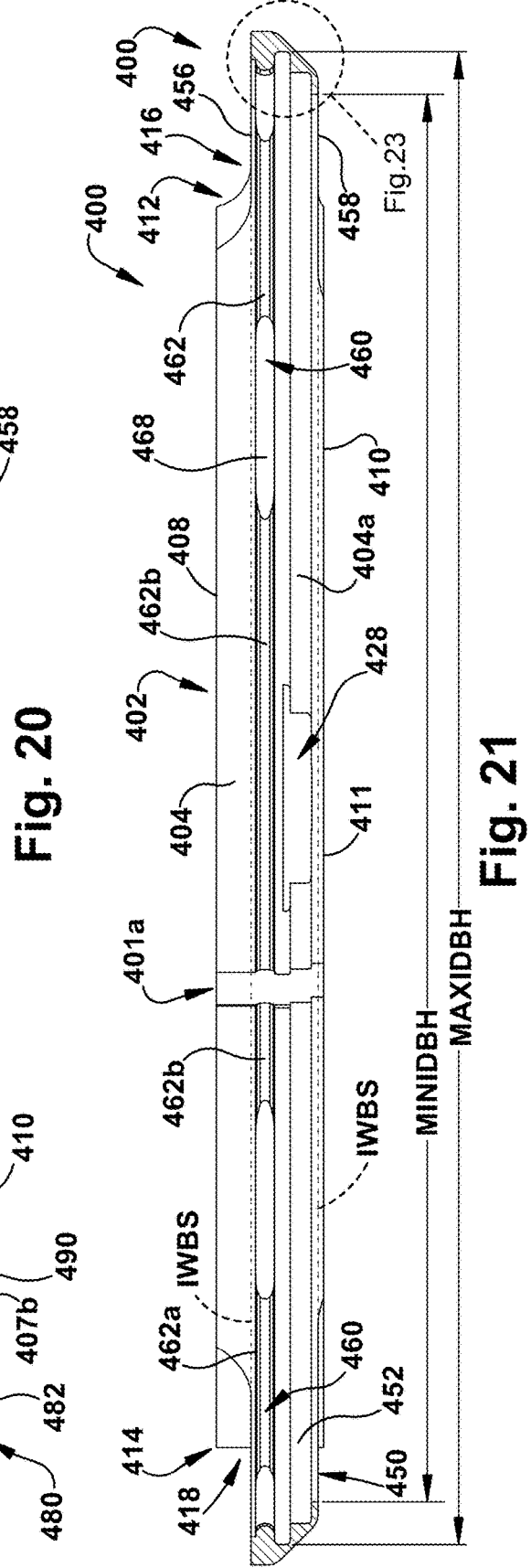

POWER OPERATED ROTARY KNIFE

CROSS-REFERENCE TO RELATED APPLICATIONS

This application claims priority to and is a divisional application under 35 USC 121 of U.S. application Ser. No. 14/873,982, filed Oct. 2, 2015, published under U.S. Publication No. US-2017-0095938-A1 on Apr. 6, 2017, issuing as U.S. Pat. No. 9,833,919 on Dec. 5, 2017. The respective entire contents of the above-identified U.S. application Ser. No. 14/873,982 and U.S. Publication No. US-2017-0095938-A1 are incorporated herein in their respective entireties by reference for any and all purposes.

TECHNICAL FIELD

The present disclosure relates to a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as tissue harvesting or recovery, debriding/removal of skin tissue, bone tissue, tendon/ligament harvesting from human or animal tissue donors for medical purposes. Power operated rotary knives may also be used for taxidermy and for cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by a pneumatic or electric motor. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., U.S. Pat. No. 8,448,340 to Whited, and U.S. Pat. No. 8,726,524 to Whited et al., all of which are assigned to the assignee of the present invention and all of which are incorporated herein in their respective entireties by reference.

SUMMARY

In one aspect, the present disclosure relates an annular rotary knife blade for rotation about a central axis of rotation in a power operated rotary knife, the rotary knife blade comprising: a body and a blade section extending axially from the body, the body including an upper end and a lower end spaced axially apart and an inner wall and an outer wall spaced radially apart, the outer wall of the body including an upper portion adjacent the upper end of the body, a lower portion adjacent a lower end of the body, and a middle portion disposed between the upper and lower ends of the body, the body and the blade section being radially centered about the central axis of rotation; the blade section extending from the lower end of the body; the upper portion of the outer wall of the body including an annular bearing race, the middle portion of the outer wall of the body including an annular land axially below the annular bearing race, and the lower portion of the outer wall of the body including an annular driven gear axially below the annular land; the annular bearing race extending radially into the outer wall of the body including a first bearing surface and an axially spaced apart second bearing surface, the first bearing surface and the second bearing surface converging radially inwardly toward a central surface bridging the first and second bearing surfaces, the central surface including a radially innermost region of the annular bearing race; the annular driven gear including set of gear teeth formed in the outer wall of the body for rotatably driving the annular rotary knife blade about the central axis of rotation, the annular driven gear including an inner surface and a radially spaced apart outer surface, the outer surface defining a radially outermost region of the annular driven gear, and the annular land including a radially outer surface defining a radially outermost portion of the outer wall of the body, the radially outer surface of the annular land being radially outward of the outer surface of the annular driven gear and radially outward of the bearing race.

In another aspect, the present disclosure relates to an annular rotary knife blade for rotation about a central axis of rotation in a power operated rotary knife, the rotary knife blade comprising: a body and a blade section extending axially from the body, the body including an upper end and a lower end spaced axially apart and an inner wall and an outer wall spaced radially apart, the outer wall of the body including an upper portion adjacent the upper end of the body, a lower portion adjacent a lower end of the body, and a middle portion disposed between the upper and lower ends of the body, the body and the blade section being radially centered about the central axis of rotation; the blade section extending from the lower end of the body; the upper portion of the outer wall of the body including an annular bearing race, the middle portion of the outer wall of the body including an annular channel spaced axially below the annular bearing race, and the lower portion of the outer wall of the body including an annular driven gear axially below the annular land; a section of the upper portion of the outer wall of the body extending axially above and axially below the annular bearing race including a cylindrical section, the annular bearing race extending radially into the cylindrical section of the upper portion of the outer wall of the body, an upper end of the annular bearing race terminating at the cylindrical section of the upper portion of the outer wall and a lower end of the annular bearing race terminating at the cylindrical section of the upper portion of the outer wall, the annular bearing race including a first bearing surface and an axially spaced apart second bearing surface, the first bearing surface and the second bearing surface converging radially inwardly toward a central surface bridging the first and second bearing surfaces, the central surface defining a radially innermost region of the annular bearing race, the first bearing surface extending between the upper end of the annular bearing race and the central surface and the second bearing surface extending between the lower end of the annular bearing race and the central surface; the annular driven gear including set of gear teeth formed in the outer wall of the body for rotatably driving the annular rotary knife blade about the central axis of rotation, the annular driven gear including an inner surface and a radially spaced apart outer surface, the inner surface defining a radially innermost region of the annular drive gear and the outer surface defining a radially outermost region of the annular driven gear, the inner surface of the annular driven gear being radially outward of the central surface of the annular bearing race; and the annular channel including a radially inner surface, the radially inner surface of the annular channel being radially inward of the first end and the second end of the annular bearing race and being radially inward of the inner surface of the annular driven gear.

In another aspect, the present disclosure relates to an annular blade housing supporting a rotary knife blade for rotation about a central axis of rotation in a power operated rotary knife, the annular blade housing comprising: an annular blade support section centered about a blade housing center line, the annular blade support section including an inner wall and a radially spaced apart outer wall and an upper end and an axially spaced apart lower end, the inner and outer walls being concentric about the blade housing center line, the inner wall including a blade housing bearing region for rotatably supporting the rotary knife blade, the blade housing bearing region comprising a circumferentially extending blade housing bearing bead extending radially inwardly toward the blade housing center line and including axially spaced apart bearing faces, a shoulder axially spaced from the blade housing bearing bead, the shoulder including a radial surface that is radially recessed with respect to an innermost radial surface of the annular blade support section; and a mounting section overlying and extending radially outwardly from the annular blade support section, the mounting section including an inner wall and a radially spaced apart outer wall and an upper end and an axially spaced apart lower end, the mounting section inner wall coincident with the inner wall of the annular blade support section, the mounting section including a radially extending split extending from the mounting section outer wall through the mounting section inner wall to provide for circumferential expansion of the blade housing, the mounting section outer wall including a circumferentially extending gear section comprising a set of spur gear teeth extending radially outwardly with respect to the blade housing center line, each gear tooth of the set of spur gear teeth including a pair of converging gear tooth faces, each of the gear tooth faces being parallel to the blade housing center line.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 7 is a schematic right side elevation view of the power operated rotary knife of FIG. 1, as viewed from a front or rotary knife blade end of the power operated knife;

FIG. 8 is a schematic vertical section view taken along a longitudinal axis of the handle assembly of the power operated rotary knife of FIG. 1, as seen from a plane indicated by the line 8-8 in FIG. 3;

FIG. 19 is a schematic rear elevation view of the annular blade housing of FIG. 15;

FIG. 20 is a schematic left side elevation view of the annular blade housing of FIG. 15;

FIG. 21 is a schematic vertical section view of the blade housing of FIG. 15, as seen from a plane indicated by the line 21-21 in FIG. 17;

DETAILED DESCRIPTION

First Exemplary Embodiment—Power Operated Rotary Knife

Overview

Figure 1:
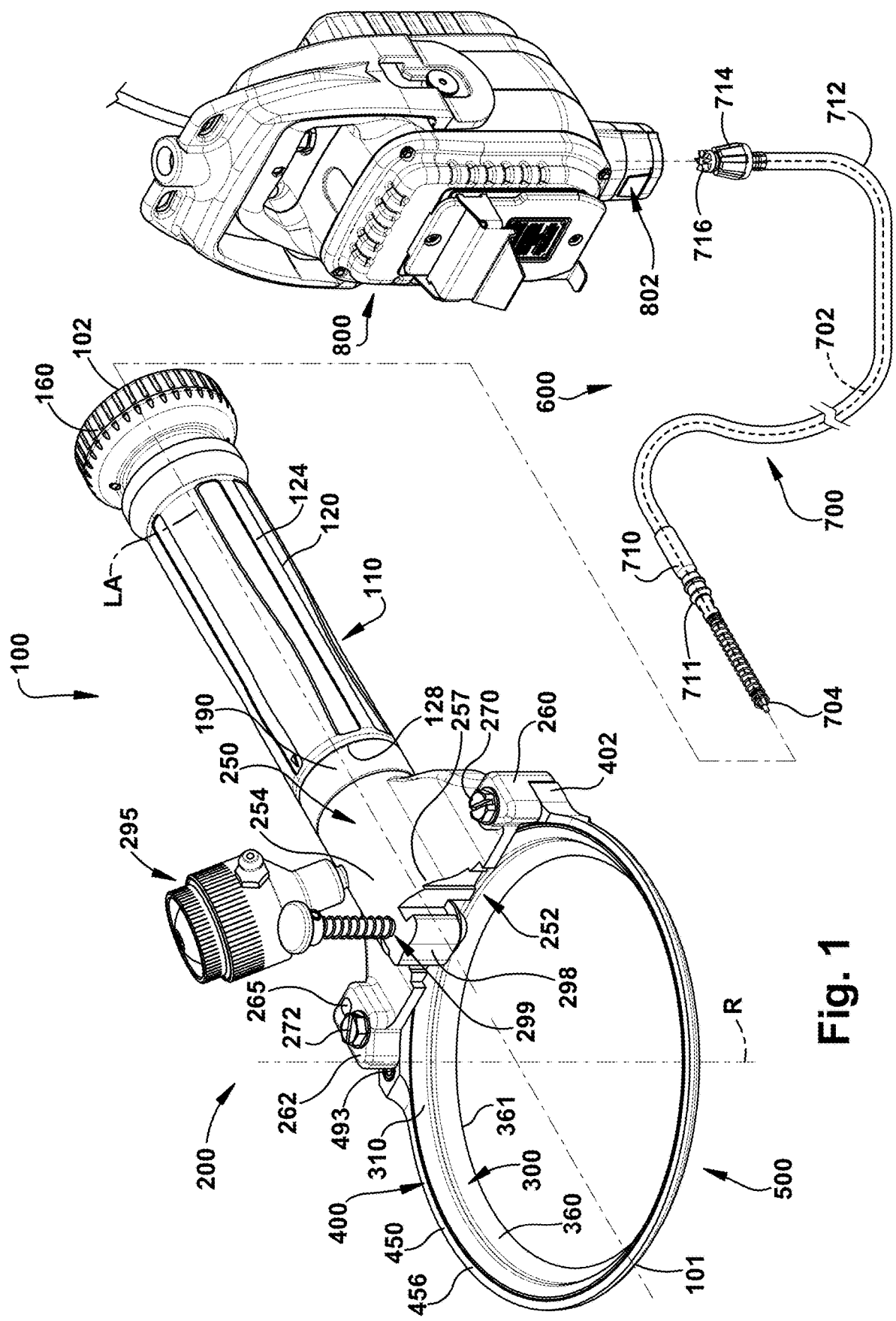
FIG. 1 is a schematic front perspective view of a first exemplary embodiment of a power operated rotary knife of the present disclosure including a head assembly, a handle assembly and a drive mechanism, the head assembly including a frame body, a gearbox assembly, an assembled combination of an annular rotary knife blade and an annular split ring blade housing, and the handle assembly including a hand piece and a hand piece retaining assembly.

Designers of power operated rotary knives are constantly challenged to improve the design of such knives with respect to multiple objectives. For example, there is a desire for increasing the rotational speed of the rotary knife blade of a power operated rotary knife. Generally, increasing blade rotational speed reduces operator effort required for cutting and trimming operations. There is also a desire for reducing the heat generated during operation of the power operated rotary knife. One source of generated heat is the blade—blade housing bearing interface or blade—blade housing bearing structure, that is, heat generated at the bearing interface between the rotating knife blade and the stationary blade housing. Reducing generated heat during power operated rotary knife operation will tend to increase the useful life of various knife components. Additionally, reducing generated heat during knife operation will tend to reduce undesirable "cooking" of the product being cut or trimmed. If sufficient heat is generated in the bearing region of the rotary knife blade and blade housing, dislodged pieces or fragments of a product being cut or trimmed (e.g., small pieces or fragments of fat, gristle or meat dislodged during a trimming or cutting operations, such dislodged pieces or fragments generally referred to as "debris") in a region of the blade—blade housing bearing interface may become so hot that the debris "cook". The cooked materials tend to gum up the blade—blade housing bearing structure and the blade—blade housing bearing interface region resulting in even more undesirable heating.

There is further a desire for reducing the vibration of a power operated rotary knife during operation for purposes of improved operator ergonomics and, consequently, improved operator productivity. The drive mechanism of a power operated rotary knife may include an external drive motor, a flexible shaft drive assembly, a gear train 604 supported within a gearbox housing of the head assembly, and a driven gear formed on the rotary knife blade. The drive mechanism of the power operated rotary knife rotatably drives the rotary knife blade at a high angular speed or RPMs, a typical range of RPMs of a rotary knife blade in a power operated rotary knife may be 900-1,900 RPM. Rotating that rotary knife blade at such high angular speeds may generate excessive, undesirable vibration of the power operated rotary knife if the rotation of the rotary knife blade in the blade housing is not properly balanced and true or if appropriate operating clearance between the blade and the blade housing is not provided. If there is vibration of the rotary knife blade as it rotates within the blade housing, typically, as rotational speed of the rotary knife blade would be increase, the vibration of the blade would also increase. Thus, excessive vibration of the rotating rotary knife blade can effectively limit the rotational speed of the blade. That is, even if a drive mechanism of a power operated rotary knife could be designed to rotate at a desired fast rotational speed, excessive blade vibration of the rotary knife blade within the blade housing, may force the designer to modify the drive mechanism to limit the rotational speed of blade to mitigate the level of blade vibration. There is also a desire for increasing the useful life of components of a power operated rotary knife. Areas of potential improvement include the design of the rotary knife blade, the blade housing, the blade-blade housing bearing structure that supports the knife blade for rotation in the blade housing, and the gearing that rotatably drives the rotary knife blade in the blade housing. The gearing of a power operated rotary knife, which is a part of the drive mechanism of the power operated rotary knife, includes a driven gear of the rotary knife blade and a mating gear train supported in the gearbox housing of the head assembly of the power operated rotary knife.

The driven gear of the rotary knife blade includes a plurality of gear teeth which are engaged and driven by mating gear teeth of the drive gear of the drive train to rotate the rotary knife about a blade central axis of rotation R. A region of the rotary knife blade where the driven gear of the rotary knife blade engages and meshes with the drive gear of the gear train is referred to as the driven gear interface region. A region or regions wherein the blade housing engages the rotary knife blade to support the rotary knife blade for rotation about the central axis of rotation R is referred to as the blade-blade housing bearing interface region and the mating structures of the rotary knife blade and blade housing that provide for support the rotary knife blade for rotation about the central axis of rotation R is referred to as the blade—blade housing bearing structure.

As noted above, debris is generated by the power operated rotary knife 100 during the cutting/trimming operations. Generated debris include pieces or fragments of bone, gristle, meat and/or fat that are dislodged or broken off from the product being cut or trimmed by the power operated rotary knife. Debris may also include foreign material, such as dirt, dust and the like, on or near a cutting region of the product being cut or trimmed. Debris in the knife blade driven gear region may cause or contribute to a number of problems including blade vibration, premature wear of the rotary knife blade driven gear or the mating drive gear of the head assembly of the power operated rotary knife, and "cooking" of the debris. Thus, there is a desire for mitigating the ingress of debris into the driven gear region.

During the use of a power operated rotary knife, the rotary knife blade must be periodically replaced by removing the blade from the blade housing and replaced the blade with a new blade. Blade replacement requires handling of the rotary knife blade and the blade housing. As noted above, during cutting and trimming operations, debris, such as small pieces fat, meat, bone and gristle tend to migrate into the blade-blade housing bearing interface or the gear teeth region of the rotary knife blade. Debris in the blade-blade housing bearing interface region of the rotary knife blade and blade housing and/or debris in the driven gear region of the rotary knife blade can affect the operating performance of the power operated rotary knife and the longevity of the drive mechanism of the power operated rotary knife (rotary knife blade driven gear, gear train, flexible shaft drive, external drive motor, etc.). Accordingly, there is a desire to protect the blade-blade housing bearing structure of the rotary knife blade and the blade housing and to similarly protect the gear teeth or driven gear region of the rotary knife blade. Protection of these areas of the rotary knife blade and blade housing is desirable during handling of the rotary knife blade and blade housing during, for example, changing of the rotary knife blade by removal the blade from the blade housing. Protection of these areas is also important during operation of the rotary knife during cutting and trimming operations, that is, it is desirable to mitigate the ingress of debris, such as small pieces fat, meat, bone and gristle generated during cutting and trimming operations, into a region defined by the driven gear of the rotary knife blade and a bearing interface region of the rotary knife blade and the blade housing. Debris in the driven gear region and/or the blade-blade housing bearing interface region may cause or contribute to a number of problems including blade vibration, premature wear of the driven gear or the mating gear train, and "cooking" of the debris.

Depending upon the application, power operated rotary knives are offered in various sizes. Size may be measured in terms of an outer diameter of the annular rotary blade. Typical annular rotary blade may vary in size from, for example, as 1.4 inches to over 7 inches. For a given annular blade rotational speed, e.g., 1,500 RPM, it is clear that the linear velocity of an outer surface of the blade bearing against the blade housing increases with increasing blade diameter. As such, problems of wear on the blade bearing surface and vibration of the blade as it rotates within the blade housing are accentuated in power operated rotary knives with large blade diameters. As used herein, rotary knife blades with outer diameters of approximately 5 inches or greater are considered large diameter blades. Power operated rotary knives having large diameter blades are particularly prone to the problems discussed above.

Figure 23:
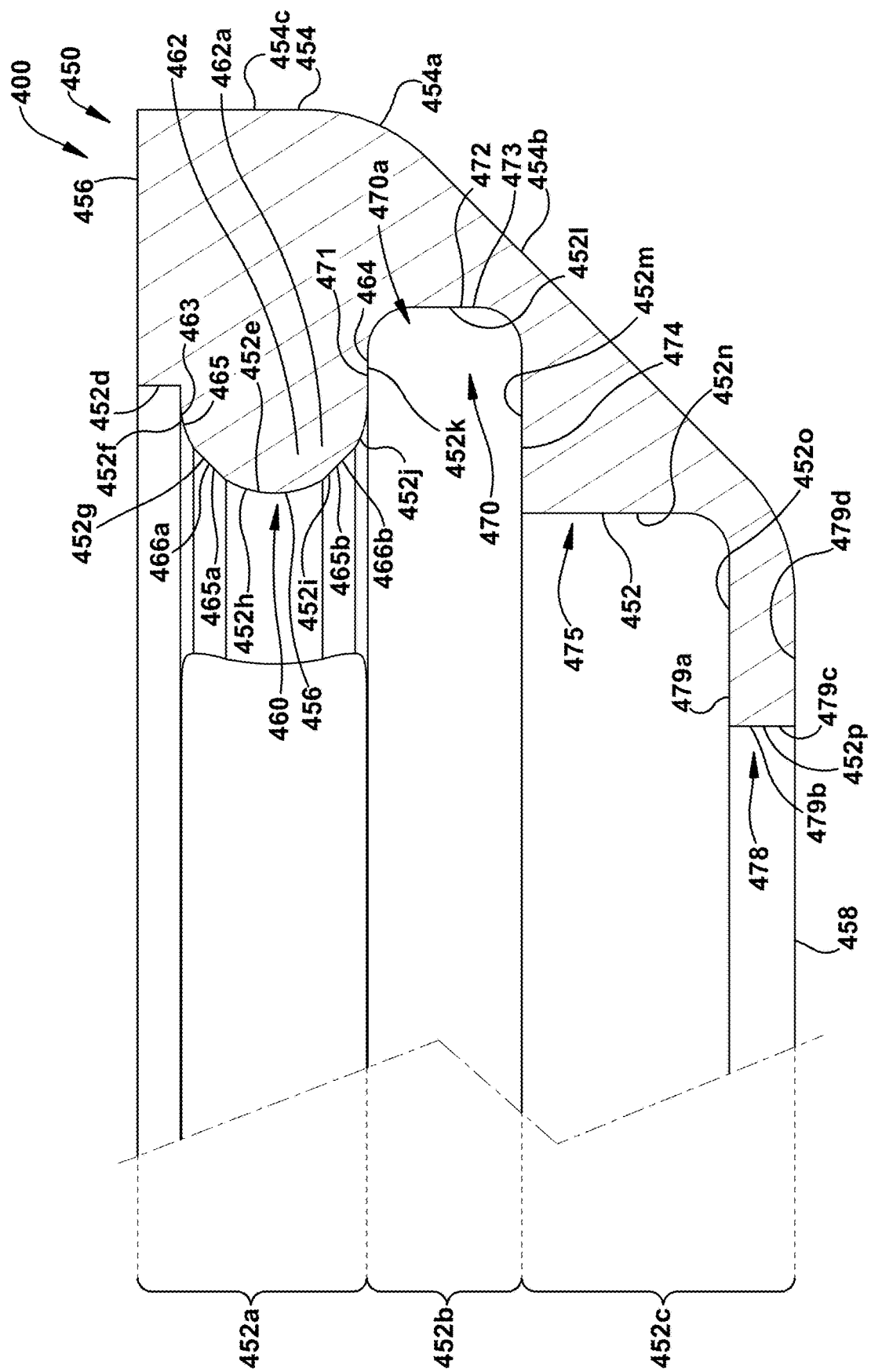
FIG. 23 is a schematic enlarged section view of a portion of the annular blade housing of FIG. 20 that is within a dashed circle labeled FIG. 23 in FIG. 21.

The present disclosure relates to a power operated rotary knife that addresses problems associated with conventional power operated rotary knives and objectives of power operated rotary knife design. One exemplary embodiment of a power operated rotary knife of the present disclosure is schematically shown generally at 100 in FIGS. 1-9. The power operated rotary knife 100 comprises an elongated handle assembly 110 and a head assembly or head portion 200 removably coupled to a forward or distal end 112 of the handle assembly 110. The head assembly 200 includes an annular rotary knife blade 300 (FIGS. 11-14) supported for rotation about a central axis of rotation R by an annular split blade housing 400 (FIGS. 15-23). The blade housing 400 is split to allow for expansion of a blade housing diameter for insertion and removal of annular rotary knife blades. The rotary knife blade 300 is held in position with respect to the blade housing 400 and is supported for rotation with respect to the blade housing 400 by a blade—blade housing bearing structure 550 (FIG. 10) that includes a radially inwardly extending annular bearing race 322 in an outer wall 318 of a body or body section 310 of the rotary knife blade 300 and a mating annular radially protruding bearing bead 460 of an inner wall 452 of a blade support section 450 of the blade housing 400. The bearing bead 460 of the blade housing 400 includes a pair of bearing faces 466a, 466b which bear against corresponding angled bearing surfaces 326, 327 of the bearing race 322 to support the blade 300 for rotation about the central axis of rotation R and define a rotational plane RP of the blade 300. In one exemplary embodiment, the pair of bearing faces 466a, 466b comprise frustoconical bearing surfaces or faces. As best seen in FIGS. 10 and 23, when viewed in two dimensions, the frustoconical bearing faces 466a, 466b define substantially flat, angled, converging bearing surfaces 465a, 465b. The rotational plane RP of the blade 300 which is defined by the blade—blade housing bearing structure 550, is substantially orthogonal with respect to the central axis of rotation R of the blade 300.

The annular blade housing 400 comprises a split ring or annulus 401 having a split 401a extending through a diameter of the ring 401 to allow for expansion of the blade housing diameter for purpose of removal of the rotary knife blade 300 from the blade housing 400 and insertion of a new rotary knife blade. In assembled or operational condition the combination of the rotary knife blade 300 and the blade housing 400 is referred to as the assembled blade—blade housing combination 500. The assembled blade—blade housing combination 500 defines the blade—blade housing support or bearing structure 550 which functions to both secure the blade 300 in the blade housing 400 and supports the blade 300 for high speed rotation with respect to the blade housing 400 about the blade central axis of rotation R. The blade—blade housing bearing structure 500 defines a blade—blade housing bearing interface region 520 of the power operated rotary knife 100. A coacting region where the driven gear 340 of the rotary knife blade 300 engages and meshes with the drive gear 650 of the gear train 604 is referred to as the driven gear interface region 510 (FIG. 8). A region or regions of the blade—blade housing bearing structure 550 wherein the bearing bead 662 of the blade housing 400 engages the annular bearing race 322 of the rotary knife blade 300 to support the rotary knife blade 300 for rotation about the central axis of rotation R is referred to as the blade-blade housing bearing interface region 520 (FIG. 10). As noted above, the mating bearing structures 322, 462 of the rotary knife blade 300 and blade housing 400 that provide for support the rotary knife blade 300 for rotation about the central axis of rotation R is referred to as the blade—blade housing bearing structure 550.

It should be appreciated that not all of the mating or coacting bearing surfaces of the blade—blade housing bearing structure 550 are in contact at any given time because there are necessarily running or operating clearances between the rotary knife blade 300 and the blade housing 400 which allow the blade 300 to rotate relatively freely within the blade housing 400. As one of skill in the art would appreciate, these running or operating clearances cause the rotary knife blade 300 to act somewhat akin to a teeter-totter within the blade housing 400, that is, as one region of the blade 300 is pivoted or moved upwardly within the blade housing 400 during a cutting or trimming operation, the diametrically opposite portion of the blade (180 away) is generally pivoted or moved downwardly within the blade housing. Accordingly, the specific mating bearing surfaces of the blade—blade housing bearing structure 550 in contact at any specific location of the bearing race 322 of the rotary knife blade 300 or the bearing bead 462 of the blade housing 400 will change and, at any given time, will be determined, at least in part, by the forces applied to the rotary knife blade 300 during use of the power operated rotary knife 100. Thus, for any specific portion or region of the bearing surfaces and bearing faces of the blade—blade housing bearing structure 550, there may be periods of non-contact or intermittent contact with a mating bearing surface.

Figure 2:
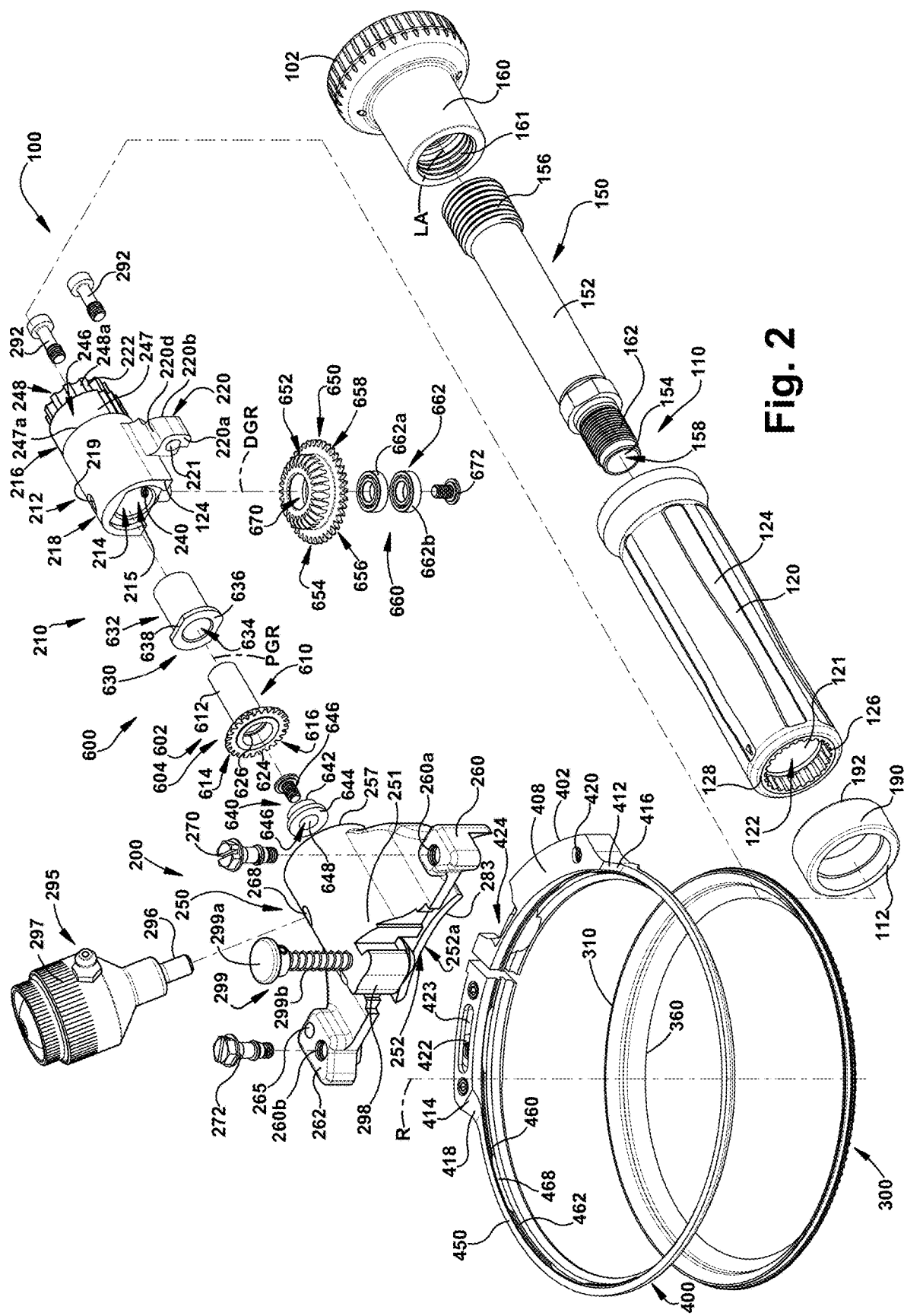
FIG. 2 is a schematic exploded perspective view of the power operated rotary knife of FIG. 1.
Figure 3:
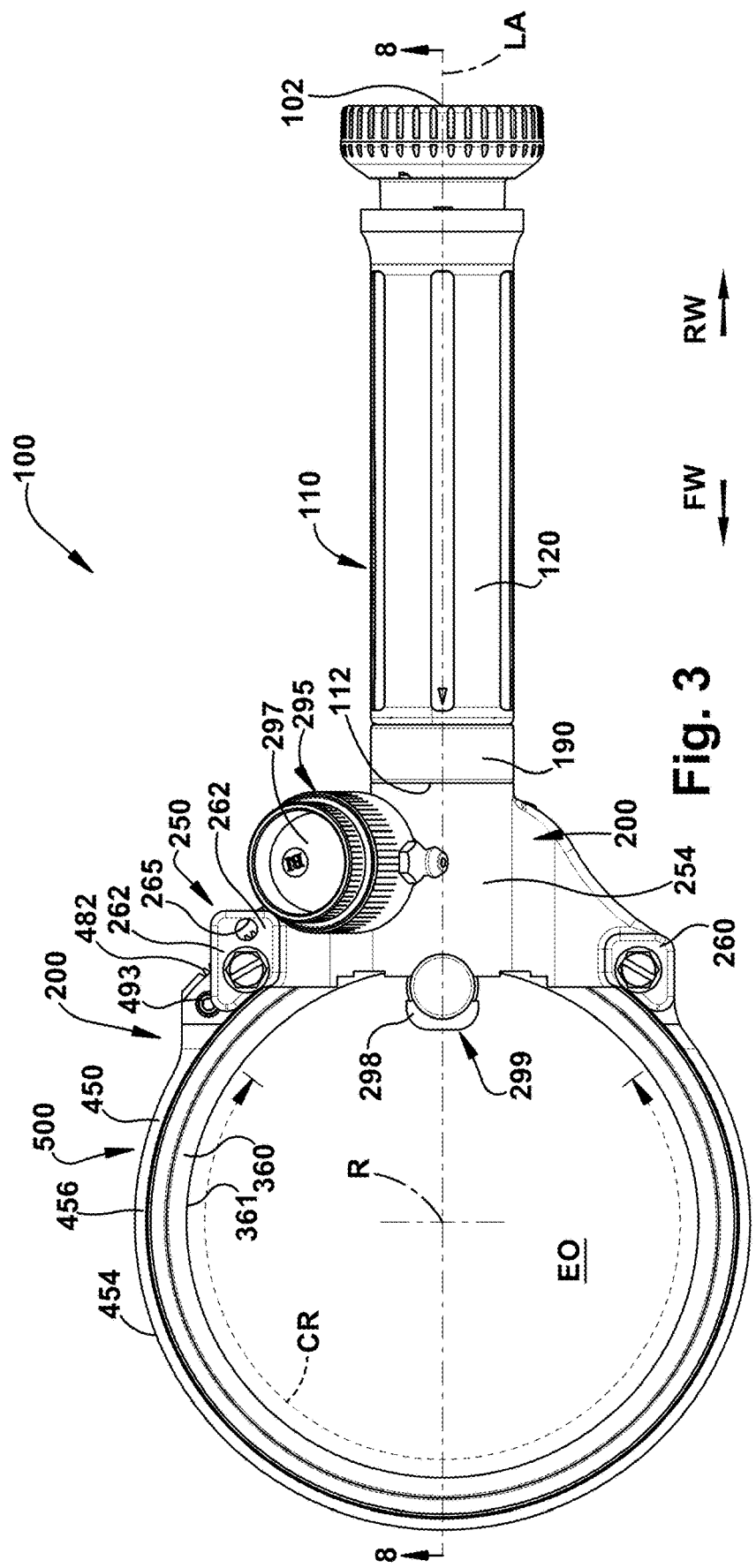
FIG. 3 is a schematic top plan view of the power operated rotary knife of FIG. 1.
Figure 4:
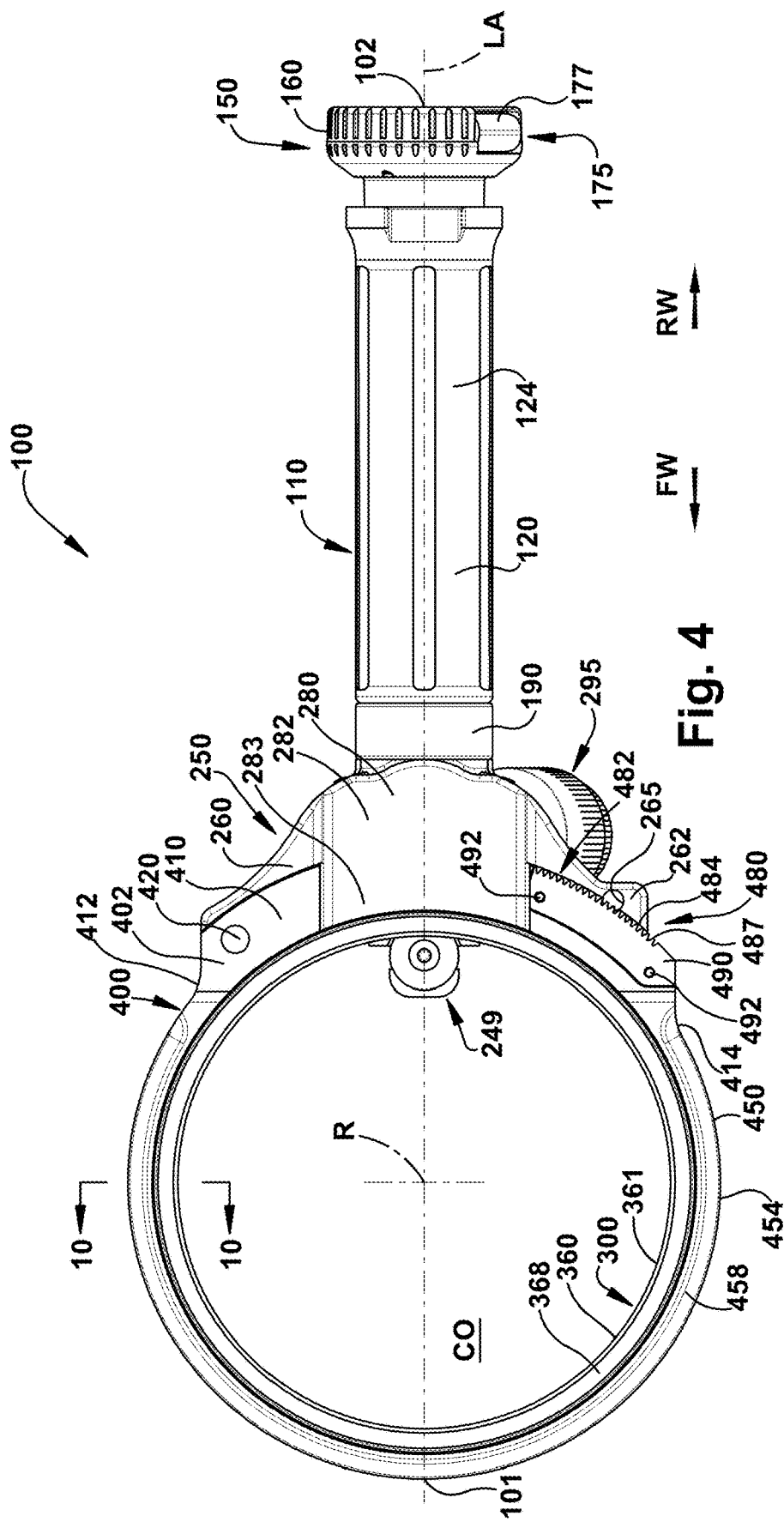
FIG. 4 is a schematic bottom plan view of the power operated rotary knife of FIG. 1.

As can best be seen in FIGS. 1 and 2, the rotary knife blade 300 is rotatably driven about its axis of rotation R by a drive mechanism 600 of the power operated rotary knife. The drive mechanism 600, some components of which may be external to the power operated rotary knife 100, provides motive power to rotate the rotary knife blade 300 with respect to the blade housing 400. In one exemplary embodiment, the drive mechanism 600 includes an external drive motor 800, which is external to the power operated rotary knife 100, and a flexible shaft drive assembly 700, which includes a first coupling 710 which extends into and is releasably secured to the handle assembly 110 by a drive shaft latching assembly 175 of the handle assembly 110. The first coupling 710 is affixed to a flexible outer casing or sheath 712 of the shaft drive assembly 700. Rotating within the outer sheath 712 is a flexible drive shaft 702. The external drive motor 800 provides the motive power for rotating the knife blade 300 with respect the blade housing 400 about the axis of rotation R via the flexible shaft drive assembly 700 which comprises a drive transmission including an inner rotating drive shaft 702 rotating within a stationary outer sheath 712. The drive motor 800 includes a coupling 802 which releasably receives a mating motor drive coupling 714 affixed to a proximal end of the outer sheath 712 of the shaft drive assembly 700. A driven fitting 716 is affixed to a distal end of the rotating drive shaft 702 and, when the motor drive coupling 714 is engaged with the coupling 802 of the drive motor 800, the driven fitting 716, and, thus, the rotating drive shaft 702 is rotated by a drive shaft of the drive motor 800. The drive motor 800 may be an electric motor or a pneumatic motor.

Alternately, the shaft drive assembly 700 may be eliminated and a gear train 604 the power operated rotary knife 100 may be directly driven by an air/pneumatic motor or an electric motor disposed in a throughbore 158 of an elongated central core 152 of a hand piece retaining assembly 150 of the handle assembly 110 or in a throughbore 122 of a hand piece 200 of the handle assembly 110, if a different hand piece retaining structure is used. A suitable air/pneumatic motor sized to fit within a hand piece of a power operated rotary knife is disclosed in U.S. Pat. No. 8,756,819 to Whited, et al., issued Jun. 24, 2015. U.S. Pat. No. 8,756,819 is assigned to the assignee of the present invention and is incorporated herein it is entirety by reference.

Figure 24:
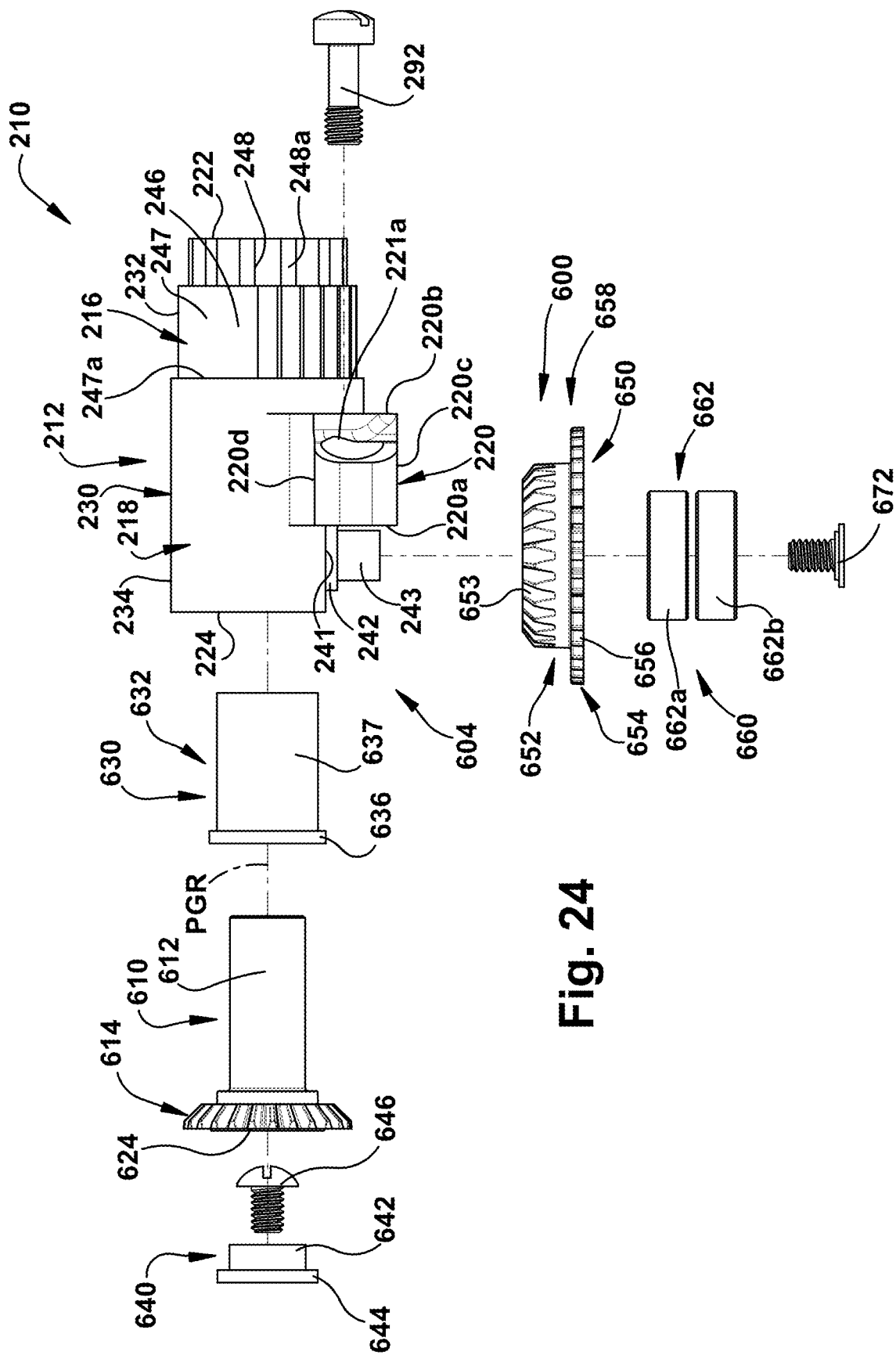
FIG. 24 is a schematic exploded perspective view of the gearbox assembly of the power operated rotary knife of FIG. 1.
Figure 25:
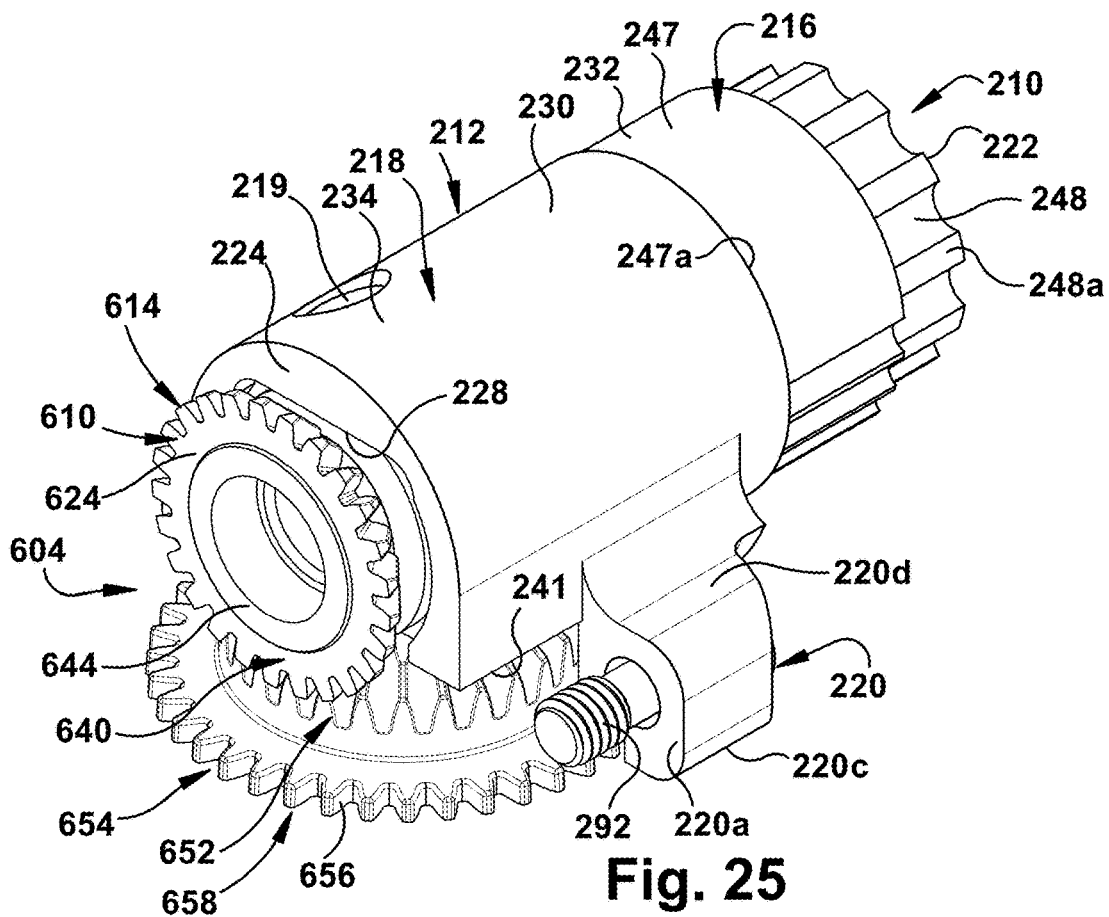
FIG. 25 is a schematic front perspective view of the gearbox assembly of the power operated rotary knife of FIG. 1.

The drive mechanism 600 further includes components which are part of the power operated rotary knife 100 including the gear train 604 and a driven gear 340 formed on the rotary knife blade 300. As can best be seen in FIGS. 1, 24 and 25) The gear train 604 is part of a gearbox assembly 210 of the head assembly 200 and includes a pinion gear 610 and a drive gear 650, which, in one exemplary embodiment, is a double gear arrangement. A male drive fitting 704 at a distal end of the rotating drive shaft 702 of the flexible shaft drive assembly 700 rotates the pinion gear 610 of the gear train 604. The male drive fitting 702 and the distal end of the rotating drive shaft 702 are supported by the first coupling 710 of the shaft drive assembly 700. The male drive fitting 704 of the drive shaft engages a female socket or fitting 622 defined by an inner surface 620 of an input shaft 612 at a proximal end of the pinion gear 610. The pinion gear 610, in turn, rotates the double drive gear 650. The double drive gear 650 is operatively engaged with the driven gear 340 of the rotary knife blade 300. Rotation of the double drive gear 650, in turn, drives the driven gear 340 to rotate the blade 300 about its axis of rotation R. Stated another way, the gear train 604 of the drive mechanism 600 of the power operated rotary knife 100 transmits rotational power from the rotating drive shaft 702 of the flexible shaft drive assembly 700, through the gear train 604, including the pinion gear 610 and the double drive gear 650, to rotate the rotary knife blade 300 with respect to the blade housing 400. The pinion and drive gears 610, 650 are supported by a gearbox housing 212 of the gearbox assembly 210 of the head assembly 200. When the flexible shaft drive assembly 700 is secured to the handle assembly 110 by the drive shaft latching assembly 175, the drive fitting 704 at the distal end of the rotating drive shaft 702 of the shaft drive assembly 700 engages and operatively rotates the pinion gear 610 of the gear train 604 of the gearbox assembly 210, which, in turn, rotatably drives the driven gear 340 of the rotary knife blade 300.

Figure 26:
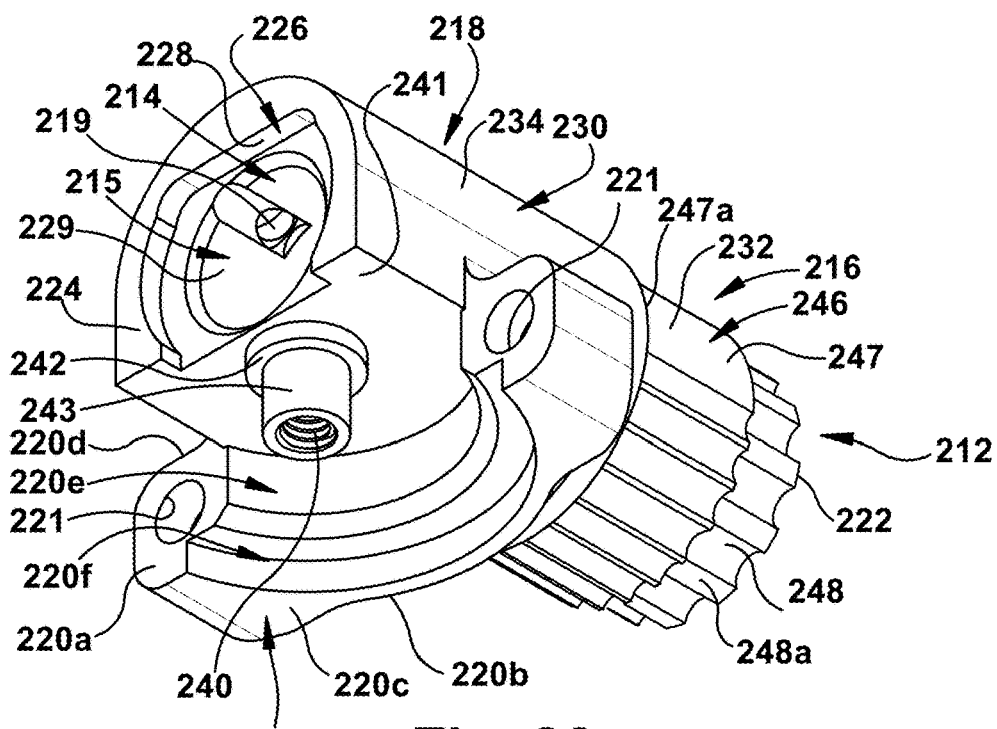
FIG. 26 is a schematic front, bottom perspective view of a gearbox housing of the gearbox assembly of the power operated rotary knife of FIG. 1.
Figure 27:
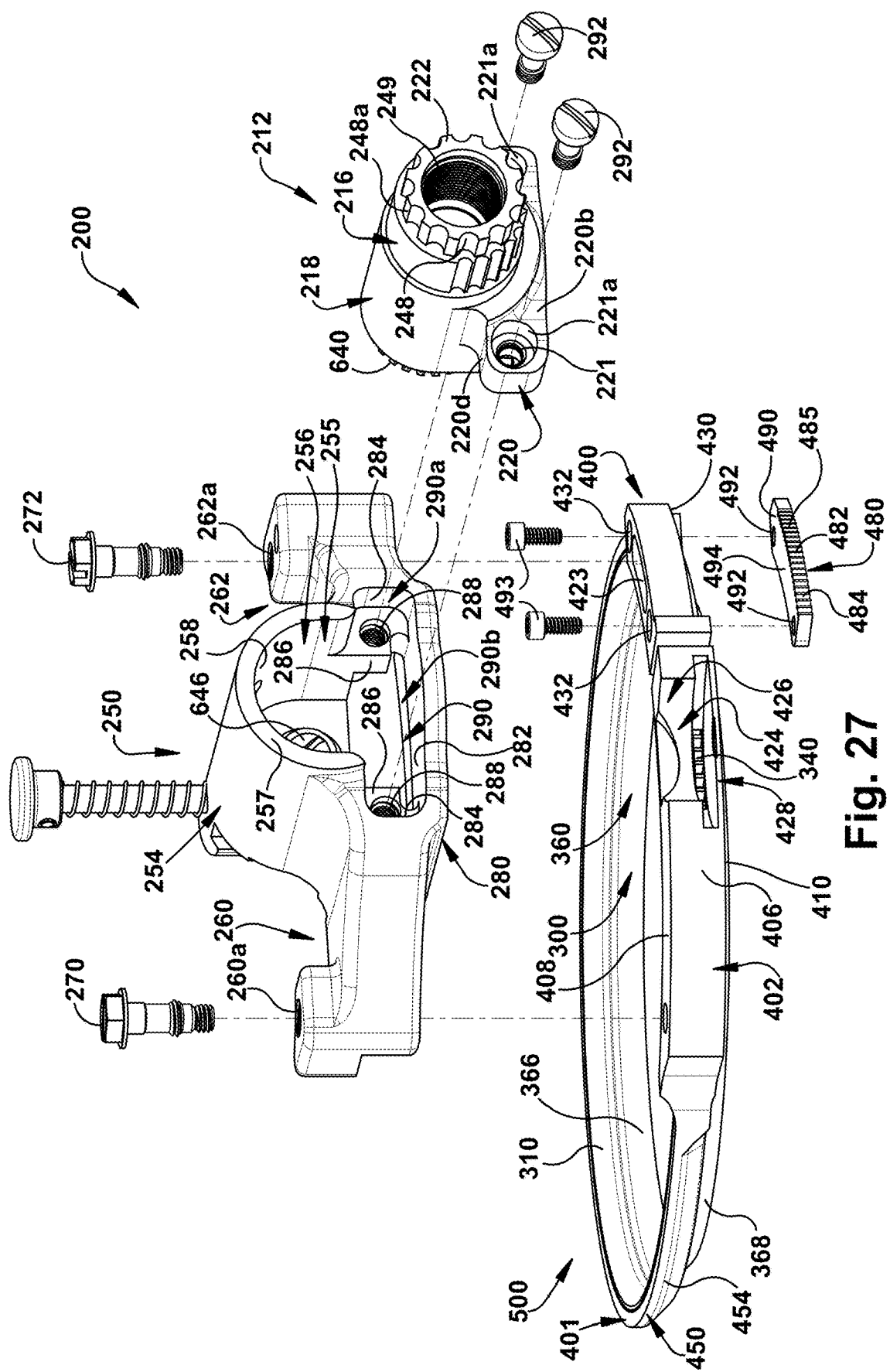
FIG. 27 a schematic exploded rear perspective view of the head assembly of the power operated rotary knife of FIG. 1 showing the gearbox assembly, a frame body, and the assembled combination of the rotary knife blade and blade housing.
Figure 28:
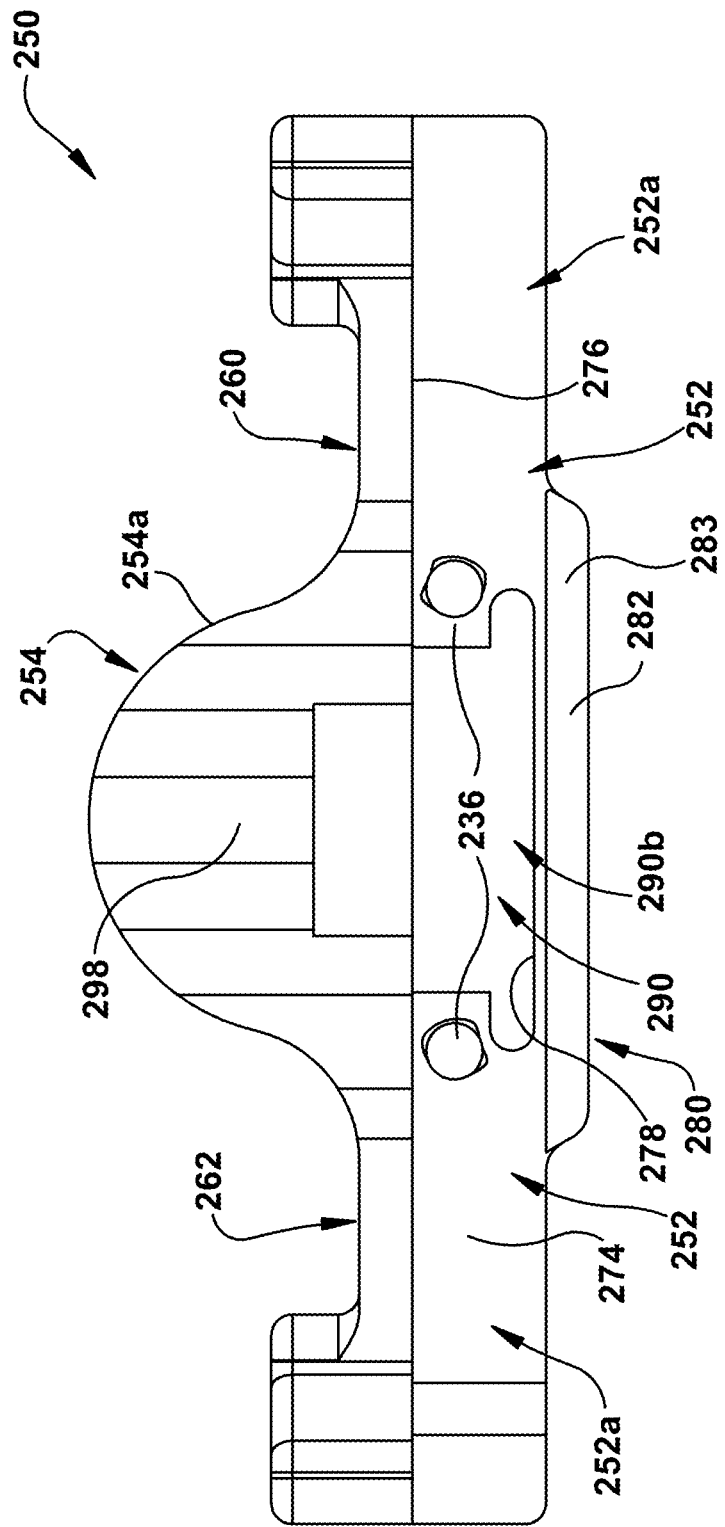
FIG. 28 is a schematic front elevation view of the frame body

In addition to the annular rotary knife blade 300, the annular split blade housing 400, and the blade—blade housing bearing structure 550, the head assembly 200 of the power operated rotary knife 100 also includes the gearbox assembly 210, including a gearbox housing 212 (FIGS. 2 and 26) supporting the gear train 604, and a frame or frame body 250 (FIGS. 2, 27 and 28). The frame body 250 supports both the gearbox assembly 210 and the assembled blade—blade housing combination 500 such that the gear train 604 of the gearbox assembly 210 operatively engages the driven gear 340 of the rotary knife blade 300 to rotate the blade 300 about its central axis of rotation R. The assembled blade—blade housing combination 500 is releasably affixed to a forward arcuate mounting pedestal 252 of the frame 250 by a pair of threaded connections 270, 272 that pass through a forward portion 251 of the frame 250 and thread into threaded openings 420, 422 in a mounting section 402 of the blade housing 400.

As can best be seen in FIGS. 1 and 2, in one exemplary embodiment, the head assembly 200 additionally includes a lubrication system 295 including a grease cup 297 attached to the frame 250. The grease cup 297 comprises a flexible bladder filled with a food-safe lubricant. The grease cup 297 is affixed or attached to the frame body 250 by a fitting 296 which threads into a threaded opening 268 in a central cylindrical region 254 of the frame body 250. When the bladder of the grease cup 297 is depressed by an operator, food-safe lubricant is routed from the bladder through the fitting 296, through a port/passageway in the gearbox housing 212 and into a region of the pinion gear 610 for lubrication of the gear train 604. The head assembly 200 also includes a steeling assembly 299 which is affixed to a projection 298 of a forward wall 254a of the central cylindrical region 254 of the frame body 250. The steeling assembly 299 includes a spring biased actuator 299a, and a push rod 299b with a steeling member 299c affixed to a bottom of the push rod 299b. When the actuator 299a is depressed by the operator, the push rod 299b moves downwardly and the steeling member 299c engages the blade cutting edge 361 of the rotary knife blade 300 to straighten the blade cutting edge 361.

Figure 9:
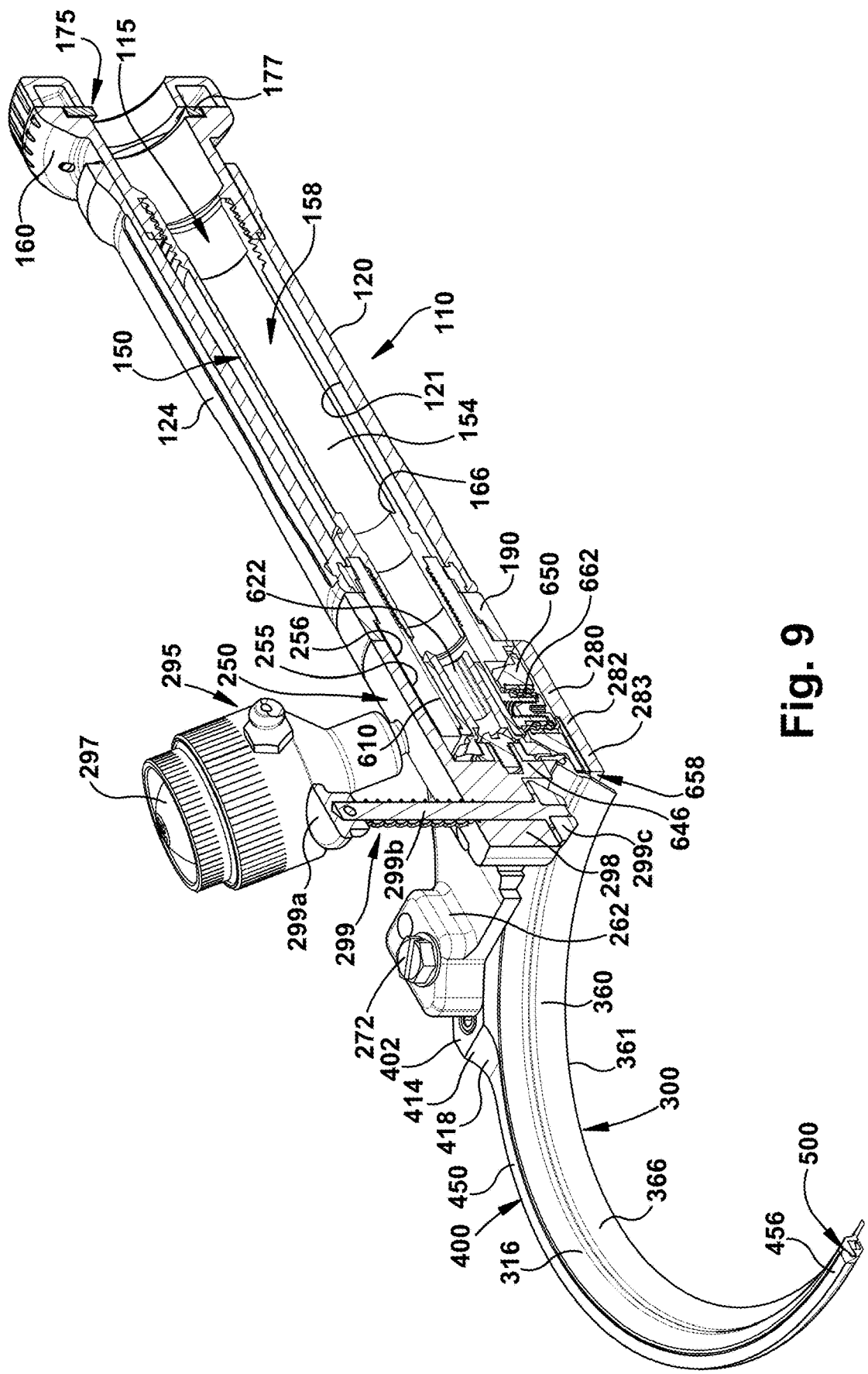
FIG. 9 is a schematic perspective section view along the longitudinal axis of the handle assembly of the power operated rotary knife of FIG. 1, as seen from a plane indicated by the line 8-8 in FIG. 3.
Figure 10:
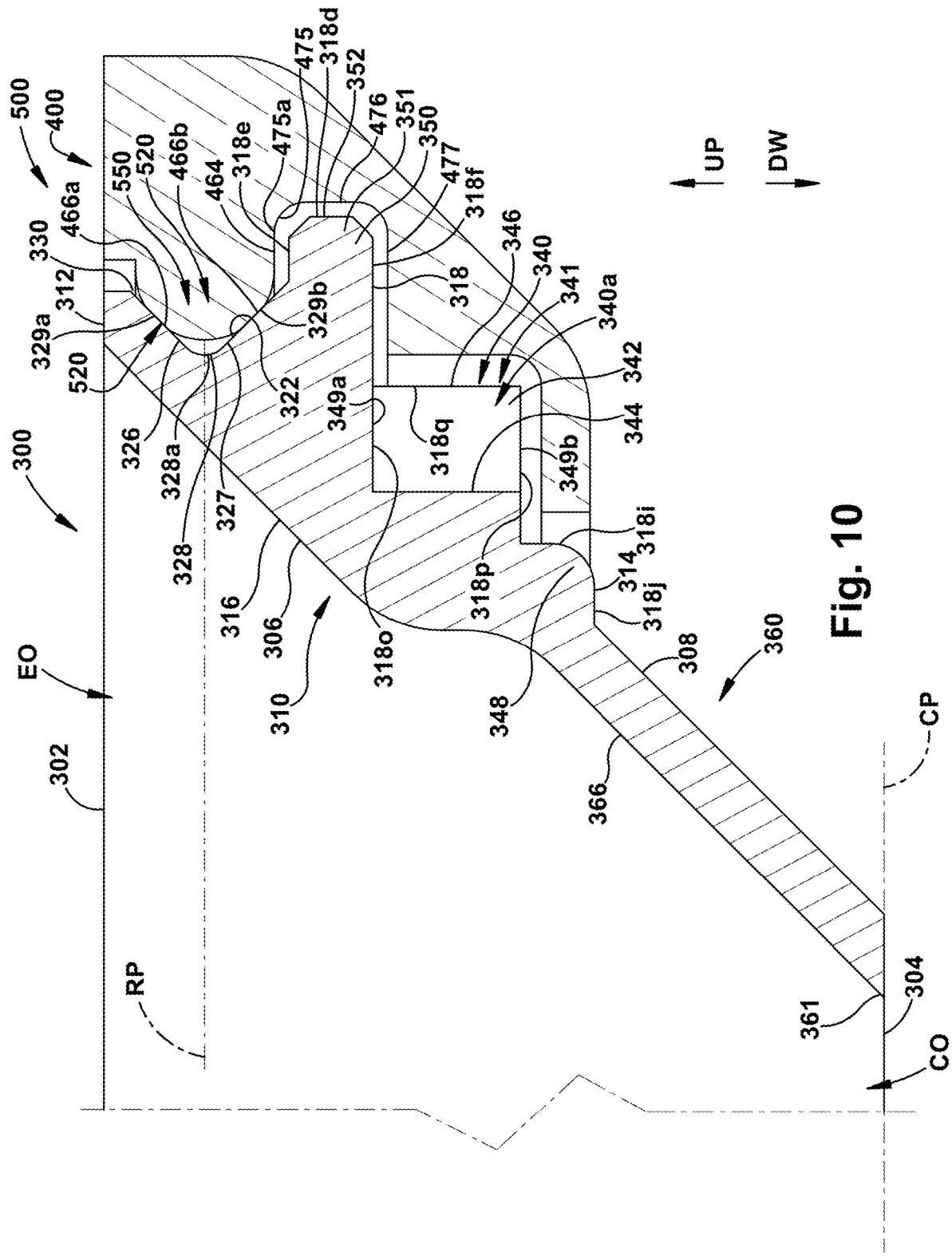
FIG. 10 a schematic enlarged section view of the assembled combination of the annular rotary knife blade and the annular blade housing of the head assembly of the power operated rotary knife of FIG. 1 as seen from a plane indicated by the line 10-10 in FIG. 4.

As can best be seen in FIGS. 2, 8 and 9, the handle assembly 110 includes the hand piece 120 that is secured to the head assembly 200 by a hand piece retaining assembly 150 of the handle assembly 110. The handle assembly 110 extends along a longitudinal axis LA that is substantially orthogonal to the central axis of rotation R of the rotary knife blade 300. The handle assembly 110 includes the throughbore 115 extending along the handle assembly longitudinal axis LA and which is longitudinally aligned a throughbore 215 of the gearbox housing 212. The hand piece 120 includes an inner surface 121 that defines the central throughbore 122, which extends along the handle assembly longitudinal axis LA. The hand piece 120 includes a contoured outer handle or outer gripping surface 124 that is grasped by an operator to appropriately manipulate the power operated rotary knife 100 for trimming and cutting operations.

The hand piece retaining assembly 150 includes the elongated central core 152 which extends through the central opening 122 of the hand piece 120. A threaded forward outer surface 162 of the elongated core 152 threads into a threaded opening 249 formed on an inner surface 245 of a cylindrical rearward section 216 at the proximal or rearward end 222 of the gearbox housing 212 to secure the hand piece 120 to the gearbox housing 212. The hand piece retaining assembly 150 also includes the spacer ring 190. When the hand piece 200 is being secured to the gearbox housing 212, the spacer ring 190 is positioned on a second cylindrical portion 247 of the outer surface 246 of the cylindrical rearward section 216 of the gearbox housing 212. The spacer ring 190 is positioned to abut the stepped shoulder 247a defined between the larger second portion 247 of the outer surface 246 of the cylindrical rearward portion 216 and the inverted U-shaped forward section 218 of the gearbox housing 212. The hand piece 120 is secured in position by an enlarged rearward end piece 160. As can best be seen in FIG. 8, the end piece 160 includes an interior treaded distal portion which threads onto a threaded exterior proximal portion 156 of the elongated central core 152 of the hand piece retaining assembly 150 thereby securing the hand piece and the spacer ring 190 between the stepped shoulder 247a of the gearbox housing 212 and a front wall 160a of the end piece 160. When threaded onto the central core 152, the front wall 160a of the end piece 160 bears against an interior stepped shoulder 130 of the hand piece 120 to secure the hand piece 120 and spacer ring 190 from longitudinal movement along the handle assembly longitudinal axis LA. Optionally, if desired by the operator of the power operated rotary knife 100, the spacer ring 190 may be replaced by a thumb support ring (not shown) which provides a resting surface for the operator's thumb that is spaced radially outwardly from the hand piece 120.

As noted above, the handle assembly 110 also includes the shaft drive latching assembly 175 (best seen in FIG. 6) which releasably secures the shaft drive assembly 700 to the handle assembly 100. The shaft drive latching assembly 175 includes an actuator 177 (FIGS. 4, 6 and 8-9) slidingly supported in a proximal enlarged end piece 160 of the handle assembly 110. A first coupling 710 of the shaft drive assembly is received in a throughbore 115 defined by the handle assembly 110 and secured in place by the shaft drive latching assembly 175. The drive fitting 704 at a distal end 706 of the rotating drive shaft 702 of the shaft drive assembly 700 extends into the aligned throughbore 215 of the gearbox housing 212 to engage and rotate the pinion gear 610 of the gear train 604 of the gearbox assembly 210. The proximal enlarged end piece 160 of the handle assembly 110 supports the drive shaft latching assembly 175 and the actuator 177 engages the first coupling 710 affixed to the outer sheath 712 of the shaft drive assembly 700 to secure the shaft drive assembly 700 to the handle assembly 110. The drive shaft latching assembly 175 thereby ensures operative engagement of the male drive fitting 714 of the drive shaft 702 within the female socket or fitting 622 of the pinion gear input shaft 612. As can best be seen in FIG. 9, an inner surface 154 of the elongated central core 152 also includes an inwardly stepped shoulder 166 that provides a stop for a distal portion 711 (FIG. 1) of the first coupling 710 of the shaft drive assembly 700.

The rotational speed of a specific rotary knife blade 300 mounted in the power operated rotary knife 100 will depend upon the specific characteristics of a drive mechanism 600 of the power operated rotary knife 100, including the external drive motor 800, the flexible shaft drive assembly 700, the gear train 604 of the gearbox assembly 210, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed. The power operated rotary knife 100 of the first exemplary embodiment is especially suitable for use with large diameter rotary knife blades, that is, blades having an outer diameter of 5 inches or more. Various styles of rotary knife blades may also be utilized in the power operated rotary knife 100, including flat blade style rotary knife blades, hook blade style rotary knife blades, and straight blade style rotary knife blades, among others. The exemplary rotary knife blade 300 is a flat blade style rotary knife blade, however, it is the intent and contemplation of the present disclosure that the other styles of rotary knife blade may be employed in the power operated rotary knife 100.

Specific structural and operational details of the head assembly 200 and the handle assembly 110 are disclosed in U.S. Pat. No. 8,726,524 to Whited et al., issued May 20, 2014. U.S. Pat. No. 8,726,524 to Whited et al. also discloses different styles of rotary knife blades including flat blade style, hook blade style and straight blade style blades, which may be utilized in the power operated rotary knife 100 of the present disclosure. U.S. Pat. No. 8,726,524 to Whited et al. is assigned to the assignee of the present invention and is incorporated herein in its entirety by reference. Specific details of the drive mechanism 600, including the external drive motor 900 and the flexible shaft drive transmission 700, are disclosed in U.S. Pat. No. 8,968,107 to Rapp et al., issued Mar. 3, 2015. U.S. Pat. No. 8,968,107 to Rapp et al. is assigned to the assignee of the present invention and is incorporated herein it is entirety by reference.

Figure 5:
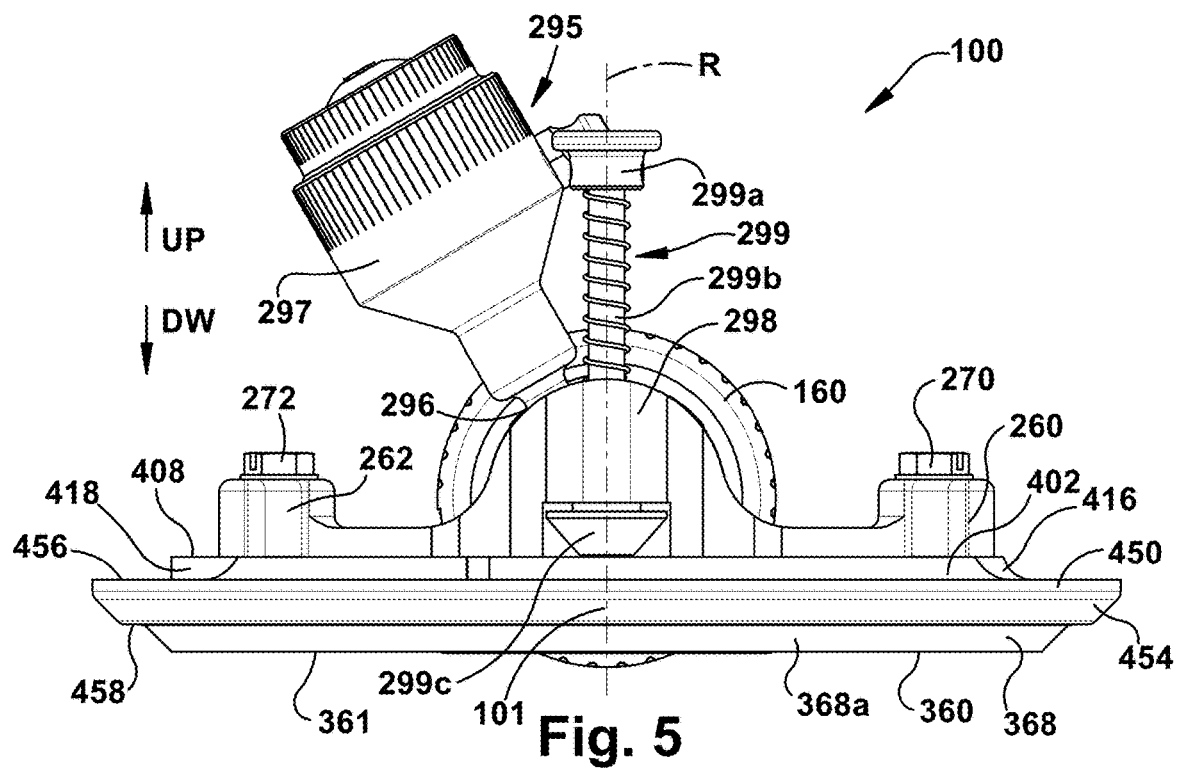
FIG. 5 is a schematic front elevation view of the power operated rotary knife of FIG. 1.
Figure 6:
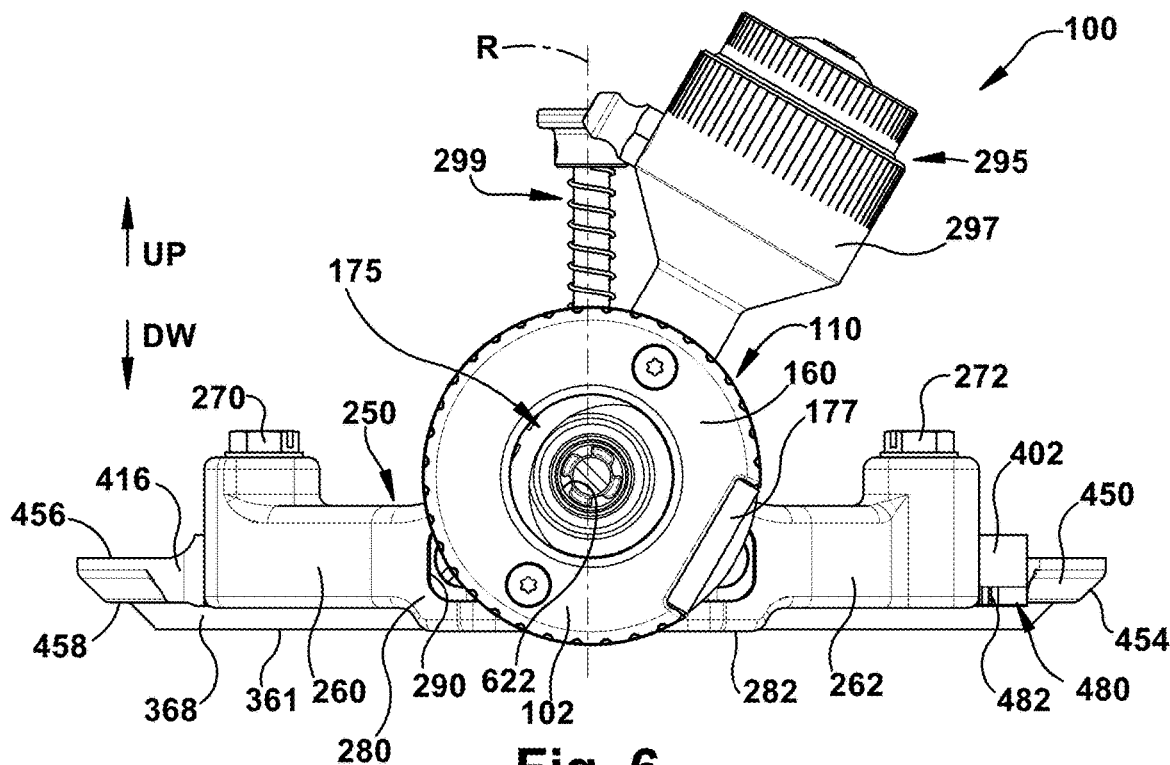
FIG. 6 is a schematic rear elevation view of the power operated rotary knife of FIG. 1.

As used herein, a front or distal end 101 of the power operated rotary knife 100 is an end of the knife 100 that includes the blade—blade housing combination 500, while a rear or proximal end 102 of the power operated rotary knife 100 is an end of the knife 100 that includes the handle assembly 110, and specifically, the enlarged end piece 160 threaded onto or attached to the elongated central core 152 of the hand piece retaining assembly 150. Upward or upward direction UP means in a direction generally parallel to the central axis of rotation R of the rotary knife blade 300 and, as shown in FIGS. 5 and 6, going in a direction from a first, upper end 456 of the blade support section 450 of the blade housing 400 to a second, lower end 458 of the blade support section 450. Downward or a downward direction DW means a direction generally parallel to the central axis of rotation R of the rotary knife blade 300 and, as shown in FIGS. 5 and 6, going in a direction from the second, lower end 458 of the blade housing blade support section 450 to the first, upper end 456 of the blade support section 450. Annular, as used herein, means generally ring-like or generally ring-shaped in configuration and includes configuration wherein the ring include or does not include a split extending through a diameter of the ring or annulus. Axially above or axially spaced above, as used herein, means positioned above as viewed with respect to an axis, for example, the central axis of rotation R of the rotary knife blade 300, even if the two elements are not in axial alignment with respect to the axis. For example, in FIG. 15, the bearing race 322 of the rotary knife blade 300 is axially above or axially spaced above the cutting edge 361 of the rotary knife blade 300 with respect to the blade central axis of rotation R even though the blade bearing race 322 is spaced radially outwardly from the blade cutting edge 361 with respect to the blade central axis of rotation R. The terms axially below or axially spaced below, as used herein, means positioned below as viewed with respect to an axis, for example, the central axis of rotation R of the rotary knife blade 300, even if the two elements are not in axial alignment with respect to the axis. For example, in FIG. 15, the cutting edge 361 of the rotary knife blade 300 is axially below or axially spaced below the bearing race 322 of the rotary knife blade 300 with respect to the blade central axis of rotation R even though the blade cutting edge 361 is spaced radially inwardly from the blade bearing race 322 with respect to the central axis of rotation R. Similarly, axially extending, as used here, means one element extends from and is positioned above or below a second element with respect to an axis, even if the two elements are not in axial alignment with respect to the axis. For example, in FIG. 14, the blade section 360 extends axially from the body 310 with respect to the blade axis of rotation R even though portions of the blade section 360 are spaced radially inwardly from the body 310 with respect to the blade central axis of rotation R. Similarly, the terms radially offset from, radially outward of, radially inward of, as used herein, means one element is positioned offset from a second element, as viewed along a radius line extending radially from an axis, for example, the central axis of rotation R of the rotary knife blade 300, even if the two elements are not in radial alignment along the radius line because one element is axially above or axially below the other element.

Rotary Knife Blade 300

Figure 11:
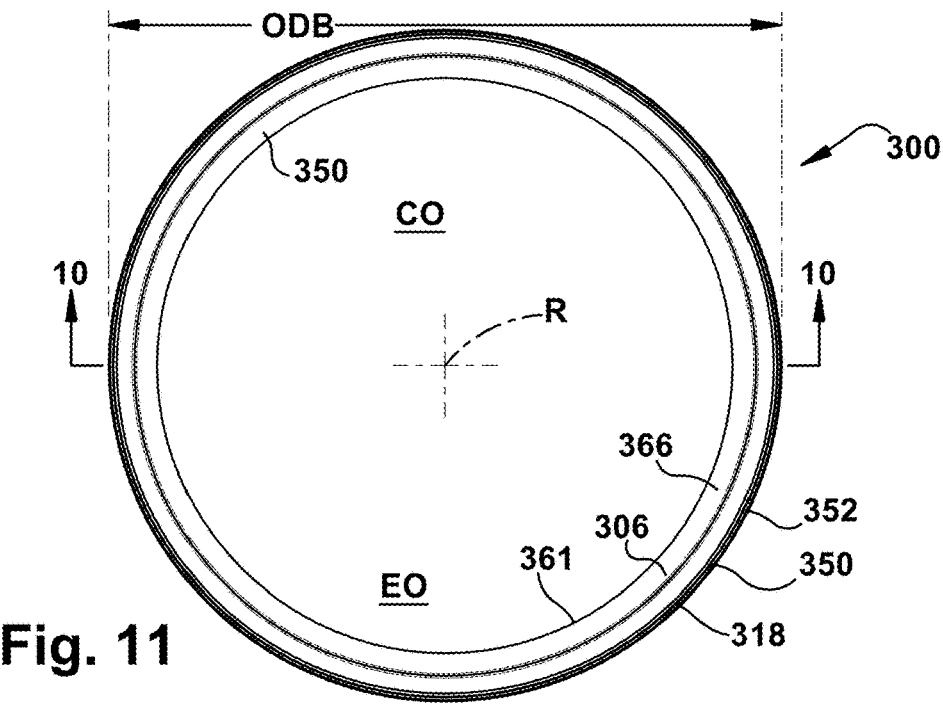
FIG. 11 is a schematic top plan view of the annular rotary knife blade of the head assembly of the power operated rotary knife of FIG. 1.
Figure 12:
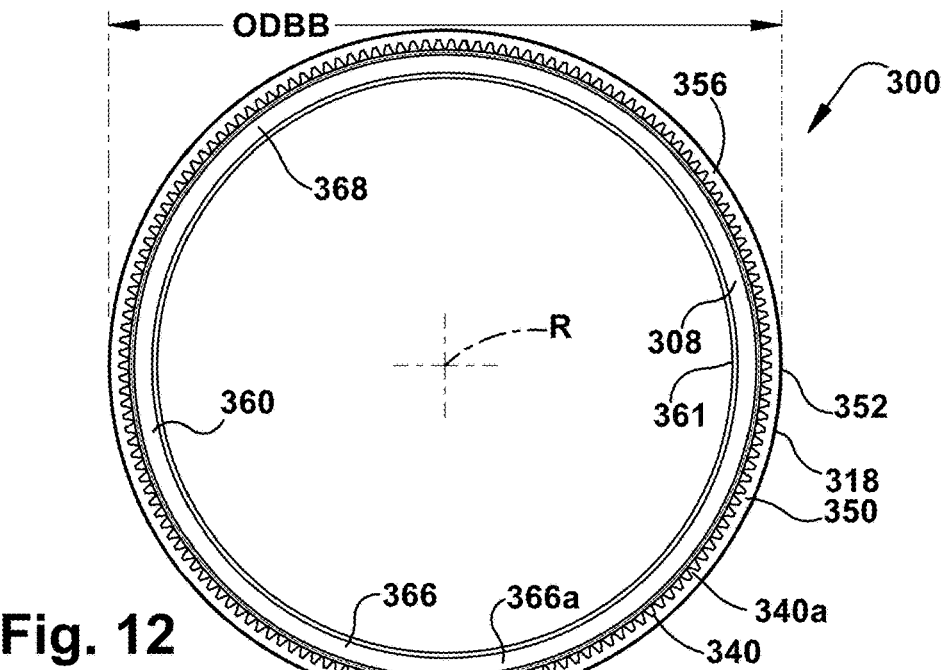
FIG. 12 is schematic bottom plan view of the annular rotary knife blade of FIG. 11.
Figure 13:
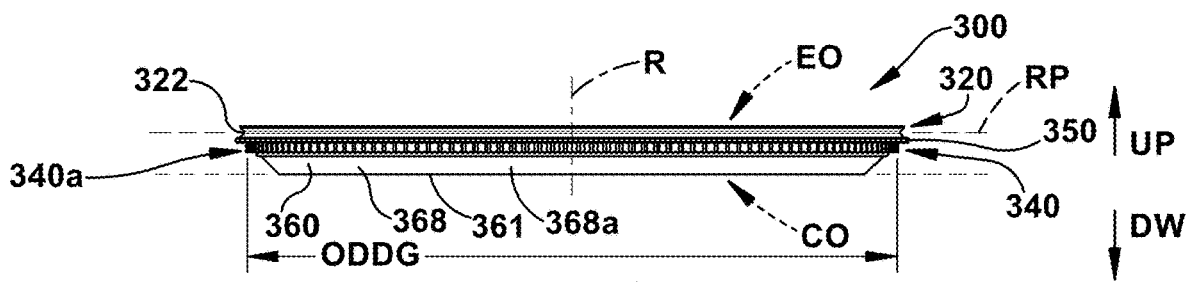
FIG. 13 is a schematic front plan view of the annular rotary knife blade of FIG. 11.

In one exemplary embodiment of the present disclosure, the rotary knife blade 300 of the power operated rotary knife 100 is a one-piece, continuous annular structure and rotates in the blade housing 400 about the central axis of rotation R. As can best be seen in FIGS. 10-14, the rotary knife blade 300 includes an upper end 302, and an axially spaced apart lower end 304, the lower end 304 including a cutting edge 361 of the blade 300. The rotary knife blade 300 further includes an inner wall 306 and a radially spaced apart outer wall 308. The rotary knife blade 300 is comprised of the upper annular body 310 and an annular blade section 360 extending axially and radially inwardly from the body 310. As can be seen in FIGS. 11-13, the body 310 and the blade section 360 are both radially centered about the central axis of rotation R, that is, the body 310 and the blade section 360 are both concentric about the central axis of rotation R. In one exemplary embodiment, the rotary knife blade 300 is a so-called flat blade style rotary knife blade having the blade section 360 extending radially inwardly with respect to the body and defining a large, obtuse cutting angle CA and characterized by the blade section 360 having a generally planar inner wall 366 that is suited for trimming or cutting thicker layers of material from an object to be trimmed (e.g., cutting or trimming a layer of fat or meat from an animal carcass). The generally planar inner wall 366 of the blade section 360 comprises a lower part of the inner wall 306 of the rotary knife blade 300. Other rotary knife blade styles, such as hook blade and straight blade styles, are suitable for use with the power operated rotary knife 100 and the present disclosure contemplates differing styles and sizes of rotary knife blades and associated blade housing for rotational support of such differing blades. An explanation of differing rotary knife blade styles is found in the aforementioned U.S. Pat. No. 8,726,524 to Whited et al., which is assigned to the assignee of the present invention and is incorporated herein in its entirety by reference. The rotary knife blade 300 is, in one exemplary embodiment, a large diameter rotary knife blade having an outer diameter exceeding four inches. In one exemplary embodiment, the rotary knife blade has a maximum outer diameter ODB of 5.16 in.

The annular body 310 includes an upper end 312, which corresponds to the upper end 302 of the rotary knife blade 300, and an axially space apart lower end 314, which defines a boundary between the body 310 and the blade section 360. The upper annular body 310 further includes an inner wall 316, defining a portion of the blade inner wall 306, and, spaced radially outwardly (that is in a radial direction away from the blade axis of rotation R) from the inner wall 316 is the outer wall 318 of the body 310. The outer wall 318 of the body 310 defines a portion of the blade outer wall 308. The outer wall 318 of the body 310 comprises three regions or portions, an upper portion 318a adjacent the upper end 312 of the body 310, a middle portion 318b, and a lower portion 318c adjacent the lower end 314 of the body 310. The upper portion 318a of the outer wall 318 of the blade annular body 310 includes a radially inwardly extending annular bearing region or groove 320. The middle portion 318b of the outer wall 318 includes an annular land 350 that defines a maximum outer diameter ODBB of the blade annular body 310 and, because the rotary knife blade 300 is a flat blade style rotary knife, also defines the maximum outer diameter of the rotary knife blade 300. The lower portion 318c of the outer wall 318 of the blade annular body 310 defines the annular driven gear 340 and an annular boss 348 at the lower end 314 of the body 310.

In one exemplary embodiment, the bearing region 320 of the rotary knife blade 300 comprises the annular bearing race 322 that extends radially inwardly, that is, in a direction toward the central axis of rotation R of the rotary knife blade 300, in the upper portion 318a of the body outer wall 318. The annular driven gear 340, which comprises a driven gear region 340a, extends radially inwardly in the lower portion 318c of the body outer wall 318. Both the bearing race 322 and the driven gear 340 are axially spaced from the upper end 302 of the body 310 of the blade 300 and from each other. Both the bearing race 322 and the driven gear 340 are formed into or machined into a radially outermost extent of the outer wall 318 of the blade body 310 (as defined by the annular land 350) and define portions of the body outer wall 318.

The blade section 360 of the rotary knife blade 300 includes an upper end 362, which defines the boundary between the body 310 and the blade section 360, and an axially spaced apart lower end 364. The lower end 364 of the blade section 360 includes the cutting edge 361 of the rotary knife blade 300. The knife blade section 360 includes an inner wall 366, defining a portion of the blade inner wall 306, and a radially spaced apart outer wall 368, defining a portion of the blade outer wall 308. The inner and outer walls 366, 368 are generally parallel and, when viewed in three dimensions define a pair of radially spaced apart frustoconical surfaces 366a, 369a centered about the blade central axis of rotation R. The cutting edge 361 defines a circular or cutting opening CO of the rotary knife blade 300 through which trimmed or cut material passes. Additionally, the cutting edge 361 defines the cutting plane CP of the rotary knife blade 300. The blade cutting plane CP is substantially orthogonal to the blade central axis of rotation R. Cut or trimmed material flows or moves from the cutting edge 361 through the cutting opening CO, along the inner wall 306 of the rotary knife blade 300, that is, along the inner wall 366 of the blade section, then along the inner wall 316 of the annular body 310, in a generally upward direction UP from the cutting edge 361 to a circular exit opening EO defined by a vertex 313 between the inner wall 316 of the body 310 and the upper end 312 of the body 310. In one exemplary embodiment of the rotary knife blade 300, the cutting opening CO is approximately 4.42 in. The vertex 313 also defines the intersection between the inner wall 306 and the upper end 302 of the rotary knife blade 300. The cutting edge 361 is formed at the intersection of the inner wall 366 and a short horizontal region 370 bridging the inner and outer walls 366, 368 of the blade section 360. The short horizontal region 370 defines both the lower end 364 of the blade section and the lower end 304 of the rotary knife blade 300.

Turning to the annular body 310 of the rotary knife blade 300, as discussed above, the outer wall 318 of the blade annular body 310 includes three portions, the upper portion 318a, the middle portion 318b, and the lower portion 318c. The upper portion 318a includes the annular bearing region or groove 320, defining, in one exemplary embodiment, the radially inwardly extending annular bearing race 322. The lower portion 318c includes the annular driven gear 340. The middle portion 318b is located between and axially spaces the bearing race 322 from the driven gear 340. The middle portion 318b includes the annular, radially outwardly extending protuberance or land 350. The annular land 350 defines a radially or horizontally extending projection 351 that includes a vertical outer wall section 318d. The vertical outer wall section 318d defines a radial, cylindrical-shaped outer surface 352 of the annular land 350. The outer surface 352 of the annular land 350, in turn, defines the outer diameter ODBB, that is, the largest diameter, of the annular body 310 and the outer diameter ODB of the rotary knife blade 300. The annular land 350 is further defined by includes an upper, radially extending substantially horizontal section 318e of the outer wall 318 and a lower, radially extending substantially horizontal section 318f of the outer wall 318. The upper and lower horizontal sections 318e, 318f of the annular land 350 define upper and lower ends 354, 356 of the annular land 350, respectively. The upper and lower horizontal sections 318e, 318f of the annular land 350 are axially spaced by the vertical outer wall portion 318d and a pair of angled transition surfaces 318g, 318h of the outer wall middle portion 318b bridging the vertical outer wall portion 318d and the respective upper and lower horizontal sections 318e, 318f.

In one exemplary embodiment, the bearing region 320 of the rotary knife blade 300 comprises the annular bearing race or groove 322 that extends inwardly, that is, in a direction toward the central axis of rotation R of the rotary knife blade 300, into an upper, substantially vertical (when viewed in two dimensions) or cylindrical (when viewed in three dimensions) section 318k of the upper portion 318a of the body outer wall 318. When viewed in a section view, the bearing race 322 defines a generally V-shaped opening 323 extending radially into the vertical, cylindrical section 318k of the upper portion 318a of the outer wall 318 of the blade body 310. The V-shaped opening 323 is defined by angled or sloped upper region 324 and an axially spaced apart angled or sloped lower region 325 of the outer wall 318 of the blade body 310. The angled upper and lower regions 324, 325 of the V-shaped opening 323 define generally frustoconical upper and lower bearing surfaces 326, 327 of the rotary knife blade 300. As can best be seen in FIG. 14, the upper bearing surface 326 converges in a direction proceeding toward the lower bearing surface 327 and, similarly, the lower bearing surface 327 converges in a direction proceeding toward the upper bearing surface 326. Portions of the respective bearing surface 326, 327 of the annular bearing race 322 are contacted by bearing faces 466a, 466b of the blade housing bearing bead 462 to define the blade—blade housing bearing structure 550. In one exemplary embodiment, the bearing faces 466a, 466b of the blade housing bearing bead 462 comprise generally frustoconical upper and lower bearing faces that converge in a direction proceeding toward each other. As is best seen in FIG. 10, the bearing faces 466a, 466b of the blade housing bearing bead 462 substantially match the respective angles or slopes of the upper and lower bearing surfaces 326, 327. Stated another way, when viewed in two dimensions (such as the section view of FIG. 10), the frustoconical bearing faces 466a, 466b of the blade housing bearing bead 462 comprise substantially flat, angled, converging bearing surfaces 465a, 465b which substantially match the respective angles or slopes of the frustoconical upper and lower bearing surfaces 326, 327 of the rotary knife blade 300. Advantageously, the matching angles or slopes of the frustoconical bearing faces 466a, 466b of the blade housing bearing bead 462 and respective the frustoconical upper and lower bearing surfaces 326, 327 of the rotary knife blade 300 provides for increased stability and reduced vibration of the rotary knife blade 300 as it rotates about the central axis of rotation R within the blade housing 400. Portions of the upper and lower bearing surfaces 326, 327 contacted by the frustoconical bearing faces 466a, 466b of the blade housing bearing bead 462 are referred to as upper and lower bearing faces 329a, 329b. In one exemplary embodiment, the bearing surfaces 326, 327 are flat, defining frustoconical surfaces when viewed in three dimensions. Similarly, the bearing faces 329a, 329b are flat, defining frustoconical surfaces when viewed in three dimensions.

Extending between and bridging the upper region 324 and the lower region 325 of the outer wall 318 is a short generally arcuate region or central surface 328 of the bearing race 322 of the outer wall 318. A vertex or center 328a of the central surface 328 defines a radially innermost point of the bearing race 322, that is, the vertex 328a defines a minimum inner diameter of the bearing race 322, as measured radially with respect to the blade central axis of rotation R. The vertex 328a of the annular bearing race 322 is radially outward of the cylindrical top 345 of the driven gear. Stated another way, as can best be seen in FIG. 14, the minimum inner diameter IDBR of the bearing race 322 is radially outward (i.e., radially further away from the blade central axis of rotation R) of a maximum outer diameter ODDG of the driven gear 340. As noted above, the first upper bearing surface 326 and the axially spaced apart second lower bearing surface 328 converge radially inwardly toward each other and toward the central surface 328 bridging the first and second bearing surfaces 326, 328. The central surface 328 defines the radially innermost region of the annular bearing race 322.

At an upper end 330, the V-shaped bearing race 322 terminates at an upper transition point 318l between the vertical or cylindrical section 318k and the upper bearing surface 326. At a lower end 332, the V-shaped bearing race 322 terminates at a lower transition point 318m that is at an intersection of a vertical line VBL extending from the vertical section 318k and the lower bearing surface 327. A short angled section 318n of the upper portion 318a of the outer wall 318 bridges between the lower transition point 318m of the annular bearing race 322 and the upper horizontal section 318e of the annular land 350. The short angle section 318n provides an axial clearance region between a generally horizontal lower side 464 of the blade housing bearing bead 462 and the upper end 354 of the annular land 350. Thus, the lower end 332 of the annular bearing race 322 is axially spaced from the upper end 354 of the annular land 350. When viewed in three dimensions, the bearing race 322 defines an annular volume 335. The annular volume 335, when viewed in section view, is generally triangular, with a base 331 of the triangle being the vertical line VBL extending between the upper end 330 and the lower end 332 of the bearing race 322. The horizontal section 318e of the annular body outer wall 318 defines a boundary between the upper portion 318a of the outer wall 318, which includes the bearing race 322, and the middle portion 318b of the outer wall 318, which includes the annular land 350. Stated another way, the outer wall 318 includes the short angled section 318n, the horizontal section 318e of the outer wall 318, and the angled transition section 318g, which extend generally radially outwardly and slightly axially downwardly between the lower end 332 of the annular bearing race 322 and the outer radial surface 352 of the annular land 350. The substantially horizontal section 318e of the outer wall 318 of the body 310 defines the upper end 354 of the annular land 350 and extends between a lower end 332 of the annular bearing race 322 and the radially outer surface 352 of the annular land 350.

Both the bearing race 322 and the driven gear 340 are axially spaced from the upper end 312 of the body 310 of the rotary knife blade 300 and are axially spaced from each other by the annular land 350. Both the bearing race 322 and the driven gear 340 are formed into or machined into the upper and lower portions 318a, 318b of the outer wall 318 of the blade body 310, respectively. The bearing race 322 and the driven gear 340 form or define portions of the outer wall 318 of the blade body 310, as does the annular land 350 and as does the stepped boss 348 disposed axially below the driven gear 340. Advantageously, the radially outwardly projection of the annular land 350, defining the radially outermost diameter or surface ODB of the rotary knife blade 300 and its position between or intermediate the bearing race 322 and the driven gear 340 mitigates the ingress of debris generated at the cutting edge 361 into the blade—blade housing bearing structure 500, as comprised by the blade bearing race 322 and the blade housing bearing bead 462. Stated another way, the radially outward projection 351 of the annular land 350 includes the radially outer surface 352 that defines the radially outermost diameter or surface ODBB of the annular body 310 and the outermost diameter ODB of rotary knife blade 300. The fact that the annular land 350 is positioned intermediate the bearing race 322 and the driven gear 340 inhibits debris which may have worked their way into the driven gear region 340a from moving upwardly into the blade—blade housing bearing structure 500 and, specifically, into the radially inwardly extending blade bearing race 322. Similarly and advantageously, the radially outward projection 351 defined by the annular land 350 inhibits debris which may have worked their way into the blade—blade housing bearing structure 500 from moving downwardly into the driven gear 340. The annular land 350 of the rotary knife blade 300 is received into a mating annular recess or channel 470 of the inner wall 452 of the blade support section 450 of the blade housing 400. The interfitting of the blade annular land 350 into the annular channel 470 of the blade housing advantageously defines a labyrinth seal that mitigates or inhibits the egress of debris from the rotary knife blade driven gear region 340a into the blade—blade housing bearing structure 550 and similarly mitigates or inhibits the egress of debris from the blade—blade housing bearing structure 550 into the rotary knife blade driven gear region 340a.

Additionally, the annular land 350 of the rotary knife blade 300 advantageously serves to limit, by a hard stop, axial movement of the blade 300 within the blade housing 400. The blade housing 400 is a split blade housing to allow for expansion of the blade housing for the purpose of changing rotary knife blades. As explained above, sufficient operating or running clearance is necessary so that rotary knife blade 300 rotates relatively freely within the blade housing 400 reducing friction and thereby reducing heat generated in the blade—blade housing bearing interface region 520. However, if too great of an operating or running clearance is provided, that is, the diameter of the blade housing 400 is too great, for example, because the operator did not adjust the blade housing diameter appropriately when changing rotary knife blades or for some reason during use of the power operated rotary knife 100, the blade housing diameter increased causing the blade 300 to be excessively loose within the blade housing 400, the annular land 350 functions as a hard stop to prevent excessive axial movement of the blade 300 within the blade housing 400. That is, as explained above the blade annular land 350 is received in or interfits in the annular channel 470 of an inner wall 452 of the blade support section 450 of the blade housing 400. The generally sideways U-shaped annular channel 470 is formed by a horizontal upper ledge 471, a vertical wall 472 and a horizontal lower ledge 474. When viewed in section, the channel 470 defines an interior region 470a that is generally rectangular. Excessive movement of the blade 300 with respect to the blade housing 400 in an axial upward direction UP would be stopped by contact or a hard stop between the upper end 354 of the annular land 350 and the horizontal upper ledge 471 defining the annular channel 470. Excessive movement of the blade 300 with respect to the blade housing 400 in an axial downward direction DW would be stopped by contact between the lower end 356 of the annular land 350 and the horizontal lower ledge 474 of the blade housing annular channel 470.

The driven gear 340 includes a plurality or set of circumferentially spaced apart gear teeth 341. The individual teeth 342 of set of gear teeth 341 of the driven gear 340 extend radially outwardly from a cylindrical root or base or inner surface 343 defined by a bottom land 344 between adjacent gear teeth 343 to a cylindrical top or outer surface 345 defined by the respective top lands 346 of the set of gear teeth 341. The cylindrical top or outer surface 345 defined by the top lands 346 defines a radially outermost surface or region 345a of the driven gear 340, that is, the cylindrical top 345 defines the maximum outer diameter ODDG of the driven gear 340, as measured radially with respect to the blade central axis of rotation R. Stated another way, the annular driven gear 340 includes an inner surface or base 343 and a radially spaced apart outer surface or top 345, the outer surface or top 345 defining the radially outermost surface or region 345a of the annular driven gear 340. The outer surface 345a of the annular driven gear 340 is radially inward of the vertex 328a of the central surface 328 of the annular bearing race 322.

Figure 14:
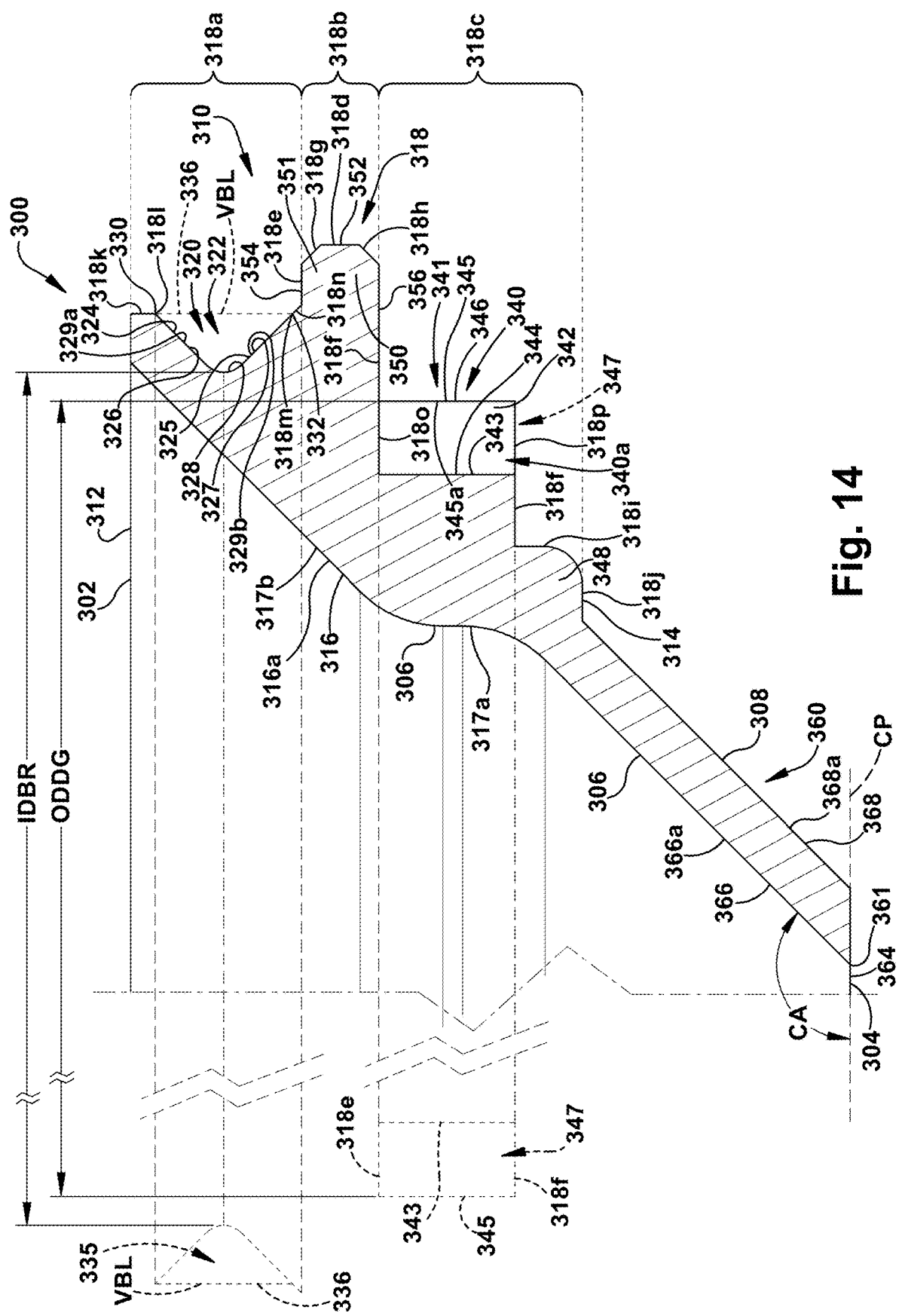
FIG. 14 is a schematic enlarged section view of a portion of the annular rotary knife blade of FIG. 11.
Figure 15:
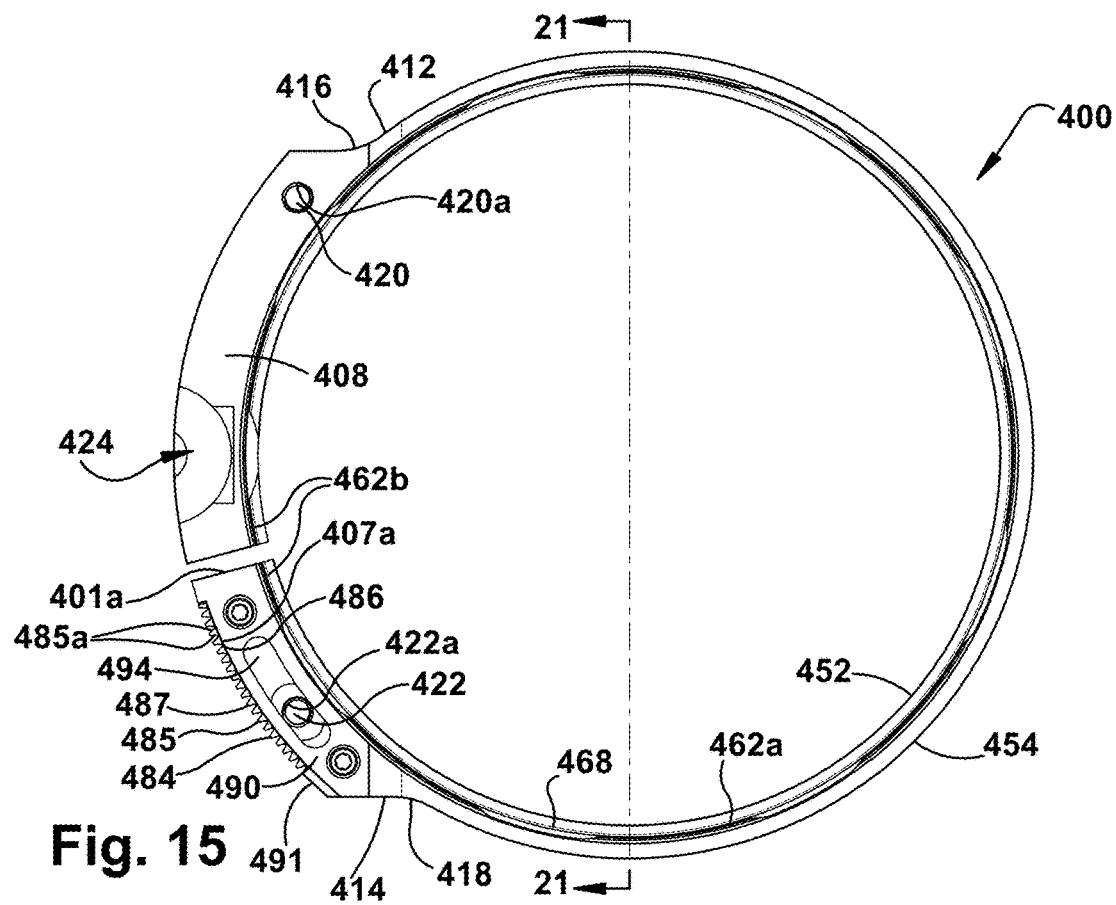
FIG. 15 is a schematic top plan view of the annular split ring blade housing of the head assembly of the power operated rotary knife of FIG. 1.

The driven gear 340 includes an upper end 349a and an axially spaced apart lower end 349b corresponding to a substantially horizontal upper section 318o and a substantially horizontal lower section 318p of the lower portion 318c of the outer wall 318 of the body 310. As such, as schematically shown in FIG. 14, when viewed in three dimensions, the driven gear 340 defines an annular volume 347 bounded by the cylindrical base 343 on a radially inner side, the cylindrical top 345 on a radially outer side, the horizontal upper section 318o on an axially upper side or end 349a and the horizontal lower section 318p on an axially lower side or end 349b of the driven gear 340. The cylindrical top 345 of the driven gear 340 is defined by a substantially vertical section 318q of the outer wall 318. The substantially horizontal section 318f of the outer wall 318 which defines the lower end 356 of the annular land 350 is radially aligned with and continues from the horizontal upper section 318o defining the upper end 349a of the driven gear 340. As best seen in FIG. 14, the annular volume 347 defined by the drive gear 340, when viewed in section view, is generally rectangular. The annular volume 347 of the driven gear 340 is bounded by the cylindrical root 343 and the cylindrical top 345 of the driven gear 340 and by the horizontal upper and lower sections 318o, 318p of the outer wall 318 of the blade body 310. In one exemplary embodiment, the driven gear 340 comprises a spur gear wherein the set of gear teeth 341 are involute gear teeth, that is, the profiles of the gear teeth 342 are involutes of a circle. Being a spur gear, the driven gear 340 is cylindrical or disc-shaped and the teeth 342 of the driven gear 340 project radially outwardly with respect to the blade central axis of rotation R. Viewed axially, the wall or edge of each tooth 342 is straight and aligned with the blade central axis of rotation R. The configuration of the rotary knife blade 300, wherein the set of gear teeth 341 of the driven gear 340 are both axially spaced from the upper end 312 of the knife blade body 310 and inwardly offset from the outermost extent 352 of the blade body outer wall 318 is sometimes referred to as a "blind gear tooth" configuration. Advantageously, the driven gear 340 of the rotary knife blade 300 of the present disclosure is in a relatively protected position with respect to the knife blade body 310. That is, the driven gear 340 is in a position on the knife blade body 310 where there is less likely to be damage to the set of gear teeth 341 during handling of the rotary knife blade 300 and, during operation of the power operated rotary knife 100, there is less ingress of debris, such as small pieces fat, meat, bone and gristle generated during cutting and trimming operations, into the gear teeth region 340a. The horizontal section 318f of the outer wall 318 extends substantially horizontally or radially outwardly from the upper end 349a of the driven gear 340 and defines the lower end 356 of the annular land 350. In one exemplary embodiment, the driven gear outer diameter ODDG is 5.00 in. and the driven gear 340 comprises a spur gear with 158 gear teeth, a 32 diametrical pitch and a 20° pressure angle. In one exemplary embodiment, an overall axial height of the rotary knife blade 300 is approximately 0.500 in.

A section of the lower portion 318c of the body outer wall 318 axially below the driven gear 340 defines the radially inwardly stepped boss 348. The boss 348 is defined by a vertical section 318i of the outer wall 318, which defines a radially outer surface of the boss 348, and a horizontal section 318j, which defines the lower end 314 of the annular body 310. Debris generated at the cutting edge 361, by virtue of the rotation of the blade 300 and the movement of the blade 300 through the material being cut or trimmed, tends to move upwardly along the outer wall 368 of the blade section 360. Advantageously, the horizontal section 318j of the boss 348 impedes the movement of such debris along the outer wall 368 of the blade section 360 from entering into the region of the driven gear 340. Similarly, as stated above, the horizontal projection 351 defined by the annular land 350 advantageously impedes movement of debris along the outer wall 318 of the annular body 310 moving from the region of the driven gear 340 to the region of the blade bearing race 322 and vice versa. Stated another way, the relationship of the respective diameters of the bearing race 322 and the driven gear 340 wherein the outer diameter ODDG of the driven gear 340 is less than the inner diameter IDBR of the bearing race 322, together with the radial extent of the intermediate annular land 350 defining the maximum outer diameter ODB of the rotary knife blade 300 and the maximum outer diameter ODBB of the annular body 310 advantageously inhibits the ingress of debris into the blade bearing race 322 that are generated at the cutting edge 361. The radially outer surface 352 of the annular land 350 is radially outward of the outer surface 345a of the annular driven gear 340 and radially outward of the upper and lower ends 330, 332 of the annular bearing race 322. The inner surface 343 of the driven gear is radially outwardly spaced from the vertical, radially outer wall 318i of the boss 348.

The inner wall 306 of the rotary knife blade 300 is generally frustoconical to provide for smooth movement of cut or trimmed material in an upward direction UP from the cutting opening CO defined by the blade cutting edge 361 to the exit opening EO defined by the upper end 312 of the blade annular body 310. In the blade section 360 of the rotary knife blade 300, the inner and outer walls 366, 368 are generally parallel and define substantially frustoconical surfaces 366a, 368a, respectively. The inner wall 366 extends from the cutting edge 361 upwardly and outwardly along a generally straight line at an angle defined by the blade cutting angle CA. In the annular body section 310 of the rotary knife blade 300, the inner wall 316 includes a lower generally S-shaped vertically oriented transition portion 317a and an upper linear portion 317b. By virtue of the S-shaped transition portion 317a, the upper linear portion 317b of the inner wall 316 of the annular body 310 is radially offset inwardly from an extent of the linear inner wall 366 of the blade section 360. The upper linear portion 317b does, however, extend upwardly and outwardly along a generally straight line at an angle with respect to the cutting plane CP that is substantially the same as the blade cutting angle CA (FIG. 14). Thus, the upper linear portion 317b of the body inner wall 316 is substantially parallel to the inner wall 366 of the blade section 360. Stated another way, the inner wall 316 of the body 310 includes or defines the substantially frustoconical surface 316a. The frustoconical surface 316a of the inner wall 316 of the body 310 is substantially parallel to and but radially offset from the frustoconical surface 366a of the inner wall 366 of the blade section 360. As discussed elsewhere, other rotary knife blades styles, configurations, and sizes may also be used with the power operated rotary knife 100.

Blade Housing 400

Figure 16:
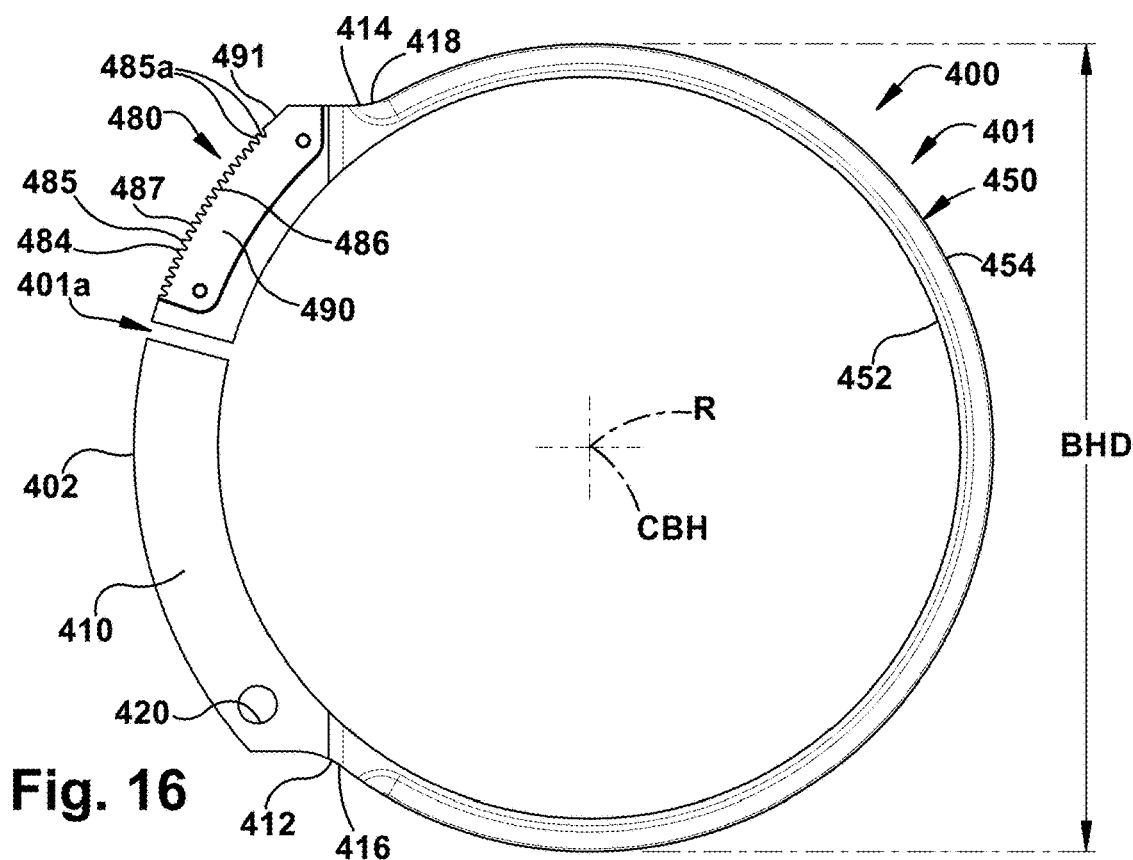
FIG. 16 is a schematic bottom plan view of the annular blade housing of FIG. 15.
Figure 17:
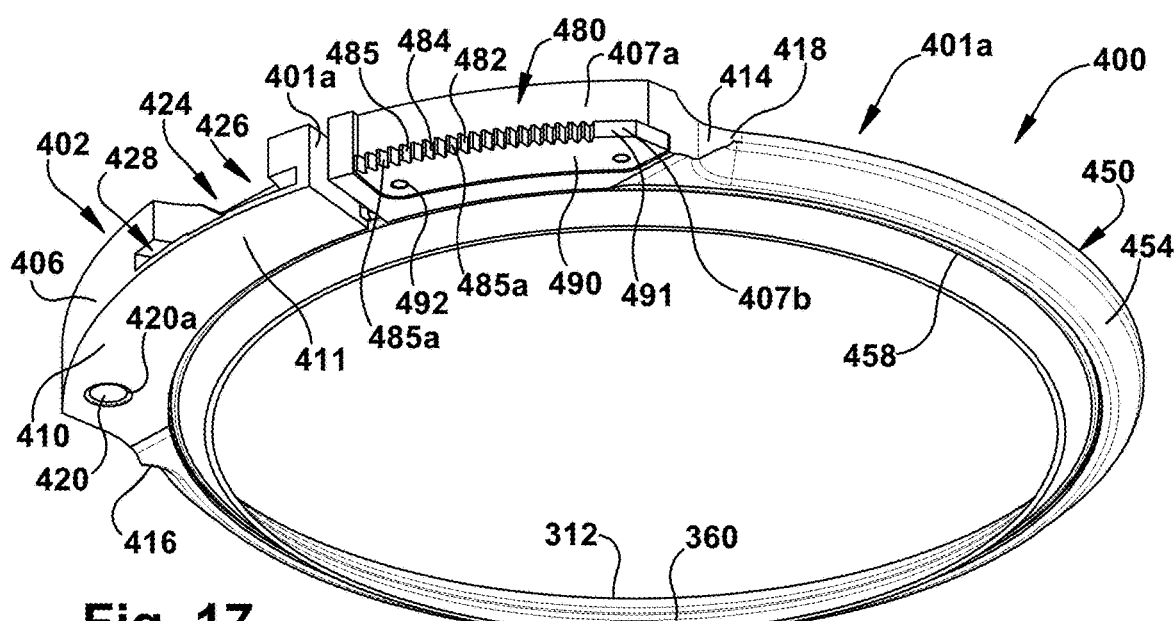
FIG. 17 is a schematic bottom perspective view of the annular blade housing of FIG. 15 showing a blade housing diameter adjustment mechanism of the blade housing.

In one exemplary embodiment of the present disclosure, the blade housing 400, that is, the annular split ring 401, includes the mounting section 402 and the blade support section 450. The blade support section 450 extends around the entire 360 degrees (360°) circumference of the blade housing 400. The blade support section 450, including inner and outer walls 452, 454 of the blade support section 450, is centered about a center line CBH (FIGS. 16 and 19). When in assembled combination 500 with the rotary knife blade 300, the blade housing center line CBH is substantially coincident with the rotary knife blade central axis of rotation R. Stated another way, in assembled combination 500, the rotary knife blade 300 and the blade support section 450 of the blade housing 400 are substantially concentric with the rotary knife blade central axis of rotation R. The mounting section 402 extends radially outwardly from the blade support section 450 and subtends an angle of approximately 120°. Stated another way, the blade housing mounting section 402 extends approximately ⅓ of the way around the circumference of the blade housing 400. In the region of the mounting section 402, the mounting section 402 and the blade support section 450 overlap. The mounting section 402 is both axially thicker and radially wider than the blade support section 450. The blade housing mounting section 402 includes an inner wall 404 and a radially spaced apart outer wall 406 and a first upper end 408 and an axially spaced apart second lower end 410. The split 401a of the blade housing 400 extends from the inner wall 404 through the outer wall 406 of the mounting section 402 to allow for expansion of the blade housing circumference or blade housing diameter BHD or blade housing circumference. Advantageously, a blade housing 400 includes a blade housing diameter expansion mechanism 480 that provides an efficient and precise way for an operator of the power operated rotary knife 100 to expand or contract the diameter of the blade housing 400 for either changing the operating/running clearance of the rotary knife blade 300 within the blade housing 400 or for the purpose of changing the rotary knife blade 300.

As can best be seen in FIGS. 15-22, the mounting section 402 is both axially thicker and radially wider than the blade support section 450. At forward ends 412, 414 of the mounting section 402, there are tapered regions 416, 418 that transition between the upper end 408, lower end 410 and outer wall 406 of the mounting section and the corresponding upper end 456, the lower end 458 and an outer wall 454 of the blade support section 450. The blade housing mounting section 402 includes a first fixed mounting insert 420 and a second movable mounting insert 422 which is slidably captured within an expansion slot 423 formed in the blade housing mounting section 402. The expansion slot 423 is generally oval and slightly arcuate in top plan view. The fixed mounting insert 420 and the moveable mounting insert 422 are spaced circumferentially and are on opposite sides of the blade housing split 401a. The movable mounting insert 422 and the expansion slot 423 are part of the blade housing diameter expansion mechanism 480. The stationary mounting insert 420 extends between the upper and lower ends 408, 410 of the mounting section 402m. The sliding mounting insert 422, which is captured in the expansion slot 423, extends between the upper end 408 of the mounting section 402 and an upper surface 494 of an arcuate plate 490 of a blade housing diameter mechanism 480. The mounting inserts 420, 422 define threaded openings 420a, 422a. The blade housing mounting section 402 is received in a seating region 252a defined by the arcuate mounting pedestal 252 of the frame body 250 and is secured to the frame body 250 by a pair of threaded fasteners 170, 172. Specifically, when the blade housing mounting section 402 is seated in the seating region 252a of the frame body 250, a portion of the upper end 408 of the mounting section 402 seats against an upper wall 276 (FIG. 28) of the frame mounting pedestal 252, a portion of the upper end or upper wall 408 of the mounting section 402 seats against an inner wall 274 of the frame mounting pedestal 252, and a central portion 411 of the lower end or lower wall 410 of the mounting section 402 seats against a lower wall 278 of the frame mounting pedestal 252. The lower wall 278 of the frame mounting pedestal 252 is defined by a distal or forward portion 283 of a central rectangular base 280 of the frame body 250. The pair of threaded fasteners 270, 272 extend through threaded openings 260a, 262a defined in a pair of arcuate arms 260, 262 of the frame body 250 and thread into the threaded openings 420a, 422a of the blade housing mounting inserts 420, 422 to releasably secure the blade housing 400 to the frame body 250 and, thereby, couple the blade housing 400 to the gearbox assembly 210 of the head assembly 200.

The expansion slot 423 includes an upper, inwardly extending ledge 423a adjacent the upper end 408 of the mounting section 402. This ledge 423a limits axially upward movement of the movable mounting insert 422 within the expansion slot 423. Downward axial movement of the movable mounting insert 422 is limited by the upper surface 494 of the arcuate plate 490 of the blade housing diameter adjustment mechanism 480. As the threaded fastener 272 is tightened, the mounting insert 422 is pulled upwardly and bears against the inwardly extending ledge 423a of the expansion slot 423. The mounting insert 422 is thus held stationary within the expansion slot 423 by the drawing action of the threaded fastener 272. When both fasteners 270, 272 are fully tightened, the blade housing mounting section 402 (and, thus, the blade—blade housing combination 500) is firmly secured to the arcuate arms 260, 262 of the frame body 250.

The mounting section 402 further includes a gearing recess 424 that extends radially between the inner and outer walls 404, 406. The gearing recess 424 includes an upper clearance recess 426 that does not extend all the way to the inner wall and a wider lower opening 428 that extends between and through the inner and outer walls 404, 406. The upper clearance recess 426 provides clearance for the pinion gear 610 and an axially oriented first bevel gear 652 of the double drive gear 650. The lower opening 428 is sized to receive the radially extending second spur gear 654 of the gearbox double drive gear 650 and thereby provide for the interface or meshing of the second spur gear 654 and the driven gear 340 of the rotary knife blade 300 to rotate the knife blade 300 with respect to the blade housing 400.

Figure 50:
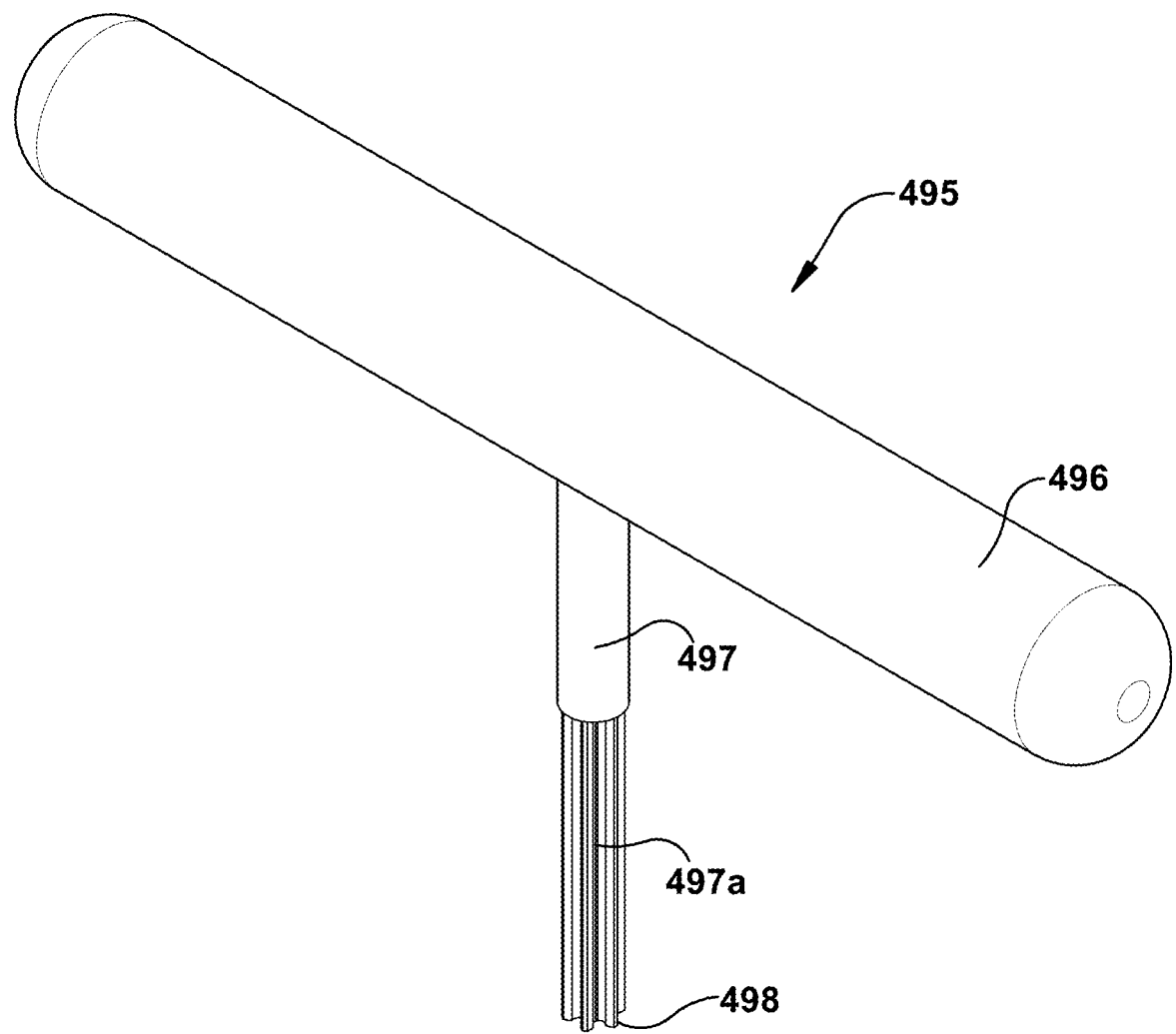
FIG. 50 is a schematic front elevation view of a hand expansion tool used in conjunction with a blade housing diameter adjustment mechanism of the blade housing of either FIG. 15 or 43 for the purpose of expanding a diameter for the blade housing to facilitate removal of the annular rotary knife blade from the blade housing.

Advantageously, the blade housing 400 and, specifically, the blade housing mounting section 402 includes the blade housing diameter adjustment mechanism 480 (best seen in FIGS. 15-18) of the present disclosure to allow the operator to quickly and precisely expand and contract the blade housing diameter for the purpose of removing one rotary knife blade and replacing it with another rotary knife blade and to allow the operator to precisely and quickly adjust the blade housing diameter to provide for proper operating or running clearance for the blade—blade housing bearing interface structure 550. When a new rotary knife blade 300 is installed in the blade housing 400, using the blade housing diameter mechanism 480 and a coacting hand tool 495 (FIG. 50), the diameter of the split blade housing 400 may be precisely adjusted by the operator such that an appropriate amount of operating or running clearance is provided between the rotary knife blade annular bearing race 322 and the blade housing bearing bead 462 such that the blade 300 rotates relatively freely within the blade housing 400, but without undue looseness with could result in undesirable blade vibration.

Figure 18:
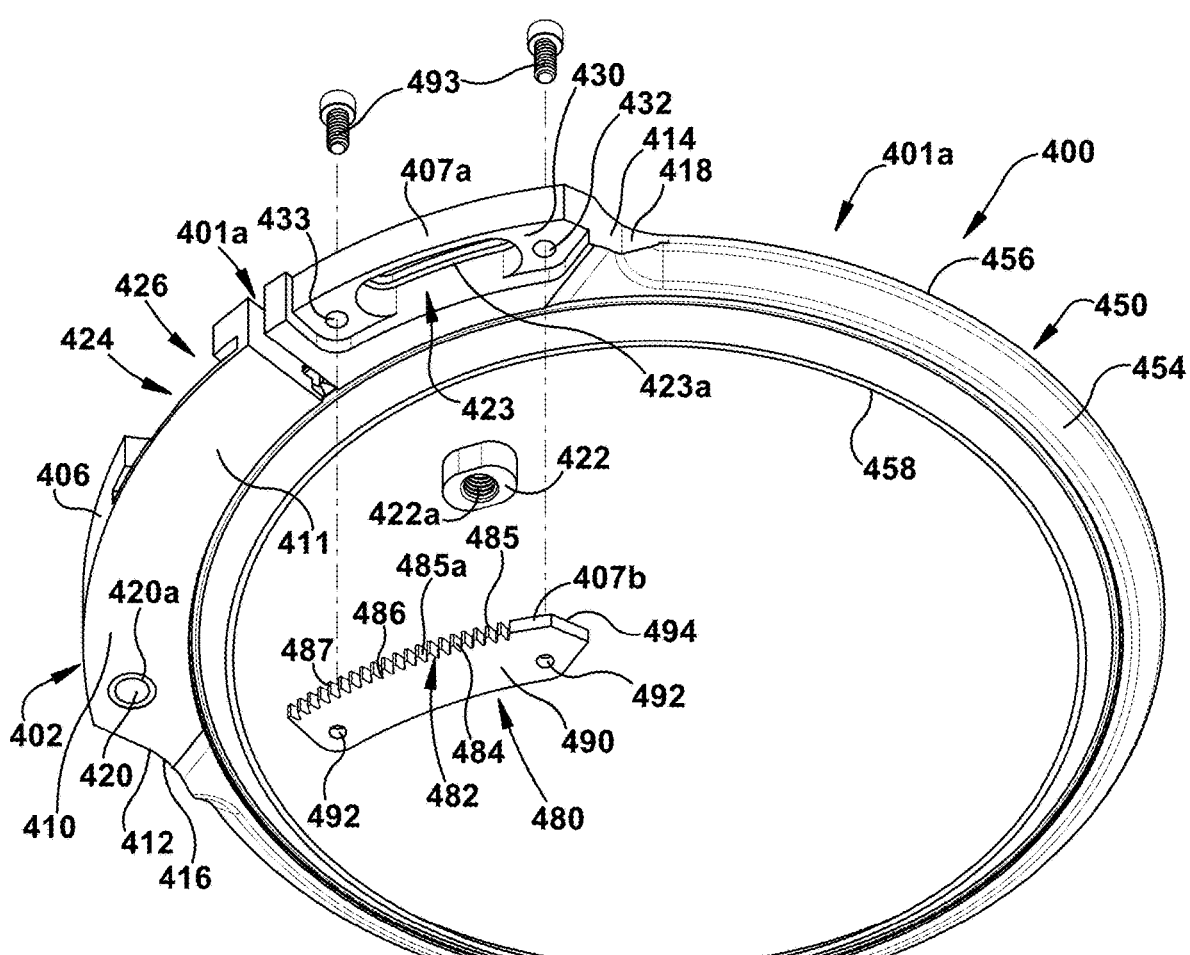
FIG. 18 is a schematic bottom plan view of the annular blade housing of FIG. 15 with the blade housing diameter adjustment mechanism in exploded perspective view.
Figure 22:
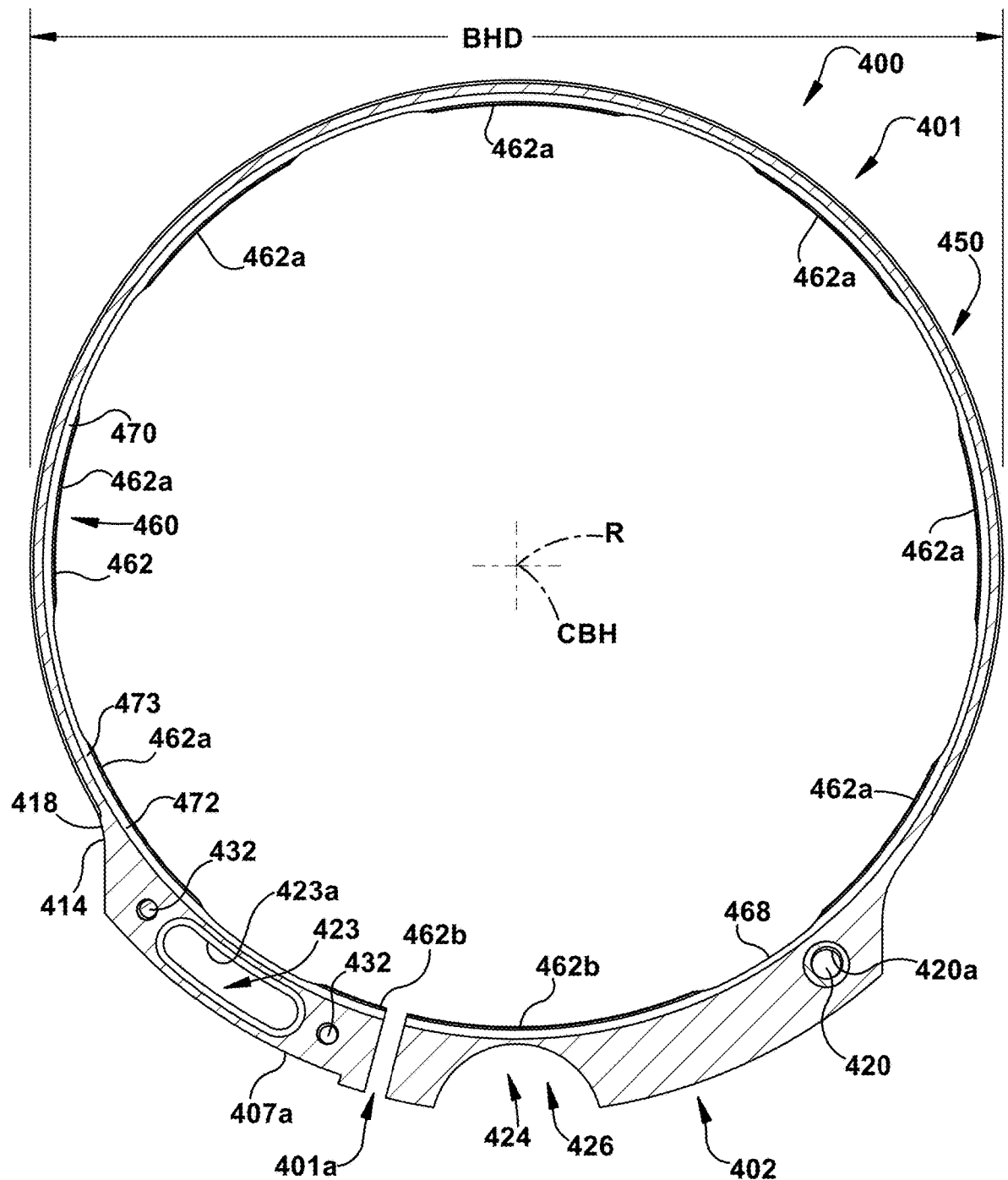
FIG. 22 is a schematic horizontal section view of the annular blade housing of FIG. 15 as seen from a plane indicated by the line 22-22 in FIG. 19.

The blade housing diameter adjustment mechanism 480 includes a circumferentially extending, arcuate gear section 482 defining a lower portion 407b of the outer wall 406 of the mounting section 402. The arcuate gear section 482, positioned on one side of the blade housing split 401a, comprises a set of radially outwardly extending spur gear teeth 484. The arcuate gear section 482 is adjacent the lower end 458 of the mounting section 402. The individual teeth 485 of set of gear teeth 484 of the arcuate gear section 482 extend radially outwardly from a cylindrical root or base or inner surface 486 defined by a bottom land between adjacent gear teeth 485 to a cylindrical top or outer surface 487 defined by the respective top lands of the set of gear teeth 484, defining a spur gear. Viewed axially, and as best seen in FIGS. 16 and 18, each tooth 485 of the set of gear teeth 484 includes a pair of converging gear tooth faces or walls 485a. Each of the gear tooth faces 485a of each tooth 485 of the set of gear teeth 484 is straight and extends axially in a direction that is substantially parallel to the blade housing center line CBH, which is coincident with the blade central axis of rotation R, in the assembled blade—blade housing combination 500. The arcuate gear section 482, including both the inner and outer surfaces 486, 487 of the arcuate gear section 482, extend radially outwardly of an upper portion 407a of the outer wall 406 of the mounting section 402 that is disposed axially above the arcuate gear section 482.

The hand tool 495 is provided to actuate the blade housing diameter adjustment mechanism 480 to adjust the blade housing diameter. The hand tool 496 includes a handle 496 and a shaft 497 extending axially from the handle 496. A lower end portion 497a of the shaft 497 defines a spur gear head 498 sized to engage and mesh with the set of spur gear teeth 484 of the arcuate gear section 482.

The radially recess of the upper portion 407a of the outer wall 406 with respect to the arcuate gear section 482 provides for clearance such that the spur gear head 497 of the hand tool 495 can clear the upper portion 407a and, when moved axially downwardly through an axial throughbore 265 (FIG. 3) of the arcuate arm 262 of the frame body 250, can engage the arcuate gear section 482. To expand or contract the diameter of the blade housing 400 using the hand tool 495, the operator must first sufficiently loosen the threaded fastener 272 which passes through the arcuate arm 262 of the frame body 250 and threads into the threaded opening 422a of a sliding mounting insert 422. After loosening the threaded fastener 272, the operator then positions the hand tool 495 such that the shaft 487 of the hand tool 495 is axially aligned with the axial throughbore 265 of the arcuate arm 262 of the frame body 250. The operator moves the hand tool 495 axially downward so that the spur gear head 497 of the hand tool shaft 497 passes by the upper portion 407a of the outer wall 407 and moves downwardly to engage and mesh with the arcuate gear section 482 of the mounting section 402. The operator then appropriately rotates the handle 496 clockwise or counterclockwise to expand or contract the blade housing diameter, as desired. Rotation of the handle 496 of the hand tool 495 causes rotation of the spur gear head 497 and corresponding arcuate movement of the arcuate gear section 482 of the blade housing 400 along an outer circumference defined by the outer wall 406 of the blade housing mounting section. Depending on a direction of rotation of the handle 496, the blade housing diameter is quickly and precisely expanded or contracted.

Advantageously, because of the radially outwardly arcuate gear section 482 defines a spur gear, the insertion of the hand tool 495 is from above the blade housing 400. This orientation and position of the hand tool 495 with respect to the handle assembly 110 and the blade housing 400 allows the operator to easily and securely grasp the handle assembly 110 of the power operated rotary knife 100 with one hand, while positioning and rotating the hand tool 495 to adjust the blade housing diameter with the other hand. Additionally, the operator, looking down on the power operated rotary knife 100 from what is essentially a top plan view (FIG. 3) has a clear view of the changing of the blade housing diameter, as the operator rotates the handle 496 of the hand tool 495 from above the power operated rotary knife 100.

In one exemplary embodiment, the arcuate gear section 482 is formed in an outer peripheral wall 491 of an arcuate plate 490 of the blade housing diameter adjustment mechanism 480. The arcuate plate 490 is affixed to a recessed area 420 of the lower surface or end 410 of the mounting section 402 by a pair of threaded fasteners 493. The pair of threaded fasteners 493 pass through respective apertures 492 near opposite end of the plate 490 and thread into threaded openings 432 in the recessed area 430 of the mounting section 402. When assembled, the arcuate plate 490 defines a portion of the lower end 410 of the mounting section 402 and the set of spur gear teeth 484 of the arcuate gear section 482 extend to and define a portion of the lower end 410 of the mounting section 402. The arcuate plate 490 functions to capture the sliding mounting insert 422 within the arcuately extending slot 423. That is, the plate 490 prevents the insert 422 from falling out of the slot 423 in an axially downward direction DW. It should be understood that the arcuate gear section 482, instead of being formed on the plate 490, could also be formed directly on the outer wall of the mounting section 402, adjacent the lower end 410 of the mounting section 402.

As can best be seen in FIGS. 10 and 21-23, the blade support section 450 includes the annular inner wall 452 and the radially spaced apart annular outer wall 454. The blade support section 450 further includes a generally planar first upper end 456 and an axially spaced generally planar second lower end 458. The blade support section 450 extends about the entire 360° circumference of the blade housing 400. The blade support section 450 in a region of the mounting section 402 is continuous with and the blade support section inner wall 452 forms a portion of the inner wall 404 of the mounting section 402. As can be seen in FIG. 21, a portion 404a of the inner wall 404 of the mounting section 402 of the blade housing 400 within the horizontally extending dashed lines IWBS constitutes both a part of the inner wall 404 of the mounting section 402 and a part of the of the inner wall 452 of the blade support section 450. That is, the inner wall 404 of the mounting section 402 is coincident with the inner wall 452 of the blade support section 450. The dashed lines IWBS substantially correspond to an axial extent of the inner wall 452 of the blade support section 450, that is, the lines IWBS correspond to the upper end 456 and the lower end 458 of the blade support section 450.

As can be seen in FIG. 23, the inner wall 452 of the blade support section 450 includes an upper portion 452a, a middle portion 452b, and a lower portion 452c extending between the first upper end 456 and the second lower end 458 of the blade support section 450 of the blade housing 400. The upper portion 452a of the inner wall 452 of the blade support section extends downwardly from the first upper end 456 of the blade support section 450 and includes a short, first axial or vertical section 452d and an arcuate, inwardly protruding section 452e. The arcuate, inwardly protruding section 452e defines the blade housing bearing region 460, specifically, the radially inwardly extending, annular blade housing bearing bead 462. The blade housing bearing bead 462 defines the bearing region 460 of the blade housing 400 and is part of the blade—blade housing bearing structure 550. The annular bearing bead 462 is not continuous around the entire 360° of the blade support section 450. Rather, as can best be seen in FIG. 22, the bead 462 comprises arcuate bead sections 462a interrupted by recessed regions or sections 468 of the bead 462. The recessed sections 468 of the bead 462 facilitate the draining/exiting of pieces of fat, pieces of meat and/or bone, and/or other cutting debris which may become trapped and build up in the blade—blade housing bearing interface region 520 during operation of the knife 100. In one exemplary embodiment, the bearing bead 462 includes eight bead sections or projections 462a and eight recessed sections 468. It has been found that, for the large diameter rotary knife blade 300, this specific combination and spacing of bead sections 462a and recessed sections 468 is suitable for stability and reduced vibration of the rotary knife blade 300 within the blade housing 400 and for facilitating the draining/exiting of cutting debris from the blade—blade housing bearing interface region 520. In one exemplary embodiment, the eight recessed sections 468 each subtend an angle of approximately 19°, while seven of the eight of the bearing bead sections 462a subtend an angle of approximately 23°. The fifteenth bearing bead sections 462b, which bridges the blade housing split 401a, is radially larger than the remaining fourteen bearing bead sections 462a and subtends an angle of approximately 47°. It has also been found that having a bearing bead section bridging the split 401a of the blade housing 400 is advantageous in terms of blade stability and reduced vibration of the blade 300 within the blade housing 400.

The annular bearing bead 462 and specifically, the beading bearing bead sections 462a, when viewed in section, are generally semicircular and each defines an arcuate radially inward facing surface 465. The inward facing surface 465 of each bearing bead section 462a includes three arcuate sections 452f, 452h, 452j, interrupted by a pair of upper and lower angled sections 452g8, 452i. The arcuate sections 452f, 452h, 452j share a common radius of curvature and center point. The upper and lower angled sections 452g, 452i define the upper and lower flats 465a, 465b, respectively, of the bearing bead 462. The upper and lower flats 465a, 465b of the bearing bead 462 define the upper and lower bearing faces 466a, 466b. The upper and lower bearing faces 466a, 466b of the bearing bead 462 bear against the mating upper and lower bearing surface 326, 327 of the bearing race 322 of the rotary knife blade 300 to support the blade 300 for rotation about its central axis of rotation R. Stated another way, the upper and lower flats 465a, 465b of the bearing bead 462 bear against coacting upper and lower bearing faces 329a, 329b of the blade bearing race 322 to support the blade 300 for rotation about the blade central axis of rotation R. As can best be seen in FIG. 23, the upper bearing face 466a converges in a direction proceeding toward the lower bearing face 466b1 and, similarly, the lower bearing face 466b converges in a direction proceeding toward the upper bearing face 466a.

Viewing the blade housing bearing bead 460 in two dimensions, the lowest arcuate section 452j transitions into a radially or horizontally extending section 452k that defines a boundary between the upper portion 452a and the middle portion 452b of the blade housing inner wall 452. Of course, in three dimensions of the annular blade housing 400, the horizontally extending section 452k would define an annular disk. The second or middle portion 452b of the blade housing inner wall 452 defines the annular recess or channel 470 extending into the inner wall 452 and that is sized to receive the extent of the annular land 350 of the outer wall 318 of the rotary knife blade 300. The horizontally extending section 452k defines the upper ledge 472 of the annular channel 470, a vertical section 452l of the inner wall 452 defines the vertical wall 472 of the annular channel 470, and a horizontally extending section 452m defines the lower ledge 474 of the annular channel 470. The vertical wall 472 of the annular channel 470, in turn, defines the outer radial surface 473 of the annular channel 460. The outer radial surface 473 of the annular channel 470 defines a maximum diameter MAXIDBH of the blade housing inner wall 452. As mentioned previously, the interfit of the rotary knife blade annular land 350 and the blade housing annular channel 470 define a labyrinth seal for mitigating the egress of debris from the rotary knife blade driven gear region 340a into the blade—blade housing bearing structure 550 and mitigating the egress of debris from the blade—blade housing bearing structure 550 into the rotary knife blade driven gear region 340a.

The horizontally extending section 452m defines a boundary between the middle portion 452b and the lower portion 452c of the inner wall 452 of the blade support section 450 of the blade housing 400. The lower portion 452c of the inner wall 452 of the blade support section 450 of the blade housing 400 includes a radially inwardly stepped shoulder 475, which receives the driven gear 340 of the rotary knife blade 300 and a radially inwardly stepped lower cap or projection 478 of the blade support section 450 of the blade housing 400, which extends inwardly in close proximity to the boss 348 formed on the outer wall 318 of the rotary knife blade 300. The stepped shoulder 475 is defined by the horizontally extending section 452m that defines the lower ledge 474 of the annular channel 470, a vertical section 452n defining a vertical wall of the stepped shoulder 475, and a horizontally extending section 452o that defines an upper ledge 479a of the blade housing lower cap 478. The lower cap 478 is defined by the horizontally extending section 452o and a vertical section 452p defining a vertical wall 479b and radially inner surface 479c of the cap 478. A lower ledge 479d of the cap 478 is defined by the lower end 458 of the blade support section 450. The radially inner surface 479c of the cap 478 defines a minimum diameter MINIDBH of the blade housing inner wall 452. The radial extents of both the blade housing bearing bead 462 and stepped shoulder 475 of the blade housing inner wall 452 are within the minimum diameter MINIDBH defined by the cap 479 and the maximum diameter MAXIDBH defined by the annular channel 470. The radially inwardly extending blade housing cap 478 which is in proximity to the rotary knife blade boss 348 advantageously provides a labyrinth seal to inhibit debris traveling along the outer wall 368 of the blade section 360, which may have been generated at the cutting edge 361 of the blade 300 during cutting or trimming operations, from entering into the driven gear region 341a of the rotary knife blade 300.

The outer wall 454 of the blade support section 1450 of the blade housing 400 includes an arcuate transition portion 454a that extends radially outwardly and upwardly from the lower end 458 of the blade support section 450, which defines the lower ledge 479d of the cap 478. The transition portion 454a bridges the lower end 458 of the blade support section 450 and a frustoconical section or portion 454b. The frustoconical portion 454b angles outwardly from the blade central axis of rotation R at substantially the same angle as the outer wall 368 of the blade section 360 of the rotary knife blade 300 so as to essentially continue the angle and extent of the blade section outer wall 368 to reduce drag of the blade—blade housing combination 500 is moved across cut or trimmed material by the operator. Reducing drag of the blade—blade housing combination 500 advantageously reduces operator effort and increase longevity of the components. The frustoconical portion 454b transitions into a vertical portion 454c that extends to the first upper end 456 of the blade support section 450 of the blade housing 400. The transition between the frustoconical portion 454b and the vertical portion 454c of the outer wall 454, when viewed axially, is at approximately the axial level or height of the upper ledge 471 of the annular channel 470 of the inner wall 452. The friction or drag experienced by the operator as the power operated rotary knife 100 is manipulated by the operator to move through a product is dependent, among other things, on the cross sectional shape or configuration of the blade—blade housing combination 500 in a cutting region CR of the assembled combination 550. As can best be seen in FIG. 3, the cutting region CR of the blade—blade housing combination 500 is approximately 240° of the entire 360° periphery of the combination. The cutting region CR excludes the approximately 120° of the periphery of the blade—blade housing combination 500 occupied by the mounting section 402 of the blade housing 400.

The blade—blade housing combination 500 is configured and contoured to be as smooth and continuous as practical. As a layer of material is cut or trimmed from a product being processed (for example, a layer of tissue or a layer of meat or fat trimmed from an animal carcass) by moving the power operated rotary knife 100 in a cutting direction such that the rotating knife blade 300 and blade housing 400 move along and through the product to cut or trim the layer of material. As the power operated rotary knife 100 is moved by the operator, the blade edge 361 cuts the layer forming a cut portion of the layer. The cut portion moves along a cut or trimmed material path of travel through the cutting opening CO of the blade—blade housing combination 500 as the power operated rotary knife 100 advances through the product.

A new outer surface layer is formed as the layer is cut away from the product. The cut portion of the layer slides along the inner walls 366, 316 of the blade section 360 and body 310 of rotary knife blade 300, while new outer surface layer slides along the respective outer walls 368, 454 of the blade section 360 of the knife blade 300 and the blade support section 450 of the blade housing 400. A smooth transition between the blade section outer wall 368 of the knife blade 300 and the blade support section outer wall 454 of the blade housing 400 is provided by the short, radially extending lower cap portion 478 of the blade housing 400 and the radially extending boss 348 at the lower end 314 of the rotary knife blade body 310. The blade—blade housing combination 500 in the cutting region CR is shaped to extent possible to reduce drag and friction experienced by the operator when manipulating the power operated rotary knife 100 in performing cutting or trimming operations.

Head Assembly 200

The head assembly 200 includes the frame or frame body 250 and the gearbox assembly 210. The gearbox assembly 210 includes the gearbox housing 212 and the gear train 604. The gear train 604 is supported by the gearbox housing 212. The gear train 604 includes, in one exemplary embodiment, the pinion gear 610 and the drive gear 650. The gearbox assembly 210 includes the gear train 604, along with a first bearing support assembly 630 that rotatably supports the pinion gear 610 and a second bearing support assembly 660 that rotatably supports the drive gear 650.

As can best be seen in FIGS. 2, 8 and 24-25, the pinion gear 610 is supported for rotation about the pinion gear axis of rotation PGR by the bearing support assembly 630, which, in one exemplary embodiment, includes a larger sleeve bushing 632 and a smaller sleeve bushing 640. A forward facing surface 624 of the gear head 614 of the pinion gear 610 includes a central recess 626 which is substantially circular in cross section and is centered about the pinion gear axis of rotation PGR. The pinion gear central recess 626 receives a cylindrical reward portion 642 of the smaller sleeve bushing 640. The smaller sleeve bushing 640 functions as a thrust bearing and includes an enlarged annular head 644 provides a bearing surface for the pinion gear head 614 and limits axial travel of the pinion gear 610 in the forward direction FW, that is, travel of the pinion gear 610 along the pinion gear axis of rotation PGR, in the forward direction FW.

The smaller sleeve bushing 640 is attached to the frame body 150 by a threaded fastener 646. The larger sleeve bushing 632 is supported within a conforming cavity 229 of the inverted U-shaped forward section 218 of the gearbox housing 212, while the enlarged forward head 636 of the sleeve bushing 632 fits within a conforming forward cavity 226 of the U-shaped forward section 218 of the gearbox housing 212.

A flat 638 of the enlarged forward head 636 of the larger sleeve bushing 632 interfits with a flat 228 of the U-shaped forward section 218 of the gearbox housing 212 to prevent rotation of the sleeve bushing 632 within the gearbox housing 212. The cylindrical body 639 of the larger sleeve bushing 632 defining the central opening 634 provides radial bearing support for the pinion gear 610. The enlarged head 636 of the sleeve bushing 632 also provides a thrust bearing surface for a rearward collar of the gear head 614 to prevent axial movement of the pinion gear 610 in the rearward direction RW, that is, travel of the pinion gear 610 along the pinion gear axis of rotation PGR, in the rearward direction RW. Alternatively, instead of a pair of sleeve bushings 632, 640, the bearing support assembly 630 for the pinion gear 610 may comprise one or more roller or ball bearing assemblies or a combination of roller/ball bearing assemblies and sleeve bearings.

The drive gear 650 is a double gear that includes the first bevel gear 652 and a second spur gear 654, disposed in a stacked relationship, about an axis of rotation DGR of the drive gear 650. The drive gear axis of rotation DGR is substantially parallel to the rotary knife blade axis of rotation R. The pinion gear first bevel gear 652 meshes with the pinion gear 610 to rotatably drive the drive gear 650 about the drive gear axis of rotation DGR. The second spur gear 654 of the drive gear engages the driven gear 340 of the rotary knife blade 300, forming an involute gear drive, to rotate the knife blade 300 about the blade axis of rotation R. The second gear 654 comprises a spur gear including a set of involute gear teeth 656. The spur gear 654 engages and drives the driven gear 340 of the knife blade 300 to rotate the knife blade about its axis of rotation R. Because the spur gear 654 of the drive gear 650 and the driven gear 340 of the knife blade 300 have axes of rotation DGR, R that are parallel (that is, a spur gear drive) and because the gears 654, 340 comprise an involute gear drive 658, there is less wear of the respective gear teeth than in other gear drives wherein the axes of rotation are not parallel and wherein a non-involute gear drive is used.

The drive gear 650 is supported for rotation by the bearing support assembly 660. The bearing support assembly 660, in one exemplary embodiment, comprises a ball bearing assembly 662 that supports the drive gear 650 for rotation about the drive gear rotational axis DGR. The drive gear bearing support assembly 660 is received in a central opening 670 defined by the drive gear 650 and is secured to a downwardly extending projection 242 of the inverted U-shaped forward section 218 of the gearbox housing 212. In one exemplary embodiment, the ball bearing assembly 662 includes a stacked pair of ball bearing assemblies 662a, 662b. A threaded end portion of the fastener 672 and screws into a threaded opening 240 defined in a stem 243 of the downwardly extending projection 242 of the inverted U-shaped forward section 218 of the gearbox housing 212. The fastener 672 secures the ball bearing assembly 662 to the gearbox housing 212. Alternatively, instead of a ball bearing assembly, the bearing support assembly 660 may comprise one or more sleeve bearings or bushings.

The gear train 604 is part of the drive mechanism 600, some of which is external to the power operated rotary knife 100, that provides motive power to rotate the rotary knife blade 300 with respect to the blade housing 400. The drive mechanism 600 includes the external drive motor 800 and the flexible shaft drive assembly 700, which is releasably secured to the handle assembly 110 by the drive shaft latching assembly 175. The gear train 604 of the power operated rotary knife 100 transmits rotational power from a rotating drive shaft 702 of the flexible shaft drive assembly 700, through the pinion and drive gears 610, 650, to rotate the rotary knife blade 300 with respect to the blade housing 400.

As is best seen in FIGS. 2, 8 and 27-28, the frame body 250 of the head assembly 200 includes the arcuate molting pedestal 252 at a front or forward end of the frame body 250. The arcuate mounting pedestal 252 defines the seating region 252a for the mounting section 402 of the blade housing 400 such that the blade—blade housing combination 500 may be releasably affixed to the frame body 250. The frame body 250 also defines a cavity or opening 255 that slidably receives the gearbox housing 212, as the gearbox housing 212 is moved in a forward direction FW along the longitudinal axis LA of the handle assembly 110 in the direction of the frame body 250. When the gearbox housing 212 is fully inserted into the frame cavity 255 and secured to the frame body 250 by a pair of threaded fasteners 292, the drive gear 650 of the gear train 604 engages and meshes with the driven gear 340 of the rotary knife blade 300 to rotate the blade 300 about its axis of rotation R.

The frame body 250 releasably couples the blade—blade housing combination 500 to the gearbox housing 212 to form the head assembly 200 of the power operated rotary knife 100. The hand piece 120 of the handle assembly 110 is secured or mounted to the head assembly 111 by the hand piece retaining assembly 150 to complete the power operated rotary knife 100. The elongated central core 152 of the hand piece retaining assembly 150 extends through a central throughbore 122 of the hand piece 120 and threads into the gearbox housing 212 to secure the hand piece 120 to the gearbox housing 212.

Gearbox Housing 212

As is best seen in FIGS. 2, 8 and 24-26, the gearbox housing 212 includes the generally cylindrical rearward section 216 (in the rearward direction RW away from the blade housing 400), the inverted U-shaped forward section 218 (in the forward direction FW toward the blade housing 400) and a generally rectangular base section 220 disposed axially below the forward section 218. The gearbox housing 212 includes the gearbox cavity or opening 214 which defines a throughbore 215 extending through the gearbox housing 212 from a rearward end 222 to a forward end 224. The throughbore 215 extends generally along the handle assembly longitudinal axis LA. The inverted U-shaped forward section 218 and the cylindrical rearward section 216 combine to define an upper surface 230 of the gearbox housing 212.

The gearbox housing 212 also includes a generally rectangular shaped base 220 which extends downwardly from the inverted U-shaped forward section 218, i.e., away from the upper surface 230. The rectangular base 220 includes a front wall 220a and a rear wall 220b, as well as a bottom wall 220c and an upper wall 220d, all of which are generally planar. Extending radially inwardly into the front wall 220a of the rectangular base 220 are first and second arcuate recesses 220e, 220f. The first arcuate recess 220e is an upper recess, that is, the upper recess 220e is adjacent a bottom portion 241 of the inverted U-shaped forward section 218 and is offset slightly below the upper wall 220d of the rectangular base 220. The second arcuate recess 220f is a lower recess and extends through the bottom wall 220c of the rectangular base 220.

The bottom portion 241 of the inverted U-shaped forward section 218 includes the downwardly extending projection 242. The downwardly extending projection 242 includes the cylindrical stem portion 243 and defines the threaded opening 240 extending through the projection 242. A central axis through the threaded opening 240 defines and is coincident with the axis of rotation DGR of the drive gear 650. The upper and lower arcuate recesses 220e, 220f are centered about the drive gear axis of rotation DGR and the central axis of the threaded opening 240.

The throughbore 215 of the gearbox housing 212 provides a receptacle for the pinion gear 610 and its associated bearing support assembly 630 while the upper and lower arcuate recesses 220e, 220f provide clearance for the drive gear 650 and its associate bearing support assembly 660. Specifically, with regard to the bearing support assembly 630, a cylindrical body 637 of the larger sleeve bushing 632 fits within the cylindrical cavity 229 of the inverted U-shaped forward section 218. An enlarged forward head 636 of the sleeve bushing 632 fits within the forward cavity 226 of the forward section 218. The cylindrical cavity 229 and the forward cavity 226 of the inverted U-shaped forward section 218 are both part of the throughbore 215.

With regard to the upper and lower arcuate recesses 220e, 220f, the upper recess 220e provides clearance for the first bevel gear 652 of the drive gear 650 as the drive gear 650 rotates about its axis of rotation DGR upon the first bevel gear 652 being driven by the pinion gear 610. The wider lower recess 220f provides clearance for the second spur gear 654 of the drive gear 650 as the spur gear 654 coacts with the driven gear 340 to rotate the rotary knife blade 300 about its axis of rotation R. The downwardly extending projection 242 and stem 243 provide seating surfaces for the ball bearing assembly 662, which supports the drive gear 650 for rotation within the rectangular base 220 of the gearbox housing 212.

An inner surface 245 of the cylindrical rearward section 216 of the gearbox housing 212 defines a threaded region 249, adjacent the proximal end 222 of the gearbox housing 212. The threaded region 249 of the gearbox housing 212 receives a mating threaded portion 162 of the elongated central core 152 of the hand piece retaining assembly 150 to secure the hand piece 120 to the gearbox housing 212.

An outer surface 246 of the cylindrical rearward section 216 of the gearbox housing 212 defines a first portion 248 adjacent the proximal end 222 and a second larger diameter portion 247 disposed forward or in a forward direction FW of the first portion 248. The first portion 248 of the outer surface 246 of the cylindrical rearward portion 216 of the gearbox housing 212 includes a plurality of axially extending splines 248a. The plurality of splines 248a accept and interfit with a plurality of ribs 126 (FIG. 2) formed on an inner surface 121 of a distal end portion 128 of the hand piece 120. The coacting plurality of splines 248a of the gearbox housing 212 and the plurality of ribs 126 of the hand piece 120 allow the hand piece 120 to be oriented at any desired rotational position with respect to the gearbox housing 212.

The second larger diameter portion 247 of the outer surface 246 of the cylindrical rearward section 216 of the gearbox housing 212 is configured to receive a spacer ring 190 (FIG. 2) of the hand piece retaining assembly 150. The spacer ring 190 abuts and bears against a stepped shoulder 247a defined between the cylindrical rearward section 216 and the inverted U-shaped forward section 218 of the gearbox housing 212. That is, an upper portion 234 of the inverted U-shaped forward section 218 is slightly radially above a corresponding upper portion 232 of the cylindrical rearward section 216 of the gearbox housing 212. A rear or proximal surface 192 of the spacer ring 190 acts as a stop for the hand piece 120 when the hand piece 120 is secured to the gearbox housing 212 by the elongated central core 152 of the hand piece retaining assembly 150. As mentioned previously, the spacer ring 190 may optionally be replaced by a thumb support (not shown) if desired by the operator.

Frame Body 250

As noted above and as best seen in FIGS. 2, 8 and 27-28, frame body 250 receives and removably supports both the gearbox assembly 210 and the blade—blade housing combination 500. In this way, the frame body 250 releasably and operatively couples the gearbox assembly 210 to the blade—blade housing combination 500 such that the gear train 604 of the gearbox assembly 210 operatively engages the driven gear 340 of the rotary knife blade 300 to rotate the knife blade 300 with respect to the blade housing 400 about the axis of rotation R.

The frame body 250 includes the arcuate mounting pedestal 252 disposed at a forward portion 251 of the frame 250, the central cylindrical region 254, and a rectangular base 280 disposed below the central cylindrical region 254. The arcuate mounting pedestal 252 of the frame body defines the seating region 252a to receive the mounting section 402 of the blade housing 400 and secure the blade—blade housing combination 500 to the frame body 250. The central cylindrical region 254 and the rectangular base 280 of the frame body 250 define a cavity 255 which slidably receives the gearbox housing 212. The frame body cavity 255 is comprised of an upper socket 256 defined by the central cylindrical region 254 and a lower horizontally extending opening 290 defined by and extending through the central rectangular base 280.

As can best be seen in FIG. 27, the central rectangular base 280 of the frame body 250 includes a bottom wall 282 and a pair of side walls 284 that extend upwardly from the bottom wall 282. A pair of bosses 286 extend inwardly from the pair of side walls 184. Rearward facing surfaces of the pair of bosses 286 each include a threaded opening 288. The lower horizontally extending opening 290 defined by the rectangular base 280 includes two parts: a generally rectangular portion 290a extending rearwardly from the pair of bosses 286; and a forward portion 290b that extends through the rectangular base 280 to the seating region 252a of the frame body 250.

To secure the gearbox assembly 210 to the frame body 250, the gearbox assembly 210 is aligned with and moved toward a proximal end 257 of the frame body 250. The socket 256 defined by the central cylindrical region 254 of the frame body 250 is configured to slidably receive the inverted U-shaped forward section 218 of the gearbox housing 212 and the rectangular portion 290a of the horizontally extending opening 290 of the rectangular base 280 is configured to slidably receive the rectangular base 220 of the gearbox housing 212. The upper surface 230 of the gearbox housing 212 is slidably received within an inner surface 258 of the central cylindrical region 254 of the frame body 250.

When the gearbox assembly 210 is fully inserted into the frame body 250, the front wall 220a of the base 220 of the gearbox housing 212 abuts the rearward facing surfaces of the pair of bosses 286 of the rectangular base 280 of the frame body 250. Further, the horizontally extending openings 221 of the gearbox housing base 220 are aligned with the horizontally extending threaded openings 288 of the pair of bosses 286 of the frame body rectangular base 280. A pair of threaded fasteners 292 pass through the openings 221 of the gearbox housing base 220 and thread into the threaded openings 288 of the pair of bosses 286 of the frame body rectangular base 280 to releasably secure the gearbox assembly 210 to the frame body 250. The openings 221 of the gearbox housing base 280 are partially threaded to prevent the fasteners 292 from falling out of the openings 221 when the gearbox housing 212 is not coupled to the frame body 250.

The openings 221 of the gearbox housing base 220 include countersunk end portions 221a to receive the enlarged heads of the pair of threaded fasteners 292 such that the enlarged heads of the fasteners 292, when tightened into the frame body 250, are flush with the rear wall 220b of the base 220. The threaded fasteners 292 include narrow body portions relative to the enlarged heads and larger diameter threaded portions such that the fasteners 292 remain captured within their respective gearbox housing openings 221 when the gearbox housing 212 is not coupled to the frame body 250. Relative movement between the gearbox assembly 210 and the frame body 250 is constrained by the threaded interconnection of the gearbox housing 212 to the frame body 250 via the threaded fasteners 292 and the abutting surfaces of the rectangular base 220 of the gearbox housing 212 and the rectangular base 280 of the frame body 250.

Additionally, the frame body 250 releasably receives the blade—blade housing combination 500 and thereby operatively couples the blade—blade housing combination 500 to the gearbox assembly 210. The pair of arcuate arms 260, 262 of the frame body 150 define the arcuate mounting pedestal 152. The mounting pedestal 152, in turn, defines the seating region 152a that releasably receives the mounting section 402 of the blade housing 400. Specifically, the arcuate mounting pedestal 152 includes an inner wall 174, an upper wall 176 extending radially in the forward direction FW from an upper end of the inner wall 174, and a lower wall or ledge 178 extending radially in a forward direction FW from a lower end of the inner wall 174.

When the blade housing mounting section 402 is properly aligned and moved into engagement with the frame body arcuate mounting pedestal 252: 1) a portion of the outer wall 406 of the blade housing mounting section 402 bears against the mounting pedestal inner wall 274 of the frame body 250; 2) a portion of the first upper end 408 of the blade housing mounting section 402 bears against the mounting pedestal upper wall 276 of the frame body 250; and 3) a central region 411 of the lower end 410 of the blade housing mounting section 402 bears against the mounting pedestal lower wall 278 of the frame body 250.

The respective threaded fasteners 270, 272 of the frame body 250 are threaded into the threaded openings 420a, 422a of the mounting inserts 420, 422 of the blade housing mounting section 402 to secure the combination blade—blade housing 500 to the frame body 250. Assuming that the gearbox assembly 210 is coupled to the frame body 250, when the blade—blade housing combination 500 is secured to the frame body 250, the second spur gear 654 of the drive gear 650 of the gearbox assembly 210 engages and meshes with the driven gear 340 of the rotary knife blade 300 of the blade—blade housing combination 500. Thus, when the gearbox assembly 210 and the blade—blade housing combination 500 are secured to the frame body 250, the gear train 604 of the gearbox assembly 210 is operatively engaged with the driven gear 340 of the rotary knife blade 300 to rotatably drive the blade 300 within the blade housing 400 about the blade axis of rotation R. Like the threaded fasteners 292 of the gearbox housing 212 that secure the gearbox housing 212 to the frame body 250, the threaded fasteners 270, 272 of the frame body 250 include narrow bodies and larger diameter threaded portions such that the fasteners remain captured in the partially threaded openings 260a, 262a of the arcuate arms 260, 262.

To remove the combination blade—blade housing 500 from the frame body 250, the pair of threaded fasteners 270, 272 of the frame body 250 are unthreaded from the threaded openings 420a, 420b of the blade housing mounting inserts 420, 422. Then, the blade—blade housing combination 500 is moved is the forward direction FW with respect to the frame body 250 to disengage the blade—blade housing combination 500 from the head assembly 200.

The blade—blade housing structure 500 of the present disclosure and the other features, characteristics and attributes, as described above, of the power operated rotary knife 100 may be used with a variety of rotary knife blades styles, configurations, and sizes and corresponding blade housings. As mentioned above, the exemplary rotary knife blade 300 is a flat blade style rotary knife blade. Numerous other blade styles, including, but not limited to, hook and straight style blades and combinations of blade styles may be utilized, with an appropriate blade housing, in the power operated rotary knife 100 of the present disclosure, as would be understood by one of skill in the art. It is the intent of the present application to cover all such rotary knife blade styles and sizes, together with the corresponding blade housings, that may be used in the power operated rotary knife 100.

In one exemplary embodiment, the hand piece 120 and the elongated central core 152 of the handle assembly 110 may be fabricated of plastic or other material or materials known to have comparable properties and may be formed by molding and/or machining. The hand piece 120, for example, may be fabricated of two over molded plastic layers, an inner layer comprising a hard plastic material and an outer layer or gripping surface comprised of a softer, resilient plastic material that is more pliable and easier to grip for the operator. The gearbox housing 212 and the frame body 250 of the head assembly 200 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Second Exemplary Embodiment—Power Operated Rotary Knife 1000

Figure 29:
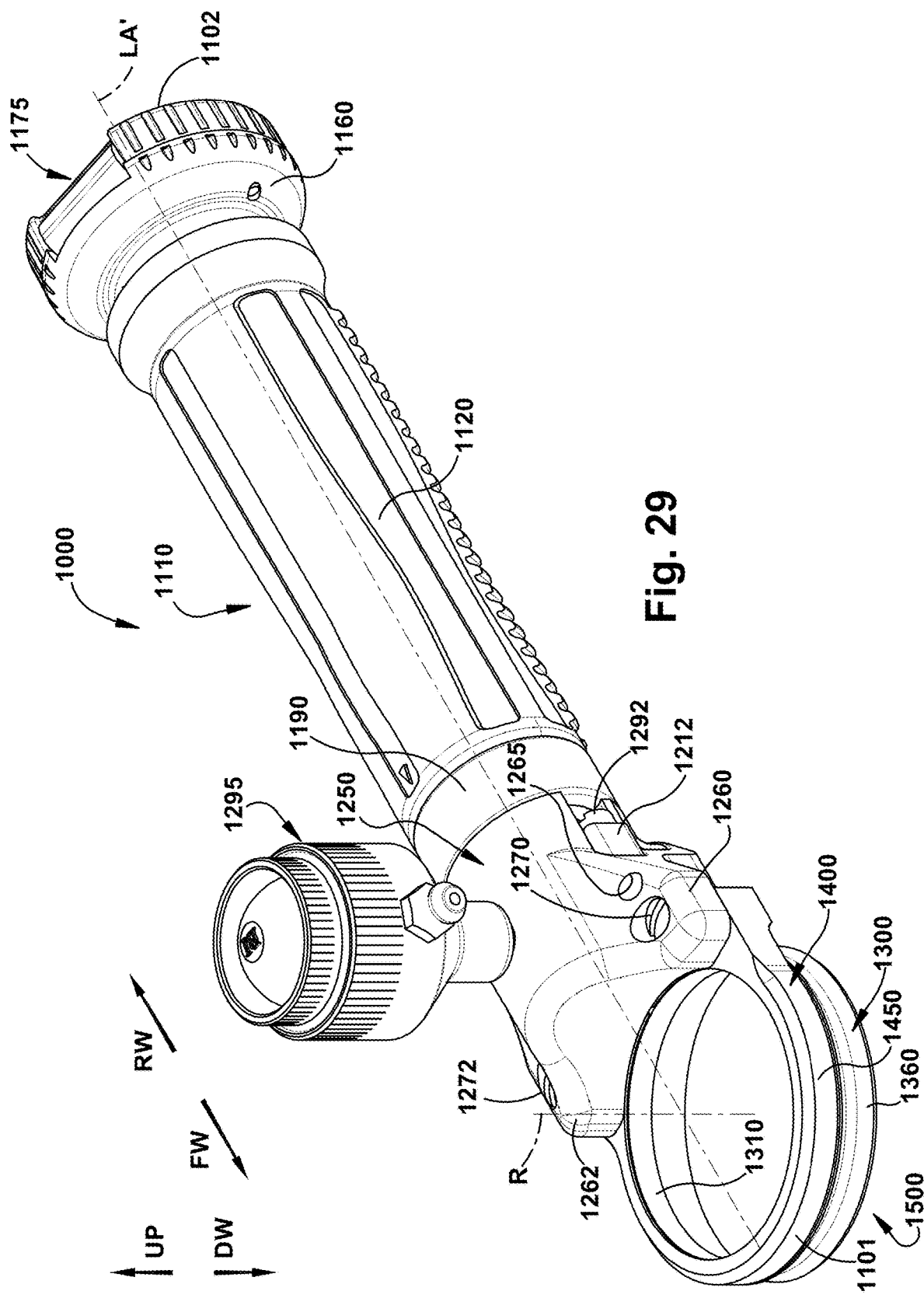
FIG. 29 is a schematic front perspective view of a second exemplary embodiment of a power operated rotary knife of the present disclosure including a head assembly, a handle assembly and a drive mechanism, the head assembly including a frame body, a gearbox assembly, an assembled combination of an annular rotary knife blade and an annular split ring blade housing, and the handle assembly including a hand piece and a hand piece retaining assembly.
Figure 30:
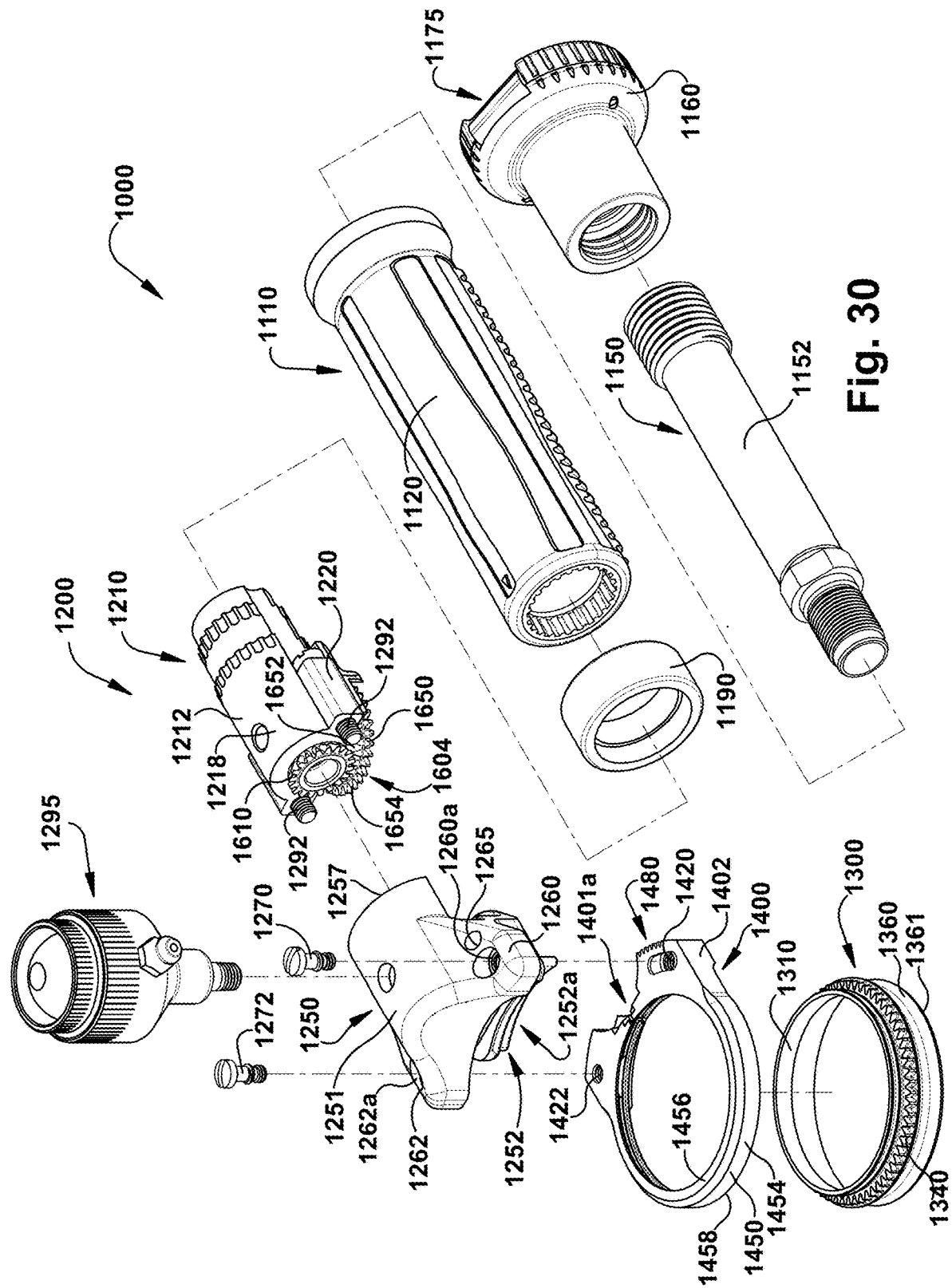
FIG. 30 is a schematic exploded perspective view of the power operated rotary knife of FIG. 29.
Figure 31:
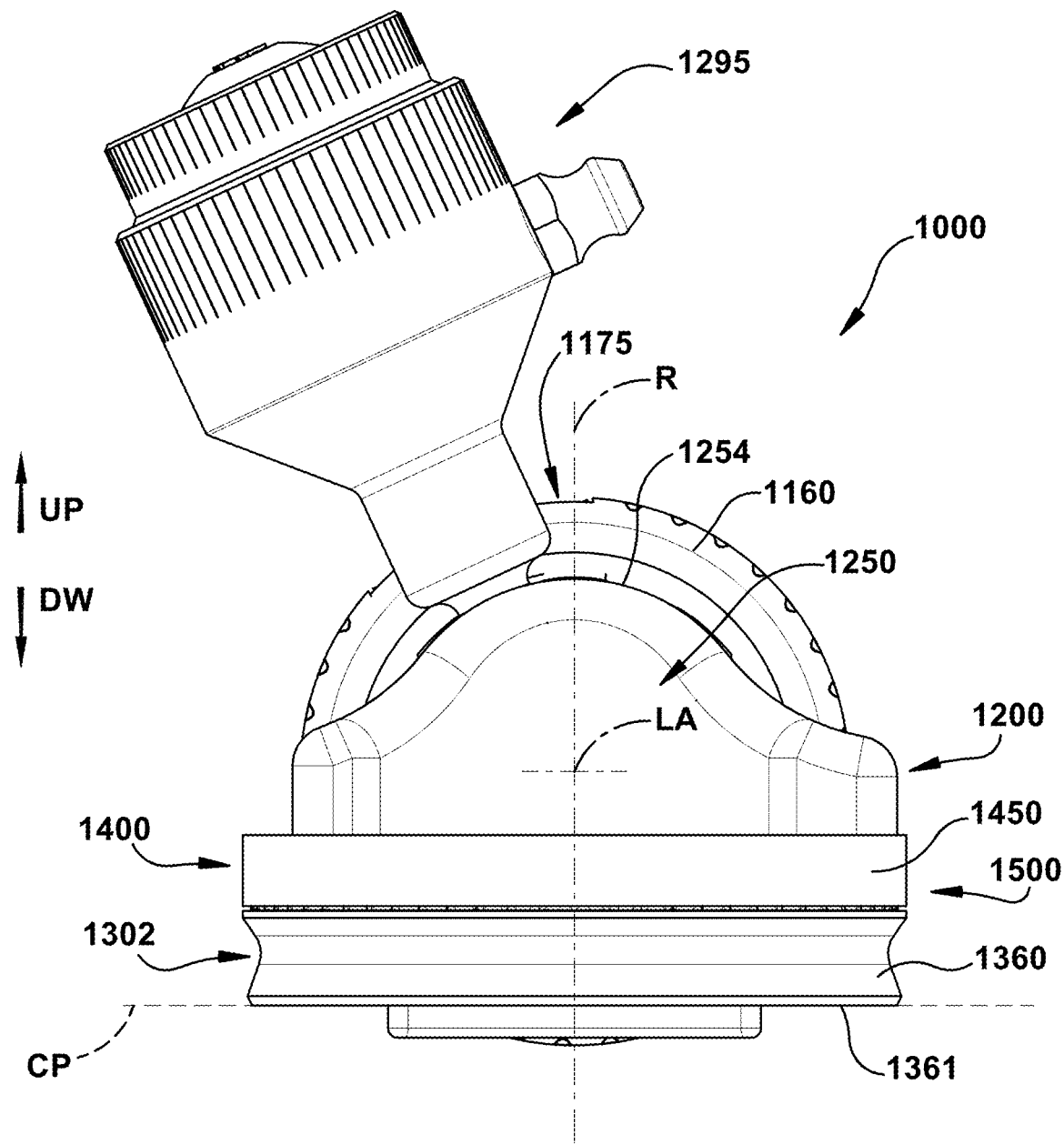
FIG. 31 is a schematic front elevation view of the power operated rotary knife of FIG. 29.
Figure 32:
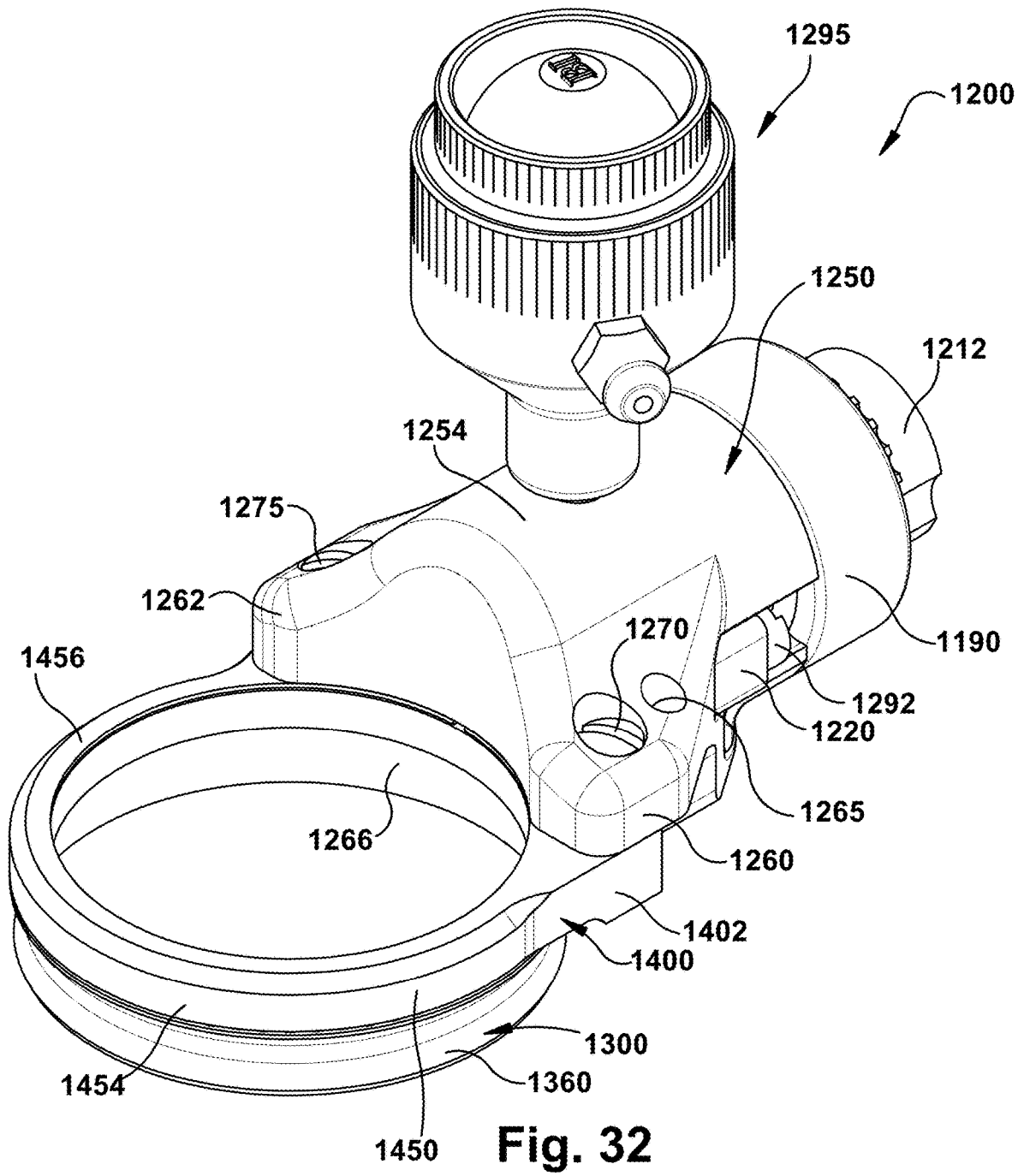
FIG. 32 is a schematic perspective view of the head assembly of the power operated rotary knife of FIG. 29, including the frame body, the gearbox assembly, the annular rotary knife blade and the annular blade housing.
Figure 33:
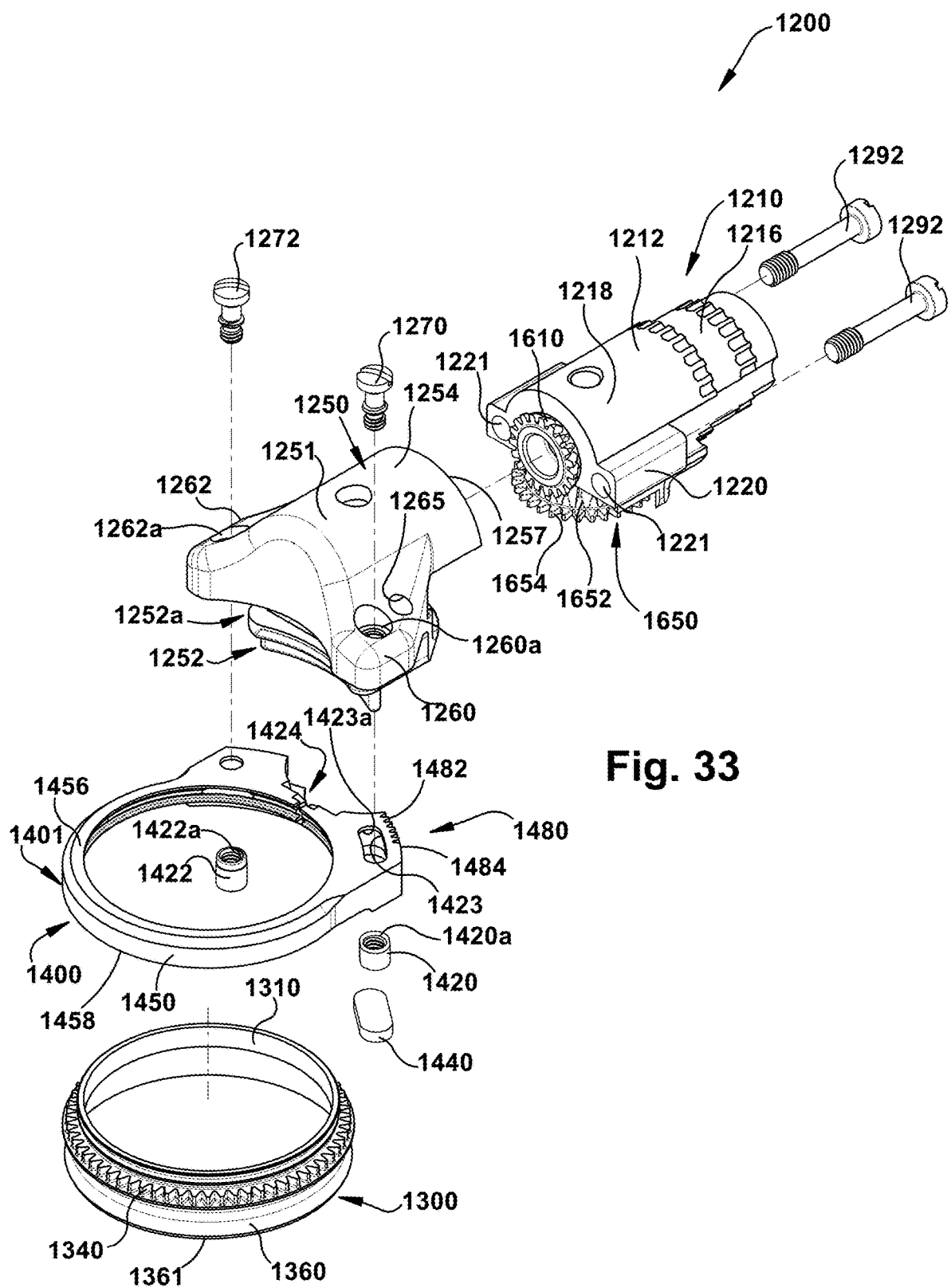
FIG. 33 is a schematic exploded front perspective view of the head assembly of FIG. 32.

A second exemplary embodiment of a power operated rotary knife of the present disclosure is shown generally at 1000 in FIGS. 29-31. The annular rotary knife blade 1300 of the power operated rotary knife 1000 is a small diameter rotary knife blade, having, in one exemplary embodiment an outer diameter ODB of approximately 2.12 in. The smaller diameter of the rotary knife blade 1300 necessitates a head assembly 1200 that is of smaller size than the head assembly 200 of the power operated rotary knife 100 of the first exemplary embodiment, including a smaller diameter annular split ring blade housing 1400, as compared to the annular split ring blade housing 400 of the first embodiment and a smaller frame body 1250, as compared to the frame body 250 of the first embodiment. As such, the power operated rotary knife 1000 of the second exemplary embodiment is suited for use with small diameter rotary knife blades, that is, rotary knife blades having a maximum outer diameter of less than 5 inches.

Like the assembled blade—blade housing combination 500 of the power operated rotary knife 100 of the first exemplary embodiment, an assembled blade—blade housing combination 1500 of the power operated rotary knife 1000 includes the annular rotary knife blade 1300 supported for rotation about a central axis of rotation R by the split ring blade housing 1400. However, because of the smaller footprint and blade diameter of the assembled combination 1500, as compared to the assembled combination 500 of the first exemplary embodiment, the positions of the radially protruding annular land 350 of the rotary knife blade 300 and mating annular channel or recess 470 of the blade support section 450 of the blade housing 400 in the assembled blade—blade housing combination 500 of the first embodiment have been switched in an assembled combination 1500 of the rotary knife blade 1300 and the blade housing 1400 of the power operated rotary knife 1000 of the second exemplary embodiment, as explained below.

As will be recalled, in the power operated rotary knife 100 of the first exemplary embodiment, in the rotary knife blade 300, the outer wall 318 of the knife blade body 310 included the radially outwardly protruding annular land 350. The annular blade housing 400 included the mating annular recess or channel 470 formed in the inner wall 452 of the blade support section 450. The annular land 350 of the rotary knife blade 300 extended into and was received in the annular channel 470 of the blade housing 400 to form a labyrinth seal. The labyrinth seal, as described above, advantageously inhibits the movement of debris along the outer wall 318 of the rotary knife blade 300 from the driven gear region 340a into the blade bearing region 320 and from the blade bearing region 320 into the driven gear region 340a. Further, the ledges defining the blade housing annular channel 470 coact with the rotary knife blade annular land 350 to provide a positive stop to limit axial travel of the rotary knife blade 300 with respect to the blade housing 400 in the event that the operating clearance between the rotary knife blade 300 and the annular blade housing 400 is excessively loose.

By contrast, in view of the smaller diameter of the annular rotary knife blade 1300, instead of an annular land, an annular recess or channel 1350 is formed in an outer wall 1318 of a body 1310 of the rotary knife blade 1300. The annular channel 1350 is axially disposed between an annular bearing race 1322 and a driven spur gear 1340 formed in the body outer wall 1318 of the rotary knife blade 1300. A mating radially inwardly protruding annular land 1470 is formed in an inner wall 1452 of a blade support section 1450 of the blade housing 1400. The annular land 1470 of the blade housing 1400 extends into and is received in the annular channel 1350 of the rotary knife blade 1300 to form a labyrinth seal. The labyrinth seal advantageously inhibits the movement of debris along the outer wall 1318 of the rotary knife blade 1300 from a driven gear region 1340a into a blade bearing region 1320 and from the blade bearing region 1320 into the driven gear region 1340a. Further, ledges defining the blade housing annular channel 1470 coact with the rotary knife blade annular land 1350 to provide a positive stop to limit axial travel of the rotary knife blade 1300 with respect to the blade housing 1400 in the event that the operating clearance between the rotary knife blade 1300 and the annular blade housing 1400 is excessively loose.

The power operated rotary knife 1000 includes a handle assembly 1110, the head assembly 2111 which is releasably secured to the handle assembly 1110, and a drive mechanism, including a gear train 1604, similar to the drive mechanism 600 and gear train 604 of the power operated rotary knife 100 of the first exemplary embodiment. Various components and assemblies of the power operated rotary knife 1000 are similar in structure and/or function to corresponding components and assemblies of the power operated rotary knife 100, previously described. In the interest of brevity, components and assemblies of the power operated rotary knife 1000 that are similar to the corresponding components and assemblies of the power operated rotary knife 100 of the first exemplary embodiment in structure and/or function will not be fully described herein. Instead, reference is made to the description of such components and assemblies set forth above in connection with the power operated rotary knife 100, as set forth above. Materials/fabrication of components and assemblies of the power operated rotary knife 1000 are similar to materials/fabrication of corresponding components and assemblies of the power operated rotary knife 100, as described above. Such descriptions of components and assemblies of the power operated rotary knife 100 of the first exemplary embodiment are hereby incorporated by reference in the following description of the power operated rotary knife 1000 of the second exemplary embodiment. Identification of axes, lines, planes and directions for the power operated rotary knife 1000, as set forth herein, will be the same as used for the description of the power operated rotary knife 100.

The power operated rotary knife 1000 includes a drive mechanism, including the gear train 1604 supported in a gearbox housing 1212, similar to the drive mechanism 600, including the gear train 604, of the power operated rotary knife 100. As can best be seen in FIG. 30, the gear train 1604 of the power operated rotary knife 1000 includes a pinion gear 1610, similar to the pinion gear 610 of the power operated rotary knife 100, and a double drive gear 1650, similar to the double drive gear 650 of the power operated rotary knife 100. The double drive gear 1650 includes a first bevel gear 1652 that is driven by the pinion gear 1610 and a second spur gear 1654 that, in turn, drive a driven gear 1340 of the rotary knife blade 1300 to rotate the knife blade 1300 with respect to a central longitudinal axis R of the knife blade 1300. The gear train 1604 is rotatably supported within a gearbox housing 1212, similar to the gearbox housing 212 of the power operated rotary knife 100. The gearbox housing 1212 and the gear train 1604 comprise a gearbox assembly 1210, which is part of the head assembly 1200 of the power operated rotary knife 1000.

As can best be seen in FIG. 30, the elongated handle assembly 1110 of the power operated rotary knife 1000, similar to the handle assembly 110 of the power operated rotary knife 100, extends along a central longitudinal axis LA and includes a hand piece 1120, a hand piece retaining assembly 1150 to releasably secure the hand piece 1120 to the gearbox housing 1212, and a drive shaft latching assembly 1175 to releasably secure the flexible shaft drive assembly 700 to the handle assembly 1110 to provide motive power from the external drive motor 800 to rotate the pinion gear 1610 of the gear train 1604, as explained with respect to the power operated rotary knife 100 of the first exemplary embodiment. The hand piece retaining assembly 1150 includes an elongated core 1152, a spacer ring 1190 (which may optionally be replaced by a thumb support ring), and an enlarged end piece 1160, which houses the drive shaft latching assembly 1175, as explained previously.

Figure 34:
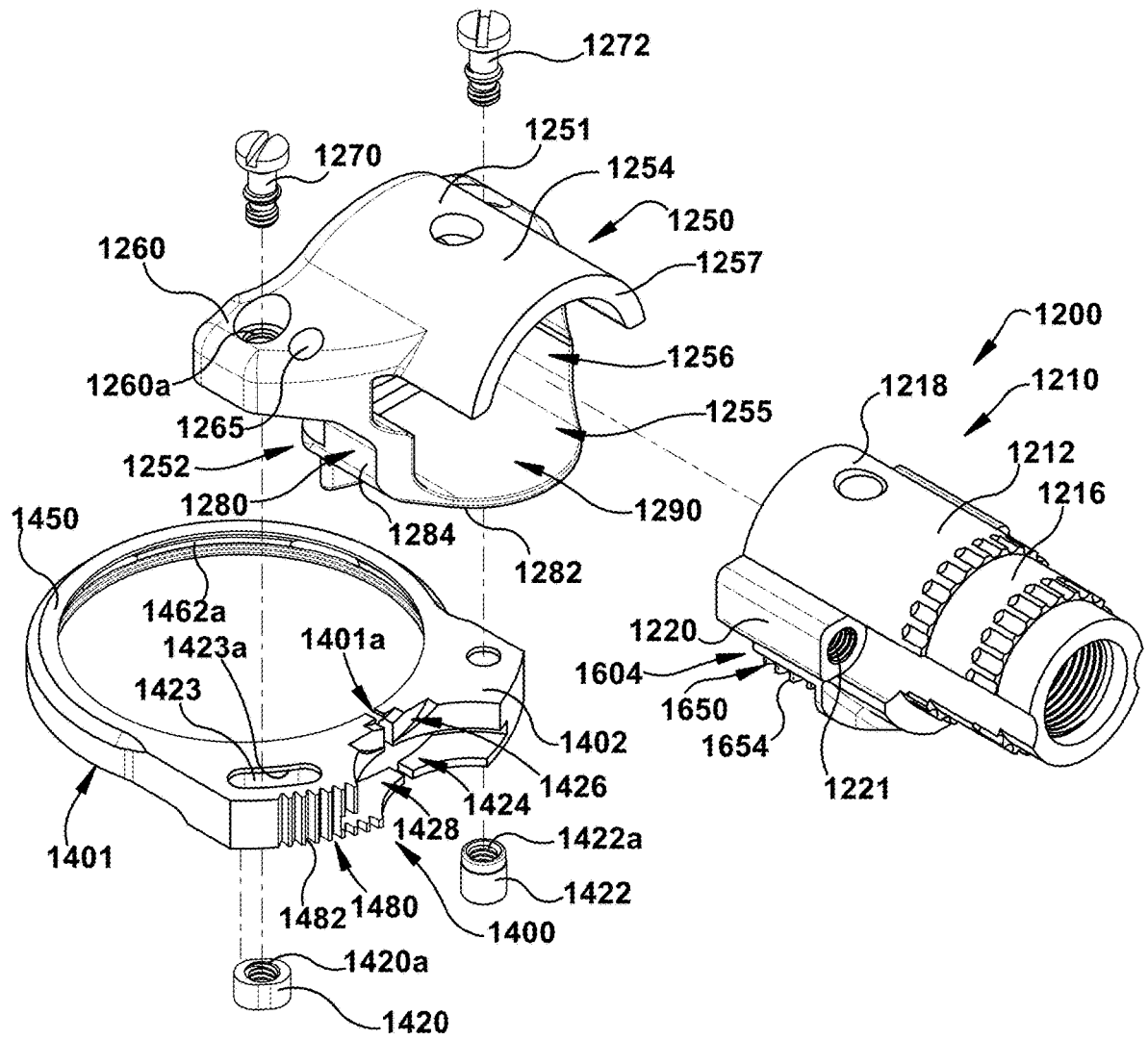
FIG. 34 is a schematic exploded rear perspective view of the head assembly of FIG. 32.
Figure 35:
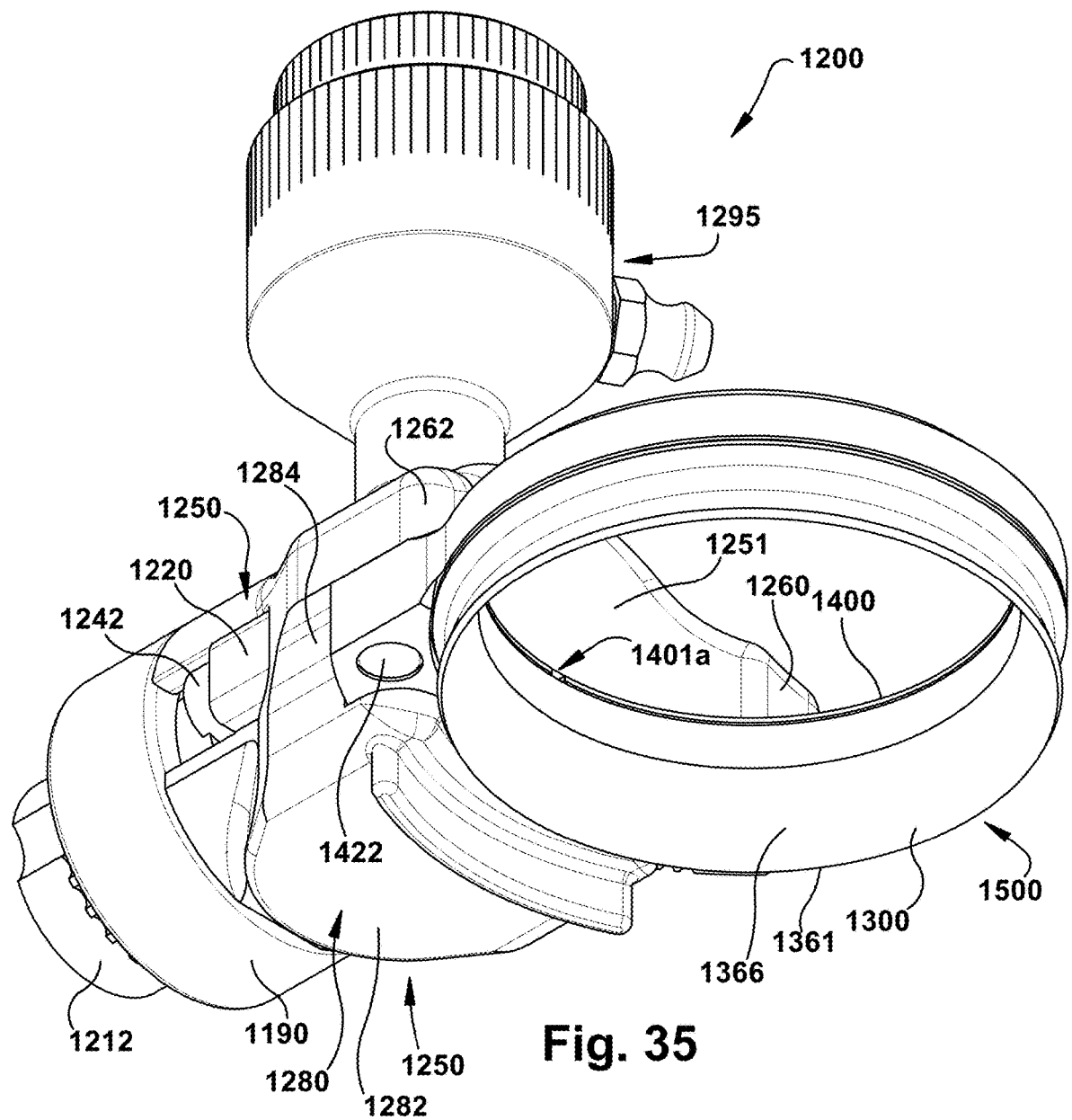
FIG. 35 is a schematic bottom perspective view of the head assembly of FIG. 32.
Figure 39:
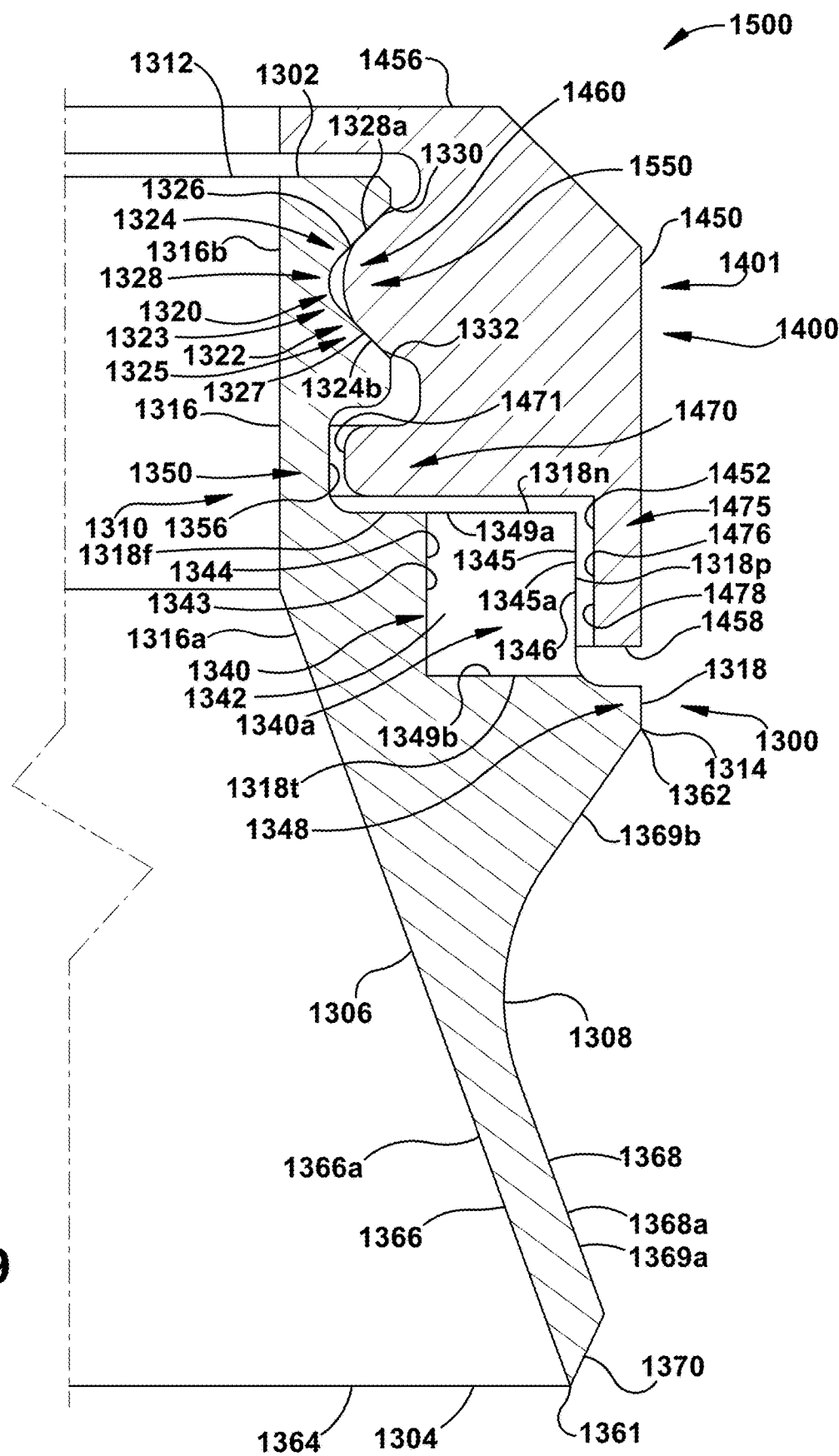
FIG. 39 is a schematic enlarged section view of the assembled combination of the annular rotary knife blade and the annular blade housing of the head assembly of the power operated rotary knife of FIG. 29, as seen from a plane indicated by the line 39-39 in FIG. 36.
Figure 40:
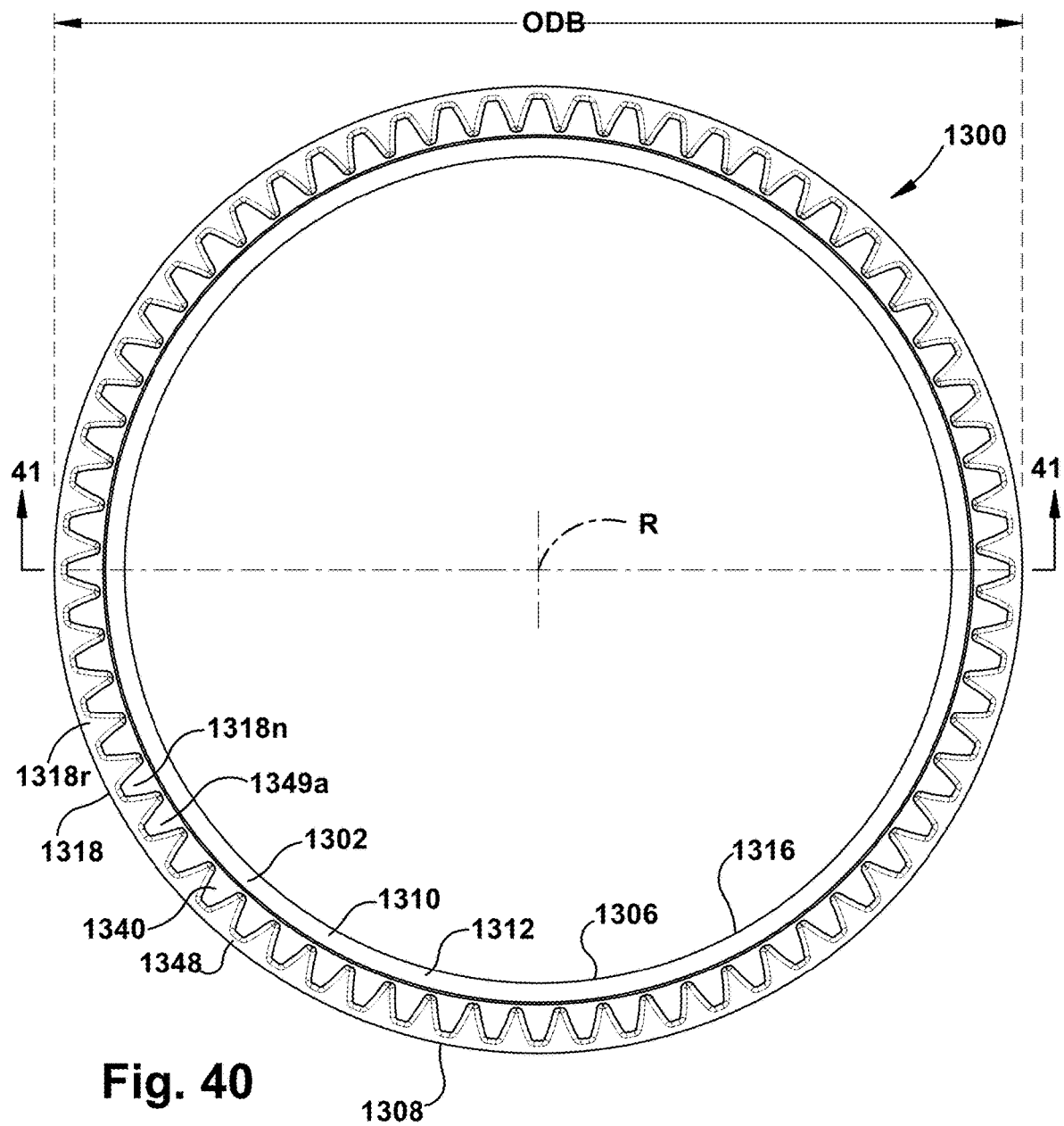
FIG. 40 is a schematic top plan view of the annular rotary knife blade of the head assembly of the power operated rotary knife of FIG. 29.
Figure 41:
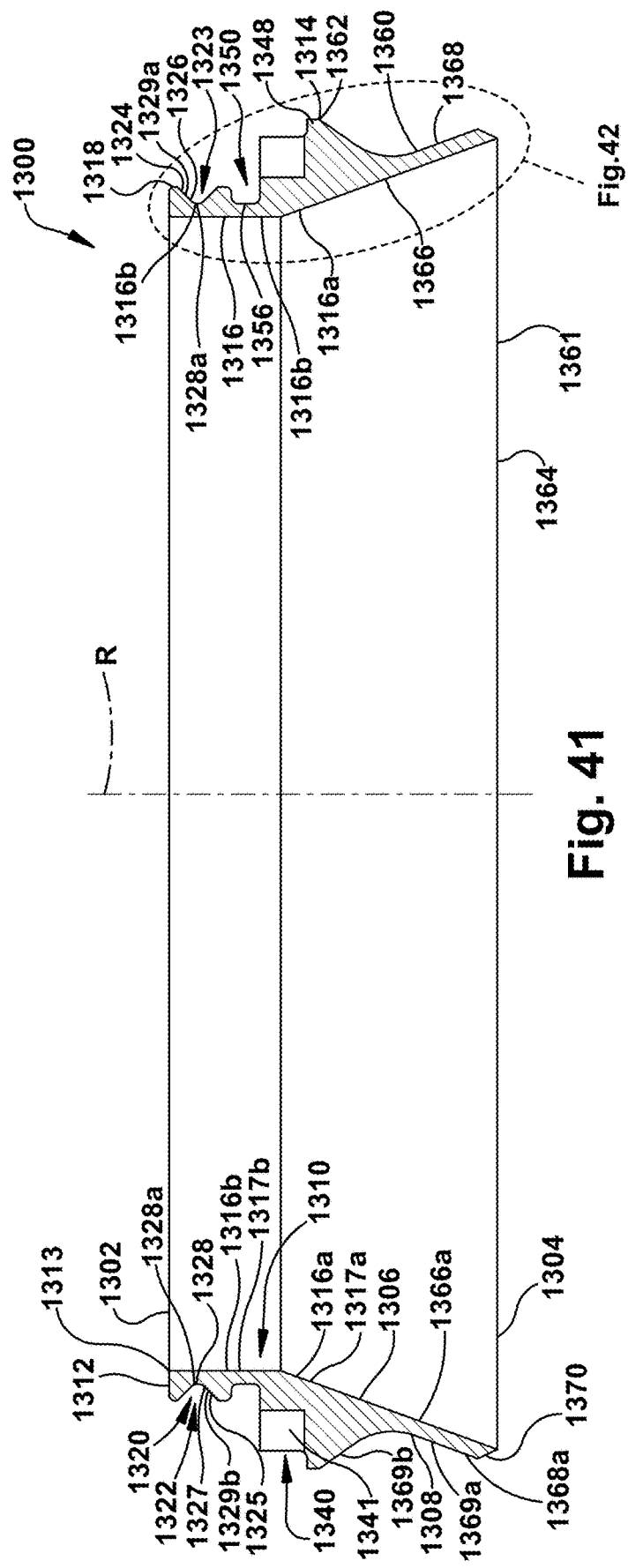
FIG. 41 is a schematic vertical section view of the annular rotary knife blade of FIG. 40, as seen from a plane indicated by the line 41-41 in FIG. 40.

The head assembly 1200 includes the frame body 1250 which serves to support both the gearbox assembly 1210 and the assembled blade—blade housing combination 1500 (FIG. 39). As can best be seen in FIGS. 30, 33-34 and 38, the gearbox housing 1212 includes an inverted U-shaped forward section 1218 and a lower generally rectangular base 1220 extending below the forward section 1218. The gearbox housing also includes a cylindrical rearward section 1216 to which the handle assembly 1110 is releasably attached. The gearbox housing 1212 is slidably received within a generally horizontally extending cavity 1255 (FIG. 34) defined by the frame body 1250. The horizontally extending cavity 1255 of the frame body 1250 includes an upper socket 1256 defined by a central cylindrical region 1254 of the frame body 1250 and a lower opening 1290 defined by a rectangular base 1280 of the frame body 1250. The rectangular base 1220 of the frame body 1250 extends axially below the central cylindrical region 1254 and is defined by a bottom wall 1282 and a pair of side walls 1284 extending upwardly from the bottom wall 1282.

To secure the gearbox assembly 1210 to the frame body 1250, the gearbox assembly 1210 is aligned with and moved toward a proximal end 1257 of the frame body 1250. As the gearbox housing 1212 is moved forward or slid into the cavity 1255 of the frame body 1250, the U-shaped forward section 1218 of the gearbox housing 1212 slides into the upper socket 1256 of the frame body 1250 and the rectangular base 1220 of the gearbox housing 1212 slides into the lower opening 1290 of the frame body 1250. Sufficient clearance is provided such that the gear train 1604, supported by the gearbox housing 1212, is also received within the lower opening 1290 of the frame body 1250. To releasably secure the gearbox assembly 1210 to the frame body 1250 and position a double drive gear 1650 of the gear train 1604 to operatively engage and rotate a driven gear 1340 of the rotary knife blade 1300, a pair of threaded fasteners 1292 pass through a respective pair of horizontally extending openings 1221 of the rectangular base 1220 and thread into threaded openings formed in of the frame body 1250. The head assembly 1200 further includes a lubrication assembly 1295 to provide lubrication to the components of the gear train 1604. As discussed below, in one exemplary embodiment, the rotary knife blade 1300 is a straight blade style rotary knife blade. Typically, a straight blade style rotary knife blade does not require a steeling assembly to straighten the cutting edge of the blade. Accordingly, in the exemplary embodiment of the power operated rotary knife 1000, there is no steeling assembly. It should be recognized, of course, that depending on the rotary knife blade style (e.g., hook rotary knife blade style) utilized with the power operated rotary knife 1000, the power operated rotary knife may be fabricated to include a steeling assembly, similar to the steeling assembly 299 of the power operated rotary knife 100.

Rotary Knife Blade 1300

In one exemplary embodiment of the present disclosure, the rotary knife blade 1300 of the power operated rotary knife 1000 is a one-piece, continuous annular structure that is supported by the blade housing 1400 and rotates about the central axis of rotation R. As can best be seen in FIGS. 39-42, the rotary knife blade 1300 includes an upper end 1302, and an axially spaced apart lower end 1304, the lower end 1304 including a cutting edge 1361 of the blade 1300. The rotary knife blade 1300 further includes an inner wall 1306 and a radially spaced apart outer wall 1308. The rotary knife blade 1300 is comprised of an upper annular body 1310 and an annular blade section 1360 extending axially downwardly from the body 1310. As can be seen in FIGS. 38-42, the body 1310 and the blade section 1360 are both radially centered about the central axis of rotation R, that is, the body 1310 and the blade section 1360 are both concentric about the central axis of rotation R.

Figure 42:
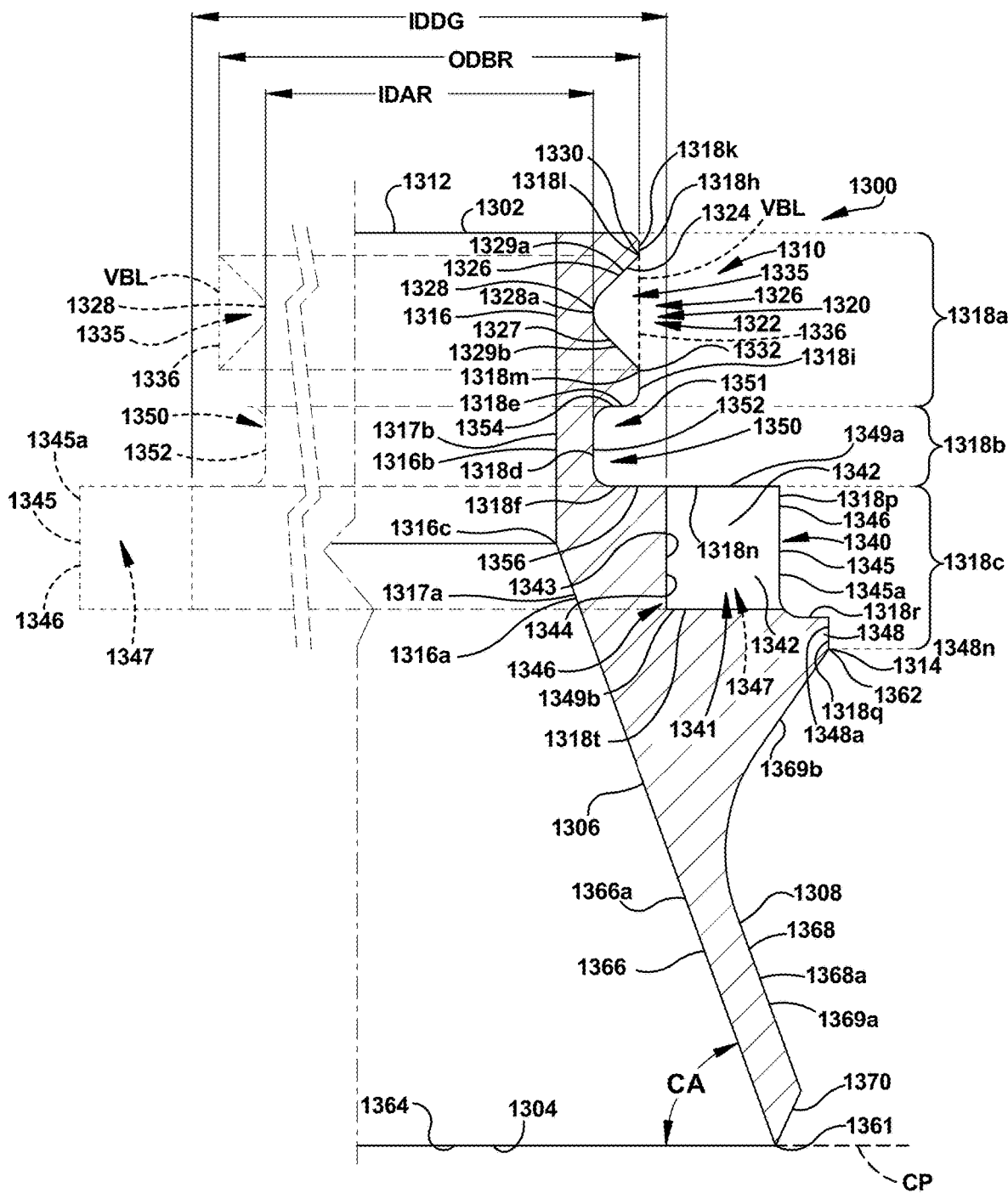
FIG. 42 is a schematic enlarged section view of a portion of the annular rotary knife blade of FIG. 40 that is within a dashed circle labeled FIG. 42 in FIG. 41.

In one exemplary embodiment, the rotary knife blade 1300 is a straight blade style rotary knife blade having the blade section 1360 extending generally axially downwardly with respect to the body 1310 and defining an acute cutting angle CA (FIG. 42). The cutting angle CA of the straight blade 1500 is very "steep" and more aggressive than the flat blade 300 or a hook blade style rotary knife blade. The straight blade style rotary knife blade 1300 is particularly useful when make deep or plunge cuts into a product, i.e., making a deep cut into a meat product for the purpose of removing connective tissue/gristle adjacent a bone. The generally planar inner wall 1366 of the blade section 1360 comprises a lower part of the inner wall 1306 of the rotary knife blade 1300. Other rotary knife blade styles, such as hook blade and straight blade styles, are suitable for use with the power operated rotary knife 1000 and the present disclosure contemplates differing styles and sizes of rotary knife blades and associated blade housing for rotational support of such differing blades.

The annular body 1310 includes an upper end 1312, which corresponds to the upper end 1302 of the rotary knife blade 1300, and an axially space apart lower end 1314, which defines a boundary between the body 1310 and the blade section 1360 of the rotary knife blade 1300. The annular body 1310 further includes an inner wall 1316, defining a portion of the blade inner wall 1306, and, spaced radially outwardly (that is in a radial direction away from the blade axis of rotation R) from the inner wall 1316 is an outer wall 1318 of the body 1310. The outer wall 1318 of the body 1310 defines a portion of the blade outer wall 1308. The outer wall 1318 of the body 1310 comprises three regions or portions, an upper portion 1318a adjacent the upper end 1312 of the body 1310, a middle portion 1318b, and a lower portion 1318c adjacent the lower end 1314 of the body 1310. The upper portion 1318a of the outer wall 1318 of the blade annular body 1310 includes a radially inwardly extending annular bearing region or groove 1320. The middle portion 1318b of the outer wall 1318 includes an annular recess or channel 1350 that defines an outer wall diameter IDAR. The outer wall diameter IDAR of the annular channel 1350 defines a minimum outer wall diameter of the body 1310. Because the rotary knife blade 1300 is a straight blade style rotary knife, the outer wall diameter IDAR also defines the minimum diameter of the outer wall 1308 of the rotary knife blade 1300. The lower portion 1318c of the outer wall 1318 of the blade annular body 1310 defines the annular driven gear 1340 and a radially outwardly stepped annular boss 1348 at the lower end 1314 of the body 1310.

In one exemplary embodiment, the bearing region 1320 of the rotary knife blade 1300 comprises the annular bearing race 1322 that extends radially inwardly, that is, in a direction toward the central axis of rotation R of the rotary knife blade 1300, in the upper portion 1318a of the body outer wall 1318. The annular driven gear 1340, which comprises a driven gear region 1340a, extends radially inwardly in the lower portion 1318c of the body outer wall 1318. Both the bearing race 1322 and the driven gear 1340 are axially spaced from an upper end 1306 of the body 1310 of the blade 1300 and from each other. Both the bearing race 1322, the driven gear 1340, and the annular channel 1350 are formed into or machined into a radial outermost extent of the outer wall 1318 of the blade body 1310 (as defined by the annular boss 1349 at the lower end 1314 of the body 1310) and define portions of the body outer wall 1310.

The blade section 1360 of the rotary knife blade 1300 includes an upper end 1362, which defines the boundary between the body 1302 and the blade section 1360, and an axially spaced apart lower end 1364. The lower end 1364 of the blade section 1360 includes the cutting edge 1361 of the rotary knife blade 1300. The knife blade section 1360 includes an inner wall 1366, defining a portion of the blade inner wall 1306, and a radially spaced apart outer wall 1368, defining a portion of the blade outer wall 1308. The outer wall 1368 of the blade section 1360 includes a lower linear portion 1369a and an upper arcuate portion 1369b. The upper arcuate portion 1369b extends radially outwardly and upwardly from the lower linear portion 1369a to upper end 1362 of the blade section 1360. The upper end 1362 of the blade section 1360 is in proximity to the annular boss 1348 of the body 1310 which defines the outer diameter ODB of the rotary knife blade 1300. Hence, the upper arcuate portion 1369b sweeps outwardly as it approaches the upper end 1362 of the blade section 1360. The inner wall 1366 and the lower linear portion 1369a of the outer wall 1368 are generally parallel and, when viewed in three dimensions define a pair of radially spaced apart frustoconical surfaces 1366a, 1369a centered about the blade central axis of rotation R. The cutting edge 1361 defines a circular or cutting opening CO of the rotary knife blade 1300 through which trimmed or cut material passes. Additionally, the cutting edge 1361 defines the cutting plane CP of the rotary knife blade 1300. The blade cutting plane CP is substantially orthogonal to the blade central axis of rotation R. Cut or trimmed material flows or moves from the cutting edge 1361 through the cutting opening CO, along the inner wall 1306 of the rotary knife blade 1300, that is, along the inner wall 1366 of the blade section, then along the inner wall 1316 of the annular body 1310, in a generally upward direction UP from the cutting edge 1361 to a circular exit opening EO defined by a vertex 1313 between the inner wall 1316 of the body 1310 and the upper end 1312 of the body 1310. In one exemplary embodiment of the rotary knife blade 1300, the cutting opening CO is approximately 2.07 in. The vertex 1313 also defines the intersection between the inner wall 1306 and the upper end 1302 of the rotary knife blade 1300. The cutting edge 1361 is formed at the intersection of the inner wall 1366 and a short horizontal region 1370 bridging the inner and outer walls 1366, 1368 of the blade section 1360. The cutting edge 1361 defines both the lower end 1364 of the blade section 1360 and the lower end 1304 of the rotary knife blade 1300.

Turning to the annular body 1310 of the rotary knife blade 1300, as mentioned above, the outer wall 1318 of the blade annular body 1310 includes three portions, the upper portion 1318a, the middle portion 1318b, and the lower portion 1318c. The upper portion 1318a includes the annular bearing region or groove 1320, defining, in one exemplary embodiment, a radially inwardly extending annular bearing race 1322. The lower portion 1318c includes the annular driven gear 1340. The middle portion 1318b is located between and axially spaces the bearing race 1322 from the driven gear 1340. The middle portion 1318b includes the annular, radially inwardly extending groove or channel 1350. The channel 1350 defines a generally rectangular inner region 1351 that that includes a vertical outer wall section 1318d. The vertical outer wall section 1318d defines a radial, cylindrical-shaped inner surface 1352 of the annular channel 1350. As can be seen in FIG. 42, the cylindrical radially inner surface 1352 of the annular channel 1350, in turn, defines a minimum outer wall diameter IDAR of the blade body 1310. That is, the inner surface 1352 of the annular channel 1350, as measured radially across the central axis of rotation of the blade 300, defines a minimum diameter value of the outer wall 1318 of the body 1310 of the rotary knife blade 1300. Additionally, given that the rotary knife blade 1300 is a straight blade style rotary knife blade, the outer wall diameter IDAR defined by the radially inner surface 1352 also defines a minimum outer wall diameter of the rotary knife blade 1300. Stated another way, the radially inner surface 1352 of the annular channel 1350 is radially inward (that is, radially closer to the blade central axis of rotation R) of both a first upper end 1330 and a second lower end 1332 of the annular bearing race 1322. Further, in one exemplary embodiment, the radially inner surface 1352 of the annular channel 1350 is disposed at a radial position (with respect the blade central axis of rotation R) that is radially equal to or slightly radially inward of a central surface 1328 of the annular bearing race 1322. The central surface 1328 of the bearing race defines a minimum inner diameter of the bearing race 1322, as measured radially across the blade 300 on a radial diameter passing through the central axis of rotation of the rotary knife blade 1300. As can best be seen in FIG. 42, the minimum inner diameter of the bearing race 1322 is substantially equal to or slightly greater than the outer wall diameter IDAR of the annular channel 1350. The radially inner surface 1352 is also radially inward of a radially innermost extent of the driven gear 2340, as defined by a cylindrical base 1343 of a set of gear teeth 1341 of the driven gear 1340. The annular channel 1350 is further defined by and includes an upper, radially extending substantially horizontal section 1318e of the outer wall 1318 and a lower, radially extending substantially horizontal section 1318f of the outer wall 1318. The upper and lower horizontal sections 1318e, 1318f of the annular channel 1350 define upper and lower ends or ledges 1354, 1356 of the annular channel 1350, respectively. The upper and lower horizontal sections 1318e, 1318f of the annular channel 1350 are axially spaced by the vertical outer wall portion 1318d defining the radial, cylindrical shaped inner surface 1352 of the annular channel 1350.

In one exemplary embodiment, as can best be seen in FIG. 42, the bearing region 1320 of the rotary knife blade 1300 comprises the annular bearing race or groove 1322. The bearing race 1322 extends along the upper portion 1318a of the outer wall 1318 between an upper end 1330 and an axially aligned lower end 1332. The bearing race 1322 extends inwardly, that is, in a direction toward the central axis of rotation R of the rotary knife blade 1300, into an upper, substantially vertical (when viewed in two dimensions) or cylindrical (when viewed in three dimensions) section 1318*k* of the upper portion 1318*a* of the body outer wall 1318. The cylindrical, vertical section 1318*k* of the upper portion 1318*a* includes a first upper portion 1318*h* and an axially aligned second lower portion 1318*i*. The first upper portion 1318*h* of the cylindrical section 1318*k* of the outer wall 1318 of the body 1310 extends axially above the annular bearing race 1322, while the axially aligned second lower portion 1318*i* of the cylindrical section 1318*k* of the body outer wall 1318 extends axially below the bearing race 1322. When viewed in a section view, the bearing race 1322 defines a generally V-shaped opening 1323 extending radially into the vertical, cylindrical section 1318*k* of the upper portion 1318*a* of the outer wall 1318 of the blade body 1310.

The V-shaped opening 1323 is defined by an angled or sloped upper region 1324 and an axially spaced apart angled or sloped lower region 1325 of the outer wall 1318 of the blade body 1310. The angled upper and lower regions 1324, 1325 of the V-shaped opening 1323 define generally frustoconical bearing surfaces 1326, 1327 of the rotary knife blade 1300. Portions of the respective bearing surfaces 1326, 1327 of the annular bearing race 1322 are contacted by respective bearing faces 1466*a*, 1466*b* of a blade housing bearing bead 1462 of a blade support section 1450 of the blade housing 1400 to define the blade—blade housing bearing structure 1550. In one exemplary embodiment, the bearing faces 1466*a*, 1466*b* of the blade housing bearing bead 1462 comprised generally frustoconical upper and lower bearing faces that converge in a direction proceeding toward each other. As is best seen in FIG. 39, the bearing faces 1466*a*, 1466*b* of the blade housing bearing bead 1462 substantially match the respective angles or slopes of the upper and lower bearing surfaces 1326, 1327 of the rotary knife blade 1300. Stated another way, when viewed in two dimensions (such as the section view of FIGS. 39 and 48), the frustoconical bearing faces 1466*a*, 1466*b* of the blade housing bearing bead 1462 comprise substantially flat, angled, converging bearing surfaces 1465*a*, 1465*b* which substantially match the respective angles or slopes of the frustoconical upper and lower bearing surfaces 1326, 1327 of the bearing race 1322 of the outer wall 1318 of the rotary knife blade 1300. Advantageously, the matching angles or slopes of the frustoconical bearing faces 1466*a*, 1466*b* of the blade housing bearing bead 1462 and respective the frustoconical upper and lower bearing surfaces 1326, 1327 of the rotary knife blade 1300 provides for increased stability and reduced vibration of the rotary knife blade 1300 as it rotates about the central axis of rotation R within the blade housing 1400. Portions of the upper and lower bearing surfaces 1326, 1327 contacted by the frustoconical bearing faces 1466*a*, 1466*b* of the blade housing bearing bead 1462 are referred to as upper and lower bearing faces 1329*a*, 1329*b*. In one exemplary embodiment, the bearing surfaces 1326, 1327 are flat, defining frustoconical surfaces when viewed in three dimensions. Similarly, the bearing faces 1329*a*, 1329*b* are flat, defining frustoconical surfaces when viewed in three dimensions.

Extending between and bridging the upper region 1324 and the lower region 1325 of the outer wall 1318 is the short, generally arcuate region or central surface 1328 of the bearing race 1322 of the outer wall 1318. A vertex or center 1328*a* of the central surface 1328 defines a radially innermost point of the bearing race 1322, that is, the vertex 1328*a* defines a minimum inner diameter of the bearing race 1322, as measured radially across the rotary knife blade 300 and extending through the blade central axis of rotation R. In one exemplary embodiment, as noted above, the minimum inner diameter of the bearing race 1322, as measured 180° across the blade central axis of rotation R, is equal to or slightly greater than the outer wall diameter IDAR of the annular channel 1350. When the minimum inner diameter of the bearing race 1322 is equal to the outer wall diameter IDAR of the annular channel 1350, both the inner surface 1352 of the annular channel 1350 and the vertex 1328*a* of the bearing race 1322 define the a minimum outer wall diameter of the body 1310. In one exemplary embodiment of the rotary knife blade 1300, a radial distance between the central axis of rotation R and the radially inner surface 1352 of the annular channel 1350 is substantially equal to a radial distance between the central axis of rotation R and the central surface 1328 of the annular bearing race 1322. In an alternate exemplary embodiment of the rotary knife blade 1300, a radial distance between the central axis of rotation R and the radially inner surface 1352 of the annular channel 1350 is slightly less than a radial distance between the central axis of rotation R and the central surface 1328 of the annular bearing race 1322.

As can best be seen in FIG. 42, the first upper bearing surface 1326 and the axially spaced apart second lower bearing surface 1327 converge radially inwardly toward each other and toward the central surface 1328, bridging the first and second bearing surfaces 1326, 1328. That is, the upper bearing surface 1326 converges in a direction proceeding toward the lower bearing surface 1327 and, similarly, the lower bearing surface 1327 converges in a direction proceeding toward the upper bearing surface 1326. The central surface 1328 defines the radially innermost region of the annular bearing race 1322.

At an upper end 1330, the V-shaped bearing race 1322 terminates at an upper transition point 1318*l* of the outer wall 1318 of the body 1310 between the upper vertical portion 1318*h* of the cylindrical section 1318*k* and the upper bearing surface 1326. At a lower end 1332, the V-shaped bearing race 1322 terminates at a lower transition point 1318*m* between the lower vertical portion 1318*i* of the cylindrical section 1318*k* and the lower bearing surface 1327. The effective outer surface or outer extent of the bearing race 1322 is defined by a vertical line VBL extending vertically from the upper transition point 1318*l* to the lower transition point 1318*m*. The vertical line VBL (as defined by upper and lower ends 1330, 1332 of the bearing race 1322) also defines a maximum outer diameter ODBR of the bearing race ODBG. Thus, the lower end 1332 of the annular bearing race 1322 is axially spaced from the upper end 1354 of the annular channel 1350 by the lower vertical cylindrical portion 1318*i* of the cylindrical section 1318*k*. When viewed in three dimensions, the bearing race 1322 defines an annular volume 1335. The annular volume 1335, when viewed in section view, is generally triangular, with a base 1336 (FIG. 42) of the triangle being the vertical line VBL extending between the upper end 1330 and the lower end 1332 of the bearing race 1322. The horizontal section 1318*e* of the annular body outer wall 1318 defines a boundary between the upper portion 1318*a* of the outer wall 1318, which includes the bearing race 1322, and the middle portion 1318*b* of the outer wall 1318, which includes the annular channel 1350. Stated another way, the outer wall 1318 includes the vertical portion 1318*i* and the horizontal section 1318*e*, which extend axially downwardly and radially inwardly between the lower end 1332 of the annular bearing race 1322 and the inner radial surface 1352 of the annular channel 1350. The substantially horizontal section 1318e of the outer wall 318 of the body 310 defines the upper end 1354 of the annular channel 1350. As noted above, the annular channel 1350 is further defined by a vertical section 1318d of the outer wall middle portion 318b that defines the radial inner surface 1352 of the annular channel 1350 and a horizontal section 1318f of the outer wall middle portion 1318b that defines the lower end or edge 1356 of the annular channel 1350. The upper and lower ends 1354, 1356 and the radial cylindrically-shaped inner surface 1352 of the annular bearing race 1322 form the substantially rectangular inner region 1351 defined by the annular channel 1350.

Both the bearing race 1322 and the driven gear 1340 are axially spaced from the upper end 1312 of the body 1310 of the rotary knife blade 1300 and are axially spaced from each other by the annular channel 1350. The bearing race 1322, the driven gear 1340 and the annular channel 1350 are formed or machined into the outer wall 1318 of the blade body 1310, respectively. In one exemplary embodiment of the rotary knife blade 1300, because the blade 1300 is a straight blade style blade, an outer diameter of the blade body 1310 is equal to the blade outer diameter ODB. The blade outer diameter ODB is defined by a radially outer surface 1348a of the annular boss 1348. The annular boss 1348 is disposed at and defines the lower end 1314 of the blade body 1310. The bearing race 1322 and the driven gear 1340 form or define portions of the outer wall 1318 of the body 1310, as does the annular channel 1350 and as does the stepped boss 1348 disposed axially below the driven gear 1340.

As discussed above, the mating annular land 1470 of the blade support section 1450 is received into the annular channel 1350 of the blade body 1310 forming a labyrinth seal. Advantageously, the radially inward recess of the annular channel 1350, defining the minimum diameter or surface IDAR of the inner wall ODB of the rotary knife blade 300 and its position between or intermediate the bearing race 1322 and the driven gear 1340 mitigates the ingress of debris generated at the cutting edge 1361 into the blade—blade housing bearing structure 1500, as comprised by the blade bearing race 1322 and the blade housing bearing bead 1462. Stated another way, the labyrinth seal defined by the blade housing annular land 1470 extending into the annular channel 1350 of the blade body 1310 and the fact the annular channel 1350 is positioned intermediate the bearing race 1322 and the driven gear 1340 inhibits debris which may have worked their way into the driven gear region 1340a from moving upwardly into the blade—blade housing bearing structure 1500 and, specifically, into the radially inwardly extending blade bearing race 1322. Similarly and advantageously, the labyrinth seal defined by the blade housing annular land 1470 extending into the annular channel 1350 of the blade body 1310 and the fact the annular channel 1350 is positioned intermediate the bearing race 1322 and the driven gear 1340 inhibits debris which may have worked their way into the blade—blade housing bearing structure 1500 from moving downwardly into the driven gear 1340.

Additionally, the annular channel 1350 of the rotary knife blade 1300 advantageously serves to limit, by a hard stop, axial movement of the blade 1300 within the blade housing 1400. The blade housing 1400 is a split blade housing to allow for expansion of the blade housing for the purpose of changing rotary knife blades. Sufficient operating or running clearance is necessary so that rotary knife blade 1300 rotates relatively freely within the blade housing 1400, reducing friction and thereby reducing heat generated in the blade—blade housing bearing interface region 1520. However, if too great of an operating or running clearance is provided, that is, the diameter of the blade housing 1400 is too great, for example, because the operator did not adjust the blade housing diameter appropriately when changing rotary knife blades or for some reason during use of the power operated rotary knife 1000, the blade housing diameter increased causing the rotary knife blade 1300 to be excessively loose within the blade housing 1400, the annular channel 1350 functions as a hard stop to prevent excessive axial movement of the blade 1300 within the blade housing 1400. That is, as explained above, the blade housing annular land 1470 is received in or interfits in the blade annular channel 1350. The generally sideways U-shaped annular channel 1350 is formed by a horizontal upper ledge 1354, the vertical wall 1352 and the horizontal lower ledge 1356. When viewed in section, the channel 1350 defines the generally rectangular interior region 1351. Excessive movement of the blade 1300 with respect to the blade housing 1400 in an axial upward direction UP would be stopped by contact or a hard stop between an upper end 1472 of the annular land 1470 and the horizontal upper ledge 1354 defining the annular channel 1350. Excessive movement of the blade 1300 with respect to the blade housing 1400 in an axial downward direction DW would be stopped by contact between a lower end 1473 of the annular land 1470 and the horizontal lower ledge 1356 of the blade annular channel 1350.

The driven gear 1340 includes a plurality or set of circumferentially spaced apart gear teeth 1341. The individual teeth 1342 of set of gear teeth 1341 of the driven gear 1340 extend radially outwardly from a cylindrical root or base or inner surface 1343 defined by a bottom land 1344 between adjacent gear teeth 1343 to a cylindrical top or outer surface 1345 defined by the respective top lands 1346 of the set of gear teeth 1341. The cylindrical top or outer surface 1345 defined by the top lands 1346 defines a radially outermost surface or region 1345a of the driven gear 1340, that is, the cylindrical top 1345 defines a maximum outer diameter of the driven gear 1340 and the cylindrical root or inner surface 1343 defines a minimum or inner diameter IDDG of the driven gear 1340, as measured radially with respect to the blade central axis of rotation R. Stated another way, the annular driven gear 1340 includes the inner surface or base 1343 and the radially spaced apart outer surface or top 1345, the outer surface or top 1345 defining the radially outermost surface or region 1345a of the annular driven gear 1340 and the inner surface or base 1343 defining the inner diameter IDDG of the driven gear 1340. As can be seen in FIG. 42, the inner diameter IDDG of the driven gear 1340 is larger than the outer diameter ODBR of the annular bearing race 1322, which, in turn, is larger than the inner diameter IDAR of the annular channel 1350. Stated another way, the inner surface 1343 of the annular driven gear 1340 is radially outward of the entirety of the bearing race 1322, including the upper and lower ends 1330, 1332 of the bearing race. A radial distance between the central axis of rotation R and the radially inner surface 1352 of the annular channel 1350 is less than a radial distance between the central axis of rotation R and the inner surface 1343 of the annular driven gear 1340.

The driven gear 1340 includes an upper end 1349a and an axially spaced apart lower end 1349b corresponding to a horizontal upper section 1318n and a horizontal lower section 1318t of the lower portion 1318c of the outer wall 1318 of the body 1310. The horizontal upper section 1318n extends horizontally from the lower ledge 1318*f* defining the lower end 1356 of the annular channel 1350. As such, as schematically shown in FIG. 42, when viewed in three dimensions, the driven gear 1340 defines an annular volume 1347 bounded by the cylindrical base 1343 on a radially inner side, the cylindrical top 1345 on a radially outer side, the horizontal upper section 1318*n* on an axially upper side and the horizontal lower section 1318*t* on an axially lower side. The annular volume 1347 defined by the drive gear 1340, when viewed in section view, is generally rectangular. In one exemplary embodiment, the driven gear 1340 comprises a spur gear wherein the set of gear teeth 1341 are involute gear teeth, that is, the profiles of the gear teeth 1342 are involutes of a circle. Being a spur gear, the driven gear 1340 is cylindrical or disc-shaped and the teeth 1342 of the driven gear 1340 project radially outwardly with respect to the blade central axis of rotation R. Viewed axially, the wall or edge of each tooth 1342 is straight and aligned with the blade central axis of rotation R. The configuration of the rotary knife blade 1300, wherein the set of gear teeth 1341 of the driven gear 1340 are both axially spaced from the upper end 1312 of the knife blade body 1310 and inwardly offset from the outermost extent 1348*a* of the blade body outer wall 318 is sometimes referred to as a "blind gear tooth" configuration. Advantageously, the driven gear 1340 of the rotary knife blade 1300 of the present disclosure is in a relatively protected position with respect to the knife blade body 1310. That is, the driven gear 1340 is in a position on the knife blade body 1310 where there is less likely to be damage to the set of gear teeth 1341 during handling of the rotary knife blade 1300 and, during operation of the power operated rotary knife 1000, there is less ingress of debris, such as small pieces fat, meat, bone and gristle generated during cutting and trimming operations, into the gear teeth region 1340*a*. In one exemplary embodiment, the driven gear outer diameter ODDG is 2.06 in. and the driven gear 1340 comprises a spur gear with 64 gear teeth, a 32 diametrical pitch and a 20° pressure angle. In one exemplary embodiment, an overall axial height of the rotary knife blade 1300 is approximately 0.500 in.

A lowest section of the lower portion 1318*c* of the body outer wall 1318 axially below the driven gear 1340 defines the annular radially outwardly stepped boss 1348. The boss 1348 is defined by a vertical section 1318*q* of the outer wall 318, which defines the radially outer surface 1348*a* of the boss 1348, and a horizontal section 1348*r*. Note that the horizontal section 1348*r* is slightly axially below or offset from the horizontal section 1318*t*, which defines the lower end 1349*b* of the driven gear 1340. The lower end of the vertical section 1318*q* of the annular boss 1348 defines the lower end 1314 of the blade body 1310. Debris generated at the cutting edge 1361, by virtue of the rotation of the rotary knife blade 1300 and the movement of the blade 1300 through the material being cut or trimmed, tends to move upwardly along the outer wall 1368 of the blade section 1360. Advantageously, the radially outwardly protruding annular boss 1348 impedes the movement of such debris along the outer wall 1368 of the blade section 1360 from entering into the region of the driven gear 1340. Both the radially outwardly protruding annular boss 1348, disposed axially below the driven gear 1340, and the radially inwardly protruding annular channel 1350, disposed axially between the driven gear 1340 and the bearing race 1322, advantageously impede debris generated at the blade cutting edge 1361 from moving upwardly along the outer wall 318 of the annular body 310 into the blade bearing region 1320 and specifically the blade bearing race 1322.

The inner wall 1306 of the rotary knife blade 1300 includes a frustoconical lower section (defined by frustoconical section 1366*a* of the blade section 1360 and frustoconical section 1316*a* of the body section 1310) and a cylindrical upper section (defined by cylindrical section 1316*b* of the body section 1310) to provide for smooth movement of cut or trimmed material in an upward direction UP from the cutting opening CO defined by the blade cutting edge 1361 to the exit opening EO defined by the upper end 1312 of the blade annular body 1310. In the blade section 1360 of the rotary knife blade 1300, the inner wall 1366 defines a substantially surface 1366*a*. As noted above, in the blade section 1360 of the rotary knife blade 1300, the outer wall 1368 includes the first lower linear portion 1369*a* and the upper arcuate portion 1369*b*. The lower linear portion 1369*a* of the outer wall 1368 is generally parallel to the blade section inner wall 1366 and, when viewed in three dimensions define a pair of radially spaced apart frustoconical surfaces 1366*a*, 1369*a* centered about the blade central axis of rotation R. The upper arcuate portion 1369*b* of the outer wall 1368 extends radially outwardly and upwardly from the lower linear portion 1369*a* to the upper end 1362 of the blade section 1360 disposed at the lower end of the annular boss 1348 of the body 1310. In the body section 1310 of the rotary knife blade, the inner wall 1316 includes a lower angled section 1316*a*, defining a frustoconical surface, and an upper substantially vertical section 1316*b*, defining a cylindrical surface. The lower angled section 1316*a* of the body inner wall 1316 is aligned with and uninterruptedly continues the inner wall 1366 of the blade section 1360. Thus, the inner wall 1366 of the rotary knife blade 1300 extends from the cutting edge 1361 upwardly and outwardly along a generally straight line at an angle defined by the blade cutting angle CA. In the annular body section 1310 of the rotary knife blade 1300, the inner wall 1316 includes a transition point 1316*c* that marks an intersection between the lower angled, frustoconical section 1316*a* and the upper vertical, cylindrical section 1316*b*. Above the transition point 1316*c*, the inner wall 1366 of the rotary knife blade 1300 extends vertically upwardly, forming a cylinder that, at the body upper end 1312, defines the circular exit opening EO. As discussed elsewhere, other rotary knife blades styles, configurations, and sizes may also be used with the power operated rotary knife 1000.

Blade Housing 1400

Figure 43:
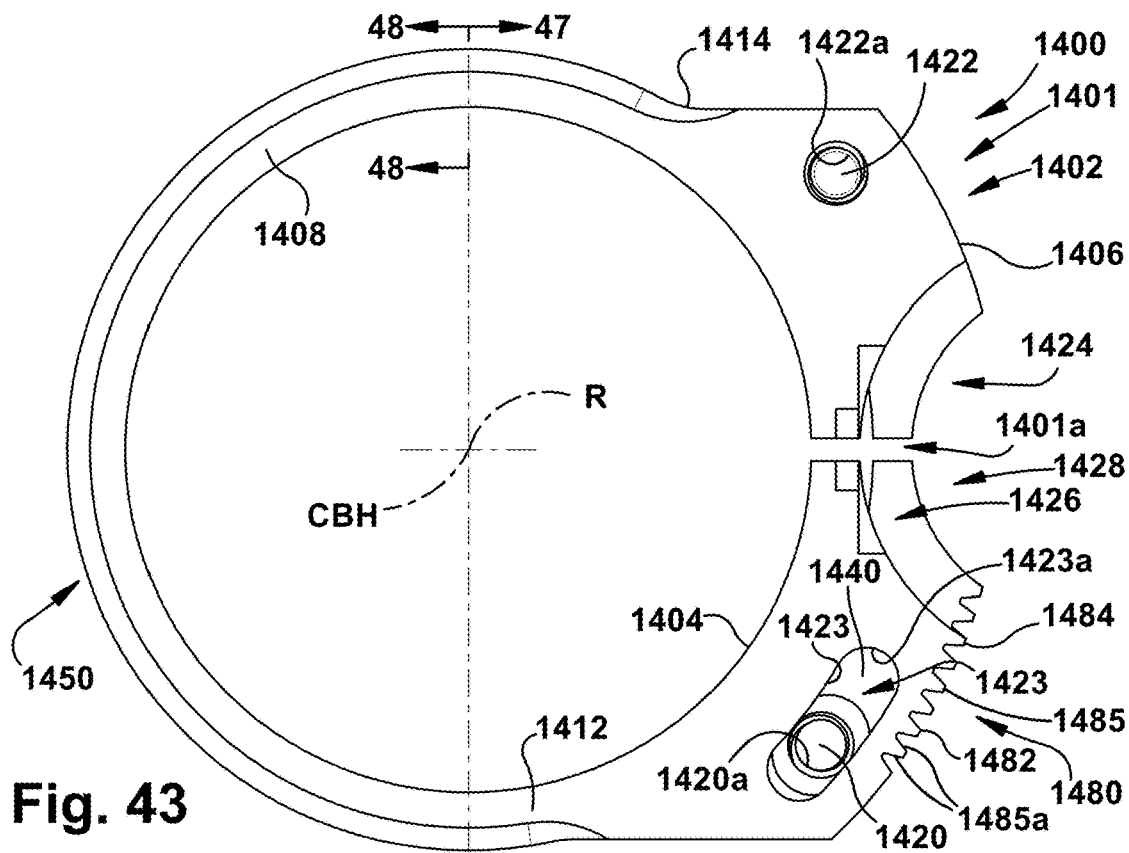
FIG. 43 is a schematic top plan view of the annular split ring blade housing of the head assembly of the power operated rotary knife of FIG. 29.
Figure 44:
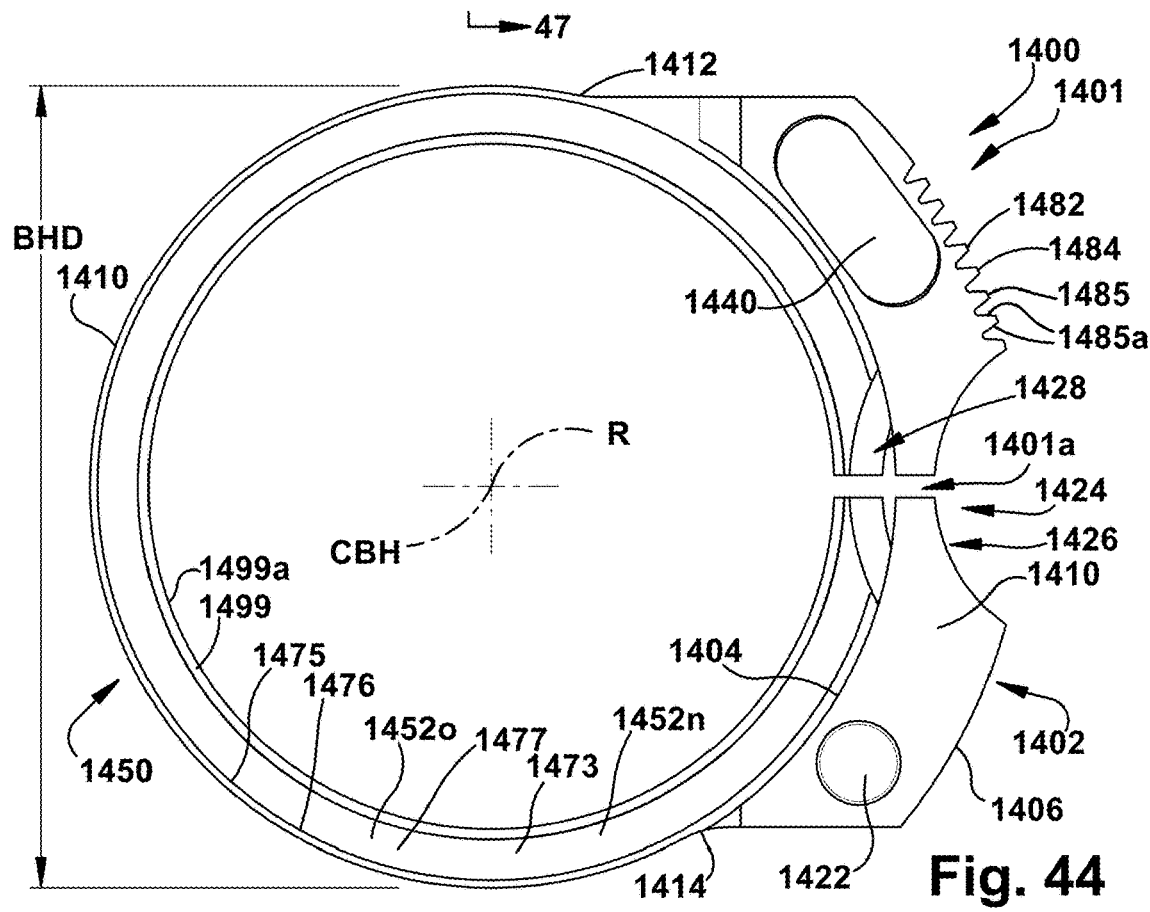
FIG. 44 is a schematic bottom plan view of the annular blade housing of FIG. 43.
Figure 45:
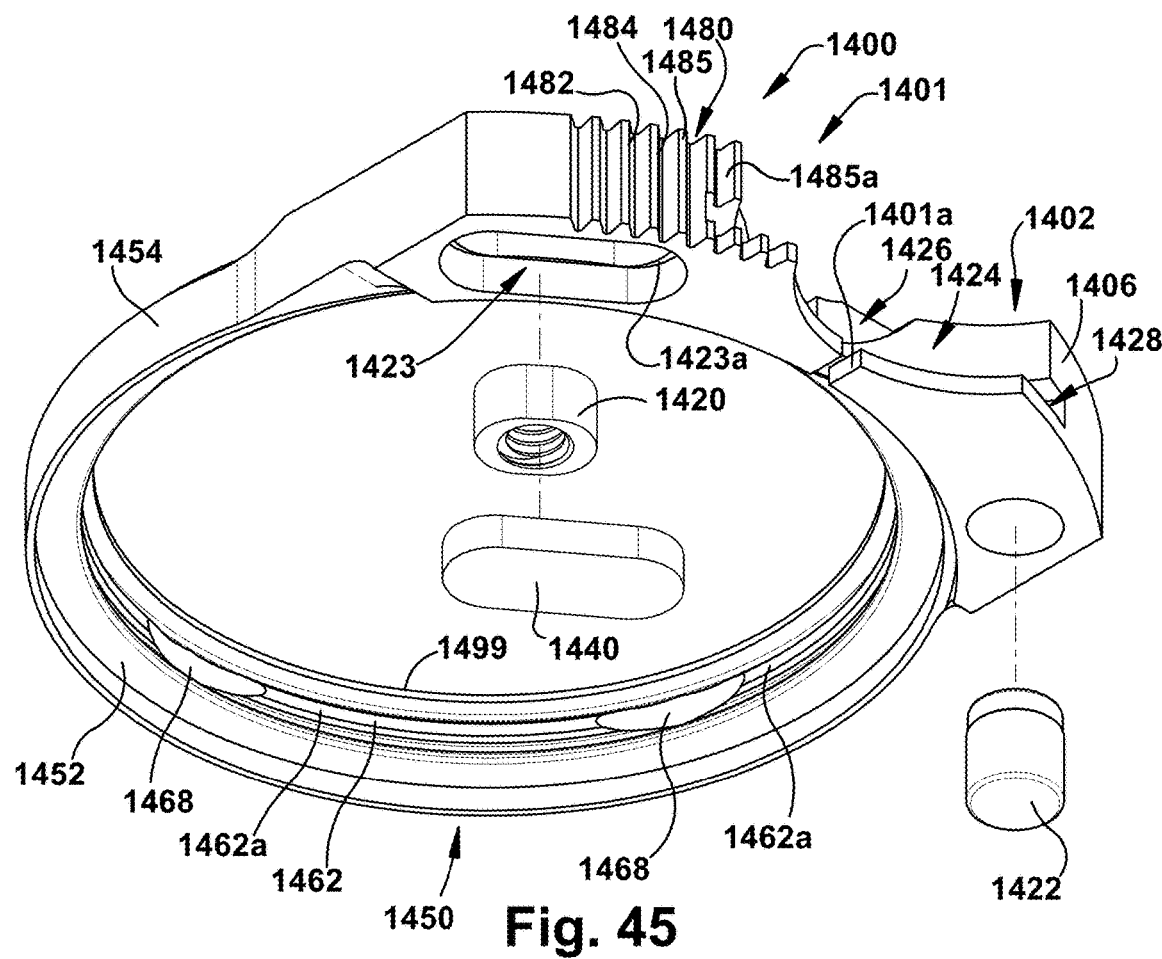
FIG. 45 is a schematic rear, bottom exploded perspective view of the annular blade housing of FIG. 43.
Figure 46:
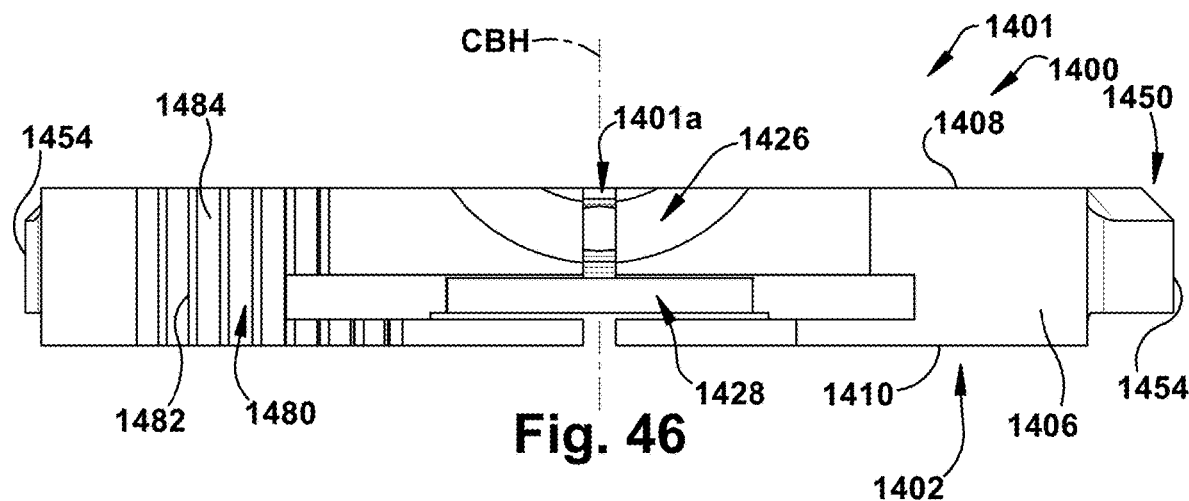
FIG. 46 is a schematic rear elevation view of the annular blade housing of FIG. 43.

As can best be seen in FIGS. 39 and 43-48, in one exemplary embodiment of the present disclosure, the blade housing 1400, that is, the annular split ring 1401, includes the mounting section 1402 and the blade support section 1450. The blade support section 1450 extends around the entire 360 degrees (360°) circumference of the blade housing 1400. The blade support section 1450, including inner and outer walls 1452, 1454 of the blade support section 1450, is centered about a center line CBH (FIGS. 43-44 and 46). When in assembled combination 1500 with the rotary knife blade 1300, the blade housing center line CBH is substantially coincident with the rotary knife blade central axis of rotation R. Stated another way, in assembled combination 1500, the rotary knife blade 1300 and the blade support section 1450 of the blade housing 1400 are substantially concentric with the rotary knife blade central axis of rotation R. The mounting section 1402 extends radially outwardly from the blade support section 1450 and subtends an angle of approximately 130°. Stated another way, the blade housing mounting section 1402 extends approximately just over ⅓ of the way around the circumference of the blade housing 1400. In the region of the mounting section 1402, the mounting section 1402 and the blade support section 1450 overlap. The mounting section 1402 is radially wider and slightly axially thicker than the blade support section 1450. The blade housing mounting section 1402 includes an inner wall 1404, a radially spaced apart outer wall 1406, a first upper end 1408 and an axially spaced apart second lower end 1410. The split 1401a of the blade housing 1400 extends from the inner wall 1404 through the outer wall 1406 of the mounting section 1402 to allow for expansion of the blade housing circumference or blade housing diameter BHD or blade housing circumference. Advantageously, a blade housing 1400 includes a blade housing diameter expansion mechanism 1480, similar to the blade housing diameter expansion mechanism 480 of the blade housing 400 of the power operated rotary knife 100 of the first exemplary embodiment. The blade housing diameter expansion mechanism 1480 provides an efficient and precise way for an operator of the power operated rotary knife 1000 to expand or contract the diameter of the blade housing 1400 for either changing the operating/running clearance of the rotary knife blade 1300 within the blade housing 1400 or for the purpose of changing the rotary knife blade 1300.

The mounting section 1402 includes forward ends 1412, 1414 that transition between the upper end 1408, lower end 1410 and outer wall 1406 of the mounting section 1402 and a corresponding upper end 1456, a lower end 1458 and an outer wall 1454 of the blade support section 1450. The blade housing mounting section 1402 includes a first movable mounting insert 1420 and a second fixed mounting insert 1422. The movable mounting insert 1420 is slidably captured within an expansion slot 1423 formed in the blade housing mounting section 1402. The expansion slot 1423 is generally oval in top plan view (FIG. 44) and extends axially between the upper and lower ends 1456, 1458 of the mounting section 1402. The movable mounting insert 1420 and the fixed mounting insert 1422 are spaced circumferentially and are on opposite sides of the blade housing split 1401a. The movable mounting insert 1420 and the expansion slot 1423 are part of the blade housing diameter expansion mechanism 1480. The stationary mounting insert 1422 extends between the upper and lower ends 1408, 1410 of the mounting section 1402. The sliding mounting insert 1420, which is captured in the expansion slot 1423, extends between the upper end 408 of the mounting section 1402 and an upper surface of a cover 1440, which is press fit into the expansion slot 1423 adjacent the lower end 1410 of the mounting section 1402. The mounting inserts 1420, 1422 define threaded openings 1420a, 1422a. The blade housing mounting section 1402 is received in a seating region 1252a defined by the arcuate mounting pedestal 1252 of the frame body 1250 and is secured to the frame body 1250 by a pair of threaded fasteners 1170, 1172. The pair of threaded fasteners 1270, 1272 extend through threaded openings 1260a, 1262a defined in a pair of arcuate arms 1260, 1262 of the frame body 1250 and thread into the threaded openings 1420a, 1422a of the blade housing mounting inserts 1420, 1422 to releasably secure the blade housing 1400 to the frame body 1250 and, thereby, couple the blade housing 1400 to the gearbox assembly 1210 of the head assembly 1200.

The expansion slot 1423 includes an upper, inwardly extending ledge 1423a adjacent the upper end 1408 of the mounting section 1402. This ledge 1423a limits axially upward movement of the movable mounting insert 1420 within the expansion slot 1423. Downward axial movement of the movable mounting insert 1420 is limited by the upper surface of the cover 1440, which is press fit into the expansion slot 1423. As the threaded fastener 1270 is tightened, the mounting insert 1420 is pulled upwardly and bears against the inwardly extending ledge 1423a of the expansion slot 1423. The mounting insert 1420 is thus held stationary within the expansion slot 1423 by the drawing action of the threaded fastener 1270. When both fasteners 1270, 1272 are fully tightened, the blade housing mounting section 1402 (and, thus, the blade—blade housing combination 1500) is firmly secured to the arcuate arms 1260, 1262 of the frame body 1250.

The mounting section 1402 further includes a gearing recess 1424 that extends radially between the inner and outer walls 1404, 1406. The gearing recess 1424 includes an upper clearance recess 1426 that does not extend all the way to the inner wall and a wider lower opening 1428 that extends between and through the inner and outer walls 1404, 1406. The upper clearance recess 1426 provides clearance for the pinion gear 1610 and an axially oriented first bevel gear 1652 of the double drive gear 1650. The lower opening 1428 is sized to receive the radially extending second spur gear 1654 of the double drive gear 1650 and thereby provide for the interface or meshing of the second spur gear 1654 and the driven gear 1340 of the rotary knife blade 1300 to rotate the knife blade 1300 with respect to the blade housing 1400.

Advantageously, the blade housing 1400 and, specifically, the blade housing mounting section 1402 includes the blade housing diameter adjustment mechanism 1480 of the present disclosure to allow the operator to quickly and precisely expand and contract the blade housing diameter for the purpose of removing one rotary knife blade and replacing it with another rotary knife blade and to allow the operator to precisely and quickly adjust the blade housing diameter to provide for proper operating or running clearance for the blade—blade housing bearing interface structure 1550. When a new rotary knife blade 1300 is installed in the blade housing 1400, using the blade housing diameter mechanism 1480 and the coacting hand tool 495 (previously described), the diameter of the split blade housing 1400 may be precisely adjusted by the operator such that an appropriate amount of operating or running clearance is provided between the rotary knife blade annular bearing race 1322 and the blade housing bearing bead 1462 such that the blade 1300 rotates relatively freely within the blade housing 1400, but without undue looseness with could result in undesirable blade vibration.

The blade housing diameter adjustment mechanism 1480 includes a circumferentially extending, arcuate gear section 1482 defining a portion of the outer wall 1406 of the mounting section 1402. The arcuate gear section 1482 is disposed on the same side of the blade housing split 1401a as the expansion slot 1423 and the movable mounting insert 1420. The arcuate gear section 1482 comprises a set of radially outwardly extending spur gear teeth 1484 extending outwardly from the outer wall 1406 and extend radially outwardly with respect to the blade housing center line CBH (FIGS. 43-44 and 46). Viewed axially, and as best seen in FIGS. 43-45, each tooth 1485 of the set of spur gear teeth 1484 includes two or a pair of converging gear tooth faces or walls 1485a. Each of the gear tooth faces or walls 1485a of each tooth 1485 of the set of gear teeth 1484 is straight and extends in an axial direction that is substantially parallel to the blade housing center line CBH, which is coincident with the blade central axis of rotation R, in the assembled blade—blade housing combination 1500.

To expand the diameter of the blade housing 1400 using the hand tool 495, the operator must first sufficiently loosen the threaded fastener 1270 which passes through the arcuate arm 1260 of the frame body 1250 and threads into a threaded opening 1420a of the sliding mounting insert 1420. After loosening the threaded fastener 1270, the operator then positions the hand tool 495 such that the shaft 487 of the hand tool 495 is axially aligned with an axial throughbore 1265 (FIG. 33) of the arcuate arm 1260 of the frame body 1250. The operator moves the hand tool 495 axially downward so that the spur gear head 497 of the hand tool shaft 497 moves downwardly to engage and mesh with the arcuate gear section 1482 of the mounting section 1402. The operator then appropriately rotates the handle 496 clockwise or counterclockwise to expand or contract the blade housing diameter, as desired. Rotation of the handle 496 of the hand tool 495 causes rotation of the spur gear head 497 and corresponding arcuate movement of the arcuate gear section 1482 of the blade housing 1400 along an outer circumference defined by the outer wall 1406 of the blade housing mounting section. Depending on a direction of rotation of the handle 496, the blade housing diameter is quickly and precisely expanded or contracted.

Figure 36:
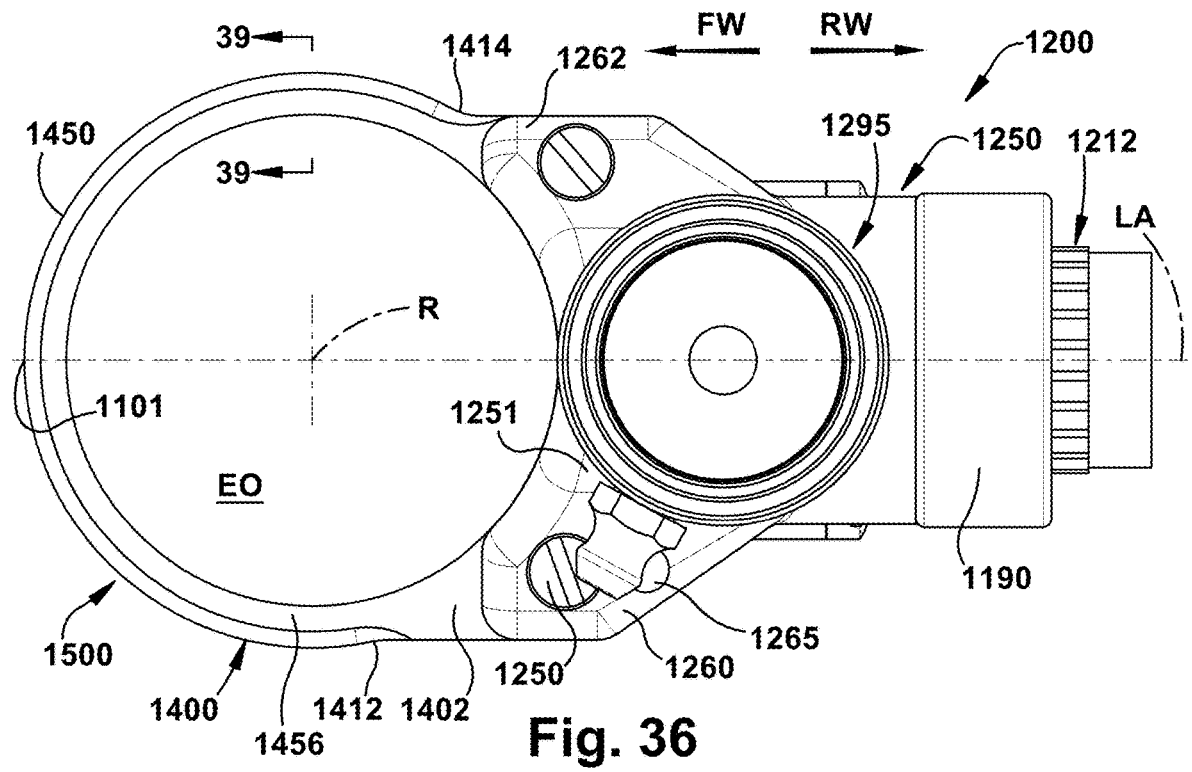
FIG. 36 is a is a schematic top plan view of the head assembly of FIG. 32.
Figure 37:
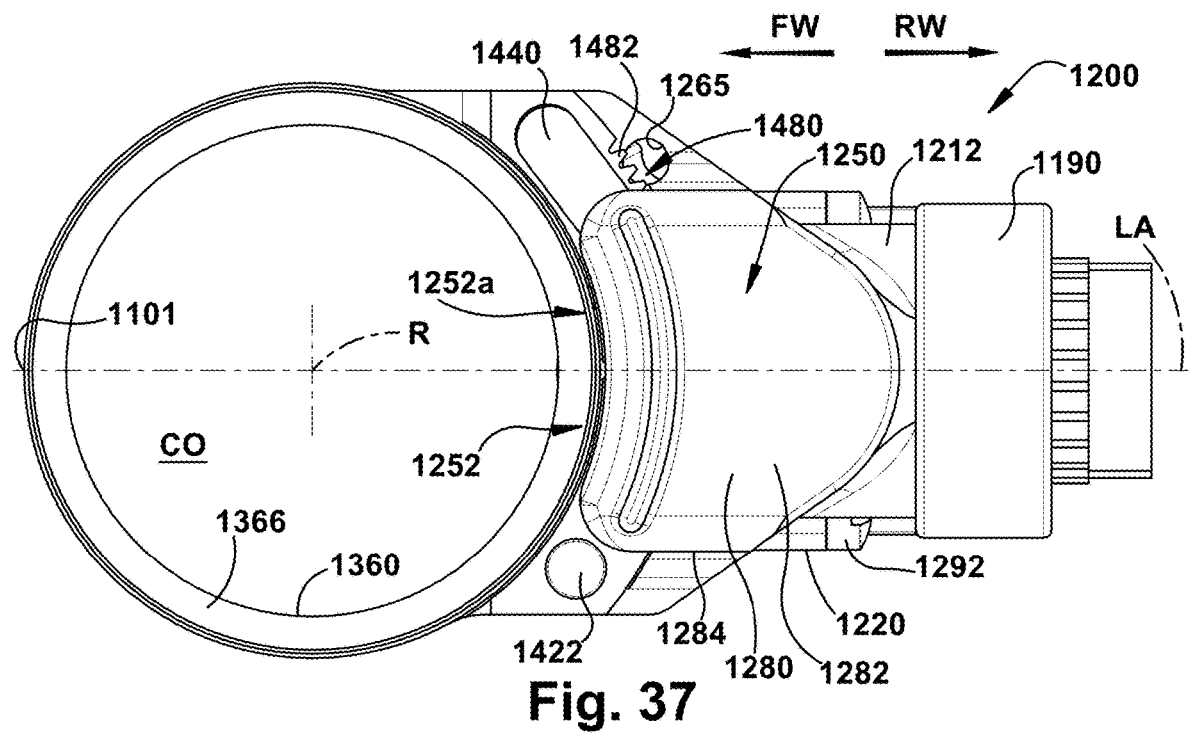
FIG. 37 is a schematic bottom plan view of the head assembly of FIG. 32.
Figure 38:
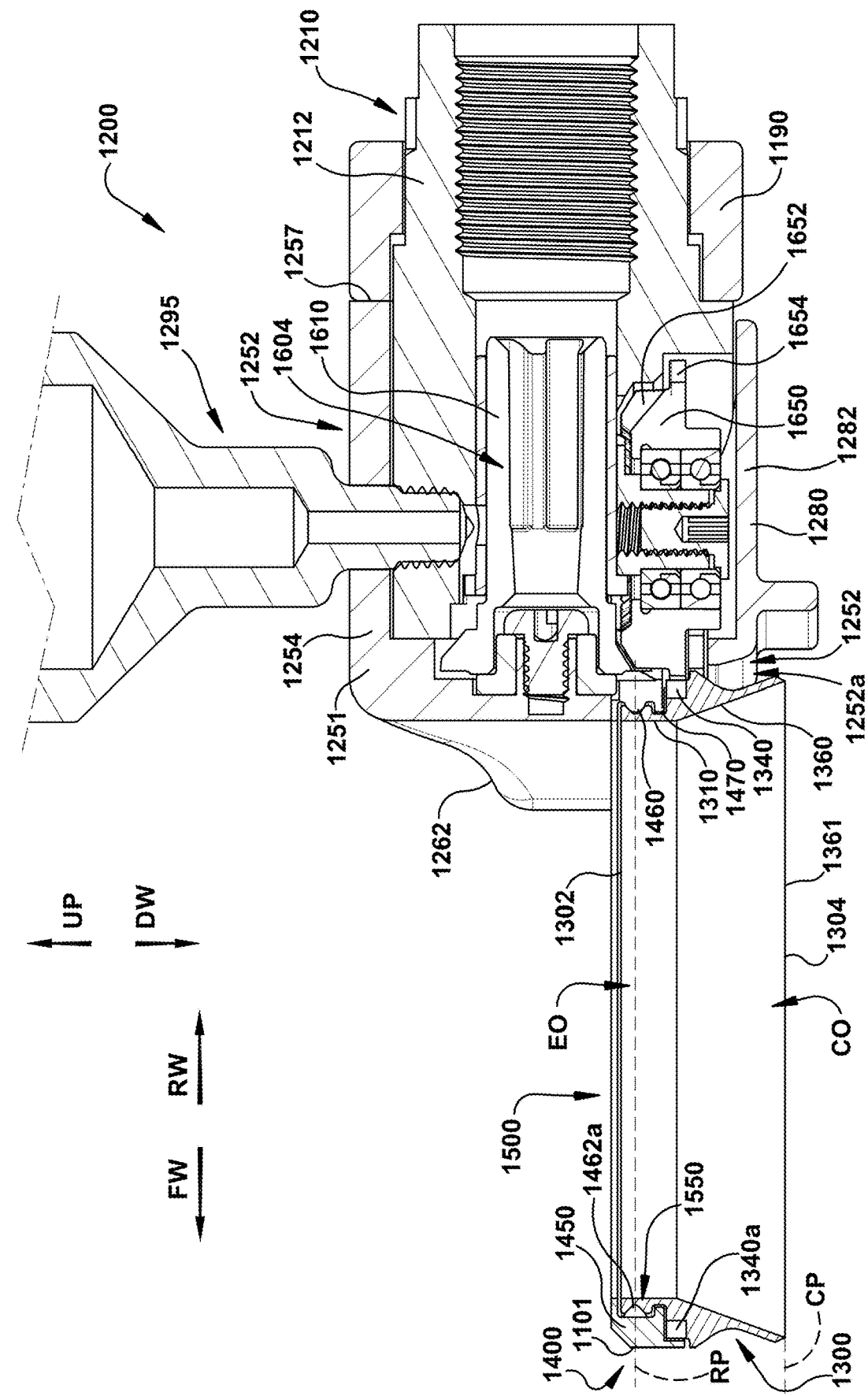
FIG. 38 is a schematic vertical, longitudinal section view of the head assembly of FIG. 32 taken along a longitudinal axis of the power operated rotary knife of FIG. 29.

Advantageously, because of the radially outwardly arcuate gear section 1482 defines a spur gear, the insertion of the hand tool 495 is from above the blade housing 1400. This orientation and position of the hand tool 495 with respect to the handle assembly 1110 and the blade housing 1400 allows the operator to easily and securely grasp the handle assembly 1110 of the power operated rotary knife 1000 with one hand, while positioning and rotating the hand tool 495 to adjust the blade housing diameter with the other hand. Additionally, the operator, looking down on the power operated rotary knife 1000 from what is essentially a top plan view (FIG. 36) has a clear view of the changing of the blade housing diameter, as the operator rotates the handle 496 of the hand tool 495 from above the power operated rotary knife 1000.

In one exemplary embodiment, the arcuate gear section 1482 is formed in the outer wall 1406 of the mounting section and the set of spur gear teeth 1484 extend axially through from the upper end 1408 to the lower end 1410 of the mounting section 1402.

Figure 47:
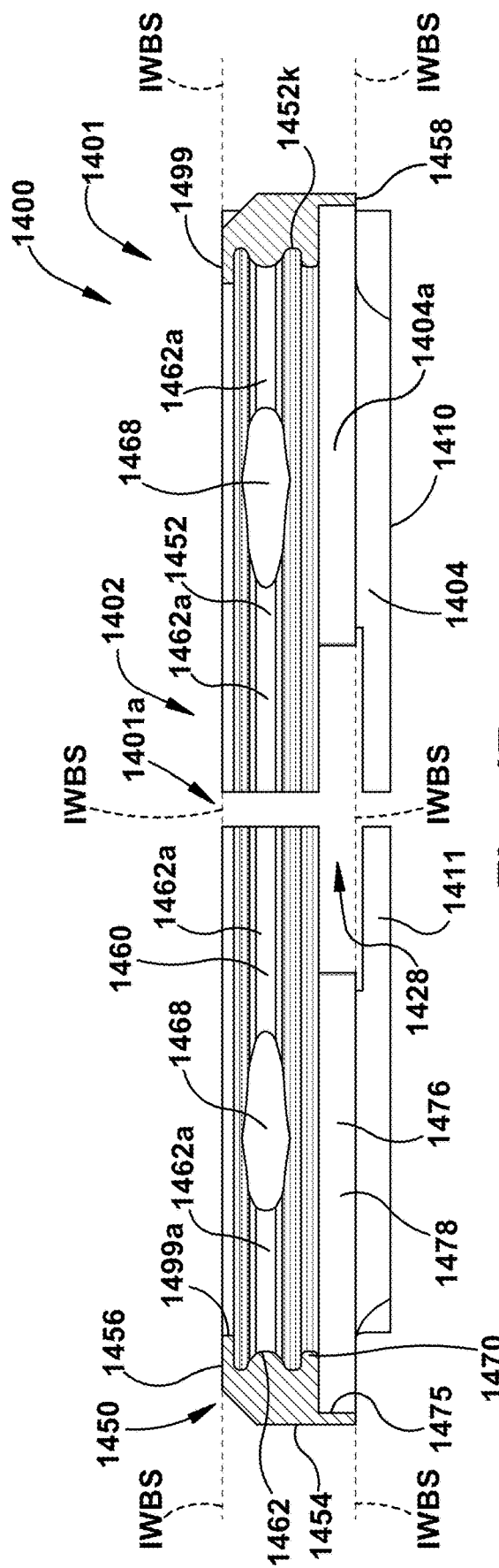
FIG. 47 is a schematic vertical section view of the annular blade housing of FIG. 43 as seen from a plane indicated by the line 47-47 in FIG. 43.

As can best be seen in FIGS. 39, 45 and 47-48, the blade support section 1450 includes the annular inner wall 1452 and the radially spaced apart annular outer wall 1454. The blade support section 1450 also includes a generally planar first upper end 1456 and an axially spaced generally planar second lower end 1458. The blade support section 1450 extends about the entire 360° circumference of the blade housing 1400. The blade support section 1450 in a region of the mounting section 1402 is continuous with and forms a portion of the inner wall 1404 of the mounting section 1402. As can be seen in FIG. 47, a portion 1404a of the inner wall 1404 of the mounting section 1402 of the blade housing 1400 within the horizontally extending dashed lines IWBS constitutes both a part of the inner wall 1404 of the mounting section 1402 and a part of the of the inner wall 1452 of the blade support section 1450. The dashed lines IWBS substantially correspond to an axial extent of the inner wall 1452 of the blade support section 1450, that is, the lines IWBS correspond to the upper end 1456 and the lower end 1458 of the blade support section 1450. That is, the inner wall 1404 of the mounting section 1402 is coincident with the inner wall 1452 of the blade support section 1450.

Figure 48:
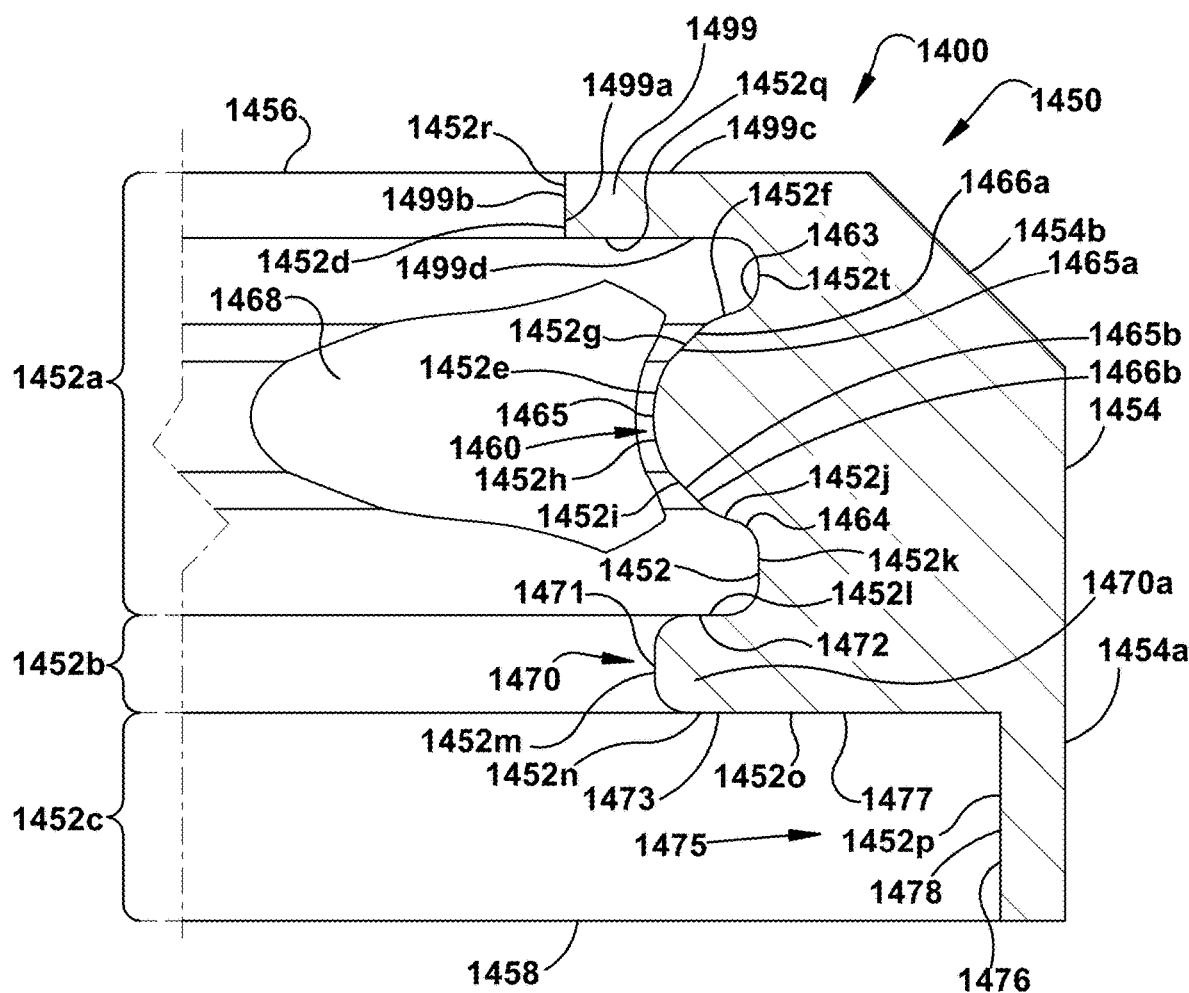
FIG. 48 is a schematic enlarged section view of a portion of the annular blade housing of FIG. 43 that is within a dashed circle labeled FIG. 48 in FIG. 47.

As can be seen in FIG. 48, the inner wall 1452 of the blade support section 1450 includes an upper portion 1452a, a middle portion 1452b, and a lower portion 1452c extending between the first upper end 1456 and the second lower end 1458 of the blade support section 1450 of the blade housing 1400. The upper portion 1452a of the inner wall 1452 of the blade support section 1450 extends downwardly from the first upper end 1456 of the blade support section 1450 and includes a radially extending projection or cap 1499 extending inwardly from the inner wall 1452 and defining a portion of the upper end 1456 of the blade support section 1450. As can be seen in FIG. 39, the cap 1499 covers or axially overlies the upper end 1312 of the body 1310 of the rotary knife blade 1300. In one exemplary embodiment, a radial inner surface 1499a defined by a vertical wall 1499b of the cap 1499 extends radially inwardly to be substantially axially aligned with the inner wall 1316 at the upper end 1312 of the body 1310. The cap 1499 is bounded or formed by an upper ledge 1499c, defined by the upper end 1456 of the blade support section 1450, the vertical wall 1499b, defined by a portion of the inner wall 1452 of the blade support section 1450, and a lower ledge 1499d, also defined by a portion of the inner wall 1452 of the blade support section 1450. The position and configuration of the radially inwardly cap 1499 and its proximity to the upper end 1312 of the rotary blade body 1310 advantageously forms a labyrinth seal to inhibit flow of debris into the blade—blade housing bearing structure 1550 from the upper end 1302 of the rotary knife blade 1300 or the upper end 1456 of the blade support section 1450 of the blade housing 1400.

As can best be seen in FIG. 48, also within the upper portion 1452a of the inner wall 1452 of the blade support section 1450 and spaced axially from and below the cap 1499 is an arcuate, inwardly protruding section 1452e. The arcuate, inwardly protruding section 1452e defines the blade housing bearing region 1460, specifically, the radially inwardly extending, annular blade housing bearing bead 1462. The blade housing bearing bead 1462 defines the bearing region 1460 of the blade housing 1400 and is part of the blade—blade housing bearing structure 1550. The annular bearing bead 1462 is not continuous around the entire 360° of the blade support section 1450. Rather, as can best be seen in FIGS. 45 and 47, the bead 1462 comprises arcuate bead sections 1462a interrupted by recessed regions or sections 1468 of the bead 1462. The recessed sections 1468 of the bead 1462 facilitate the draining/exiting of pieces of fat, pieces of meat and/or bone, and/or other cutting debris which may become trapped and build up in the blade—blade housing bearing interface region 1520 during operation of the knife 1000. In one exemplary embodiment, the bearing bead 1462 includes five bead sections or projections 1462a and five recessed sections 1468. It has been found that, for the small diameter rotary knife blade 1300, this specific combination and spacing of bead sections 1462a and recessed sections 1468 is suitable for stability and reduced vibration of the rotary knife blade 1300 within the blade housing 1400 and for facilitating the draining/exiting of cutting debris from the blade—blade housing bearing interface region 1520.

The annular bearing bead 1462 and specifically, the beading bearing bead sections 1462a, when viewed in section, are generally semicircular and each defines an arcuate radially inward facing surface 1465. The inward facing surface 1465 of each bearing bead section 1462a includes three arcuate sections 1452f, 1452h, 1452j, interrupted by a pair of upper and lower angled sections 1452g, 1452i. The arcuate sections 1452f, 1452h, 1452j share a common radius of curvature and center point. The upper and lower angled sections 1452g, 1452i define the upper and lower flats 1465a, 1465b, respectively, of the bearing bead 1460. The upper and lower flats 1465a, 1465b of the bearing bead 1462 define the upper and lower bearing faces 1466a, 1466b. The upper and lower bearing faces 1466a, 1466b of the bearing bead 1462 bear against the mating upper and lower bearing surface 1326, 1327 of the bearing race 1322 of the rotary knife blade 1300 to support the blade 1300 for rotation about its central axis of rotation R. Stated another way, the upper and lower flats 1465a, 1465b of the bearing bead 1462 bear against coacting upper and lower bearing faces 1329a, 1329b of the blade bearing race 1322 to support the blade 300 for rotation about the blade central axis of rotation R. As can best be seen in FIG. 48, the upper bearing face 1466a converges in a direction proceeding toward the lower bearing face 1466b and, similarly, the lower bearing face 1466b converges in a direction proceeding toward the upper bearing face 1466a.

Viewing the blade housing bearing bead 1460 in two dimensions, an upper end 1463 of the bearing bead 1462 is axially spaced from the projection or cap 1499 by a short vertical section 1452t of the inner wall 1452 of the blade support section 1450. A lower end 1464 of the bearing beard 1462 is spaced from the radially inwardly protruding annular land 1470 by another short vertical section 1452k of the inner wall of the blade support section 1450.

The second or middle portion 1452b of the blade housing inner wall 1452 defines the annular land 1470 which forms a horizontally extending projection 1470a that extends radially in a direction toward the blade housing center line CBH. The annular land 1470 is sized to be received in the annular channel 1350 of the body 1310 of the rotary knife blade 1300, as explained above. The annular land 1470 includes horizontally extending section 452l of the inner wall 1452 which defines an upper ledge 1472 of the annular land 1470, a vertical section 1452m of the inner wall 1452 which defines a radial surface 1471 of the annular land 1470, and a horizontally extending section 1452n which defines a lower ledge 1473 of the annular land 1470. As mentioned previously, the interfit of the blade housing annular land 1470 into the rotary knife blade annular channel 1350 define a labyrinth seal for mitigating the egress of debris from the rotary knife blade driven gear region 1340a into the blade—blade housing bearing structure 1550 and mitigating the egress of debris from the blade—blade housing bearing structure 1550 into the rotary knife blade driven gear region 1340a. In one exemplary embodiment and as best seen in FIG. 48, the innermost radial surface 1471 of the annular land 1470 is radially inwardly, that is, is closer to the blade housing center line CBH than any portion of the blade housing bearing bead 1462. That is, a radial distance between the radial surface 1471 of the annular land 1470 and the blade housing center line CBH is less than a radial distance between any portion of the bearing bead 1462 and the blade housing center line CBH. Additionally, the radially inner surface 1499a of the cap 1499 is radially inwardly, that is, is closer to the blade housing center line CBH than the innermost radial surface 1471 of the annular land. That is, a radial distance between the radial surface 1471 of the annular land 1470 and the blade housing center line CBH is greater than a radial distance between the radially inner surface 1499a of the cap 1499 and the blade housing center line CBH.

The horizontally extending section 1452n defines a boundary between the middle portion 1452b and the lower portion 1452c of the inner wall 1452 of the blade support section 1450 of the blade housing 1400. The lower portion 1452c of the blade housing 1400 includes a radially inwardly recessed stepped shoulder 1475, which receives the driven gear 1340 of the rotary knife blade 1300. The stepped shoulder 1475 is defined by the horizontally extending section 1452o of the inner wall 1452 of the blade support section 1450 that continues the horizontal surface defined by the horizontally extension section 1452n (which defined the lower ledge 1473 of the annular land 1470). The stepped shoulder 1475 is further defined by a vertical section 1452p defining a vertical wall 1478 of the shoulder 1475. The vertical wall 1478 defines a radial surface 1476 of the stepped shoulder 1475. In one exemplary embodiment and as best seen in FIG. 48, the radial surface 1471 of the annular land 1470 is radially inwardly, that is, is closer to the blade housing center line CBH than any portion of the blade housing bearing bead 1462. Additionally, the radial surface 1476 of the stepped shoulder 1475 is recessed radially with respect to the radial inner surface 1471 of the annular land 1470. That is, a radial distance between the radial inner surface 1471 of the annular land 1470 and the blade housing center line CBH is less than a radial distance between the radial surface 1476 of the shoulder 1475 and the blade housing center line CBH. As can best be seen in FIG. 39, the inner and outer walls 1452, 1454 of the blade support section 1450 extends axially downwardly such that the lower end 1458 of the blade support section 1450 is in close proximity to the annular boss 1348 formed on the outer wall 1318 of the body 1310 of the rotary knife blade 1300. Moreover, to provide a smooth, continuous outer wall for the blade—blade housing combination 1500, the outer wall 1454 of the blade support section 1450 is positioned in axial alignment with the outer wall 1318 of the rotary knife blade body 1310 in the region of the annular boss 1348.

The outer wall 1454 of the blade support section 1450 of the blade housing 400 includes a vertical, cylindrical portion 1454a extending vertically upwardly from the lower end 1458 of the blade support section 1450. Near the upper end 1456 of the blade support section 1450, the outer wall 1454 transitions into an inwardly angled, frustoconical portion 1454b. The blade—blade housing combination 1500 is configured and contoured to be as smooth and continuous as practical. As a layer of material is cut or trimmed from a product being processed (for example, a layer of tissue or a layer of meat or fat trimmed from an animal carcass) by moving the power operated rotary knife 1000 in a cutting direction such that the rotating knife blade 1300 and blade housing 1400 move along and through the product to cut or trim the layer of material. As the power operated rotary knife 1000 is moved by the operator, the blade edge 1361 cuts the layer forming a cut portion of the layer. The cut portion moves along a cut or trimmed material path of travel through the cutting opening CO of the blade—blade housing combination 1500 as the power operated rotary knife 1000 advances through the product.

A new outer surface layer is formed as the layer is cut away from the product. The cut portion of the layer slides along the inner walls 1366, 1316 of the blade section 1360 and body 1310 of rotary knife blade 1300, while new outer surface layer slides along the respective outer walls 1368, 1454 of the blade section 1360 of the knife blade 1300 and the blade support section 1450 of the blade housing 1400. As can be seen in FIG. 39, a smooth transition between the blade section outer wall 1368 of the knife blade 1300 and the blade support section outer wall 1454 of the blade housing 1400 is provided by the close proximity and axial alignment of the outer wall 1454 of the blade support section 1450 with the outer wall 1318 of the rotary knife blade body 1310 in the region of the annular boss 1348. The blade—blade housing combination 1500 in the cutting region is shaped to extent possible to reduce drag and friction experienced by the operator when manipulating the power operated rotary knife 1000 in performing cutting or trimming operations.

Alternate Blade—Blade Housing Combination 2500

Figure 49:
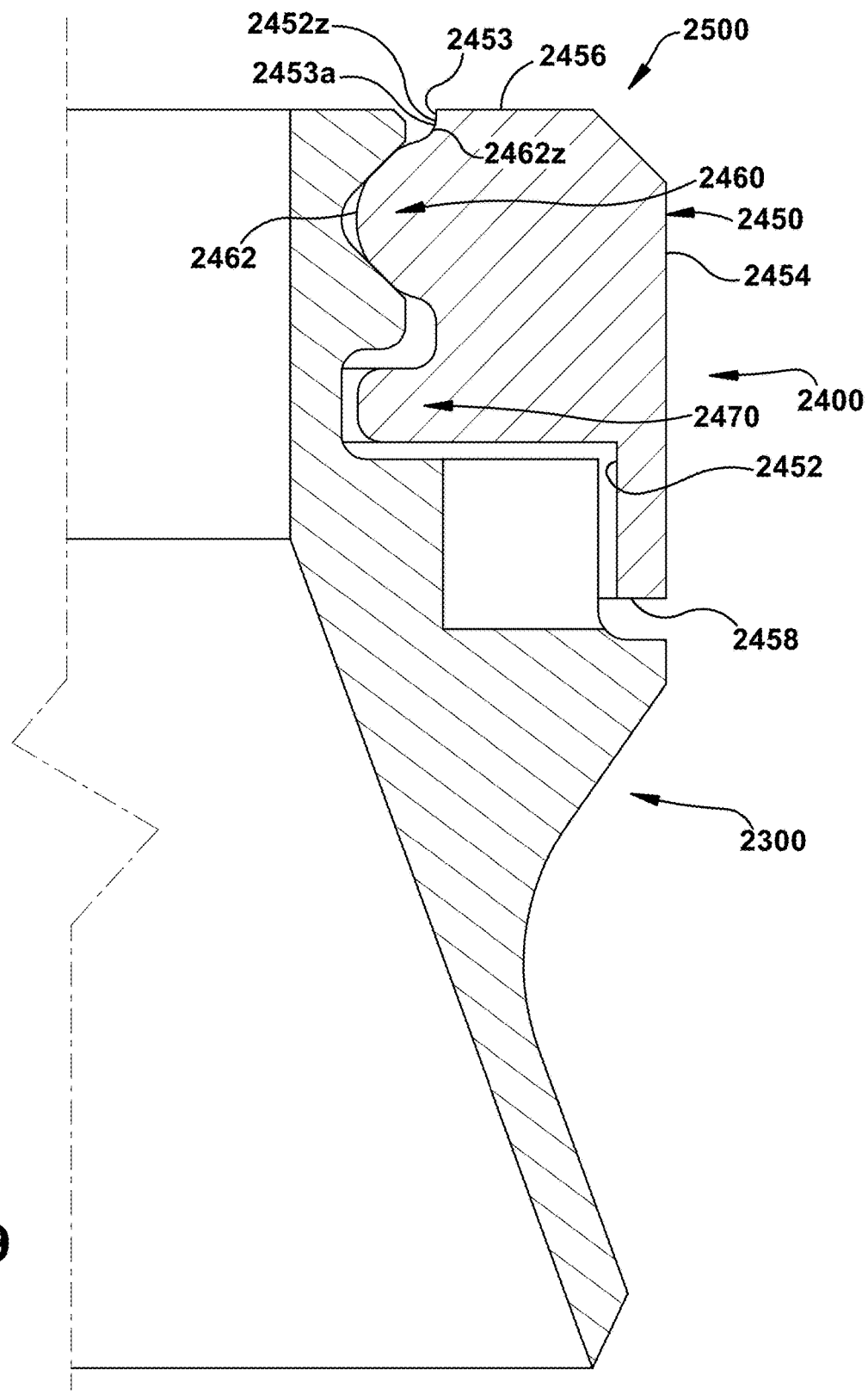
FIG. 49 is a schematic vertical section view of an alternate exemplary embodiment of an assembled combination of an annular rotary knife blade and an annular blade housing suitable for use in the power operated rotary knife of FIG. 29.

A schematic section view of an alternate assembled blade—blade housing combination 2500 suitable for use in the power operated rotary knife 1000 of the second exemplary embodiment is shown in FIG. 49. In this assembled combination 2500, an annular rotary knife blade 2300 is substantially similar to the annular rotary knife blade 1300, described above. In the interest of reducing the overall axial height of the assembled combination 2500, the radial projection or cap 1499 of the blade support section 1450 of the blade housing 1400 which extended from the inner wall 1452 and formed a portion of the first upper end 1456 of the blade housing blade support section 1450 has been eliminated.

The blade housing 2400 includes a blade support section 2450 which extends axially between a first upper end 2456 and a second lower end 2458 and includes an inner wall 2452 and a radially spaced apart outer wall 2454. Like the blade support section 1450 of the blade housing 1400, the blade support section 2450 includes a blade housing bearing region 2460 extending radially inwardly from the inner wall 2452, like the blade housing bearing region 1460 of the blade support section 1450 of the blade housing 1400. Like the blade support section 1450 of the blade housing 1400, the blade support section 2450 further includes an annular land 2470, like the annular land 1470 of the blade housing 1400, extending radially inwardly from the inner wall 2452 and disposed axially below and axially spaced from the blade housing bearing region 2460. As can be seen in FIG. 49, an upper region 2452z of the inner wall 2452 extends axially above a radially inwardly extending blade housing bearing region 2460, similar to the blade housing bearing region 1460 of the blade housing 1400. The upper region 2452z comprises a short substantially vertical portion 2453 of the inner wall 2452. The short substantially vertical portion 2453 extends from an upper end 2462z of a bearing bead 2462 of the bearing region 2460 to the first upper end 2456 of the blade support section 2450. Viewed in three dimensions, the short generally vertical portion 2453 forms a generally cylinder or cylindrical surface 2453a and defines an axially uppermost portion of the inner wall 2452 of the blade support section 2450 of the blade housing 2400.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible.

Accordingly, the present disclosure/invention is intended to embrace all such alterations, modifications, and variations that fall within the spirit and scope of the appended claims.

What is claimed is:

1. An annular rotary knife blade for rotation about a central axis of rotation in a power operated rotary knife, the rotary knife blade comprising:

a body and a blade section extending axially from the body, the body including an upper end and a lower end spaced axially apart and an inner wall and an outer wall spaced radially apart, the outer wall of the body including an upper portion adjacent the upper end of the body, a lower portion adjacent a lower end of the body, and a middle portion disposed between the upper and lower ends of the body, the body and the blade section being radially centered about the central axis of rotation;

the blade section extending from the lower end of the body;

the upper portion of the outer wall of the body including an annular bearing race, the middle portion of the outer wall of the body including an annular channel axially below the annular bearing race, and the lower portion of the outer wall of the body including an annular driven gear axially below the annular channel;

a section of the upper portion of the outer wall of the body extending axially above and axially below the annular bearing race including a cylindrical section, the annular bearing race extending radially into the cylindrical section of the upper portion of the outer wall of the body, an upper end of the annular bearing race terminating at the cylindrical section of the upper portion of the outer wall and a lower end of the annular bearing race terminating at the cylindrical section of the upper portion of the outer wall, the annular bearing race including a first bearing surface and an axially spaced apart second bearing surface, the first bearing surface and the second bearing surface converging radially inwardly toward a central surface bridging the first and second bearing surfaces, the central surface defining a radially innermost region of the annular bearing race;

the annular driven gear including set of gear teeth formed in the outer wall of the body for rotatably driving the annular rotary knife blade about the central axis of rotation, the annular driven gear including an inner surface and a radially spaced apart outer surface, the inner surface defining a radially innermost region of the annular drive gear and the outer surface defining a radially outermost region of the annular driven gear, the inner surface of the annular driven gear being radially outward of the central surface of the annular bearing race; and the annular channel including a radially inner surface, the radially inner surface of the annular channel being radially inward of the first end and the second end of the annular bearing race.

2. The annular rotary knife blade of claim 1 wherein an upper end of the annular bearing race is axially spaced from the upper end of the body.

3. The annular rotary knife blade of claim 1 wherein the annular channel is substantially rectangular in cross section.

4. The annular rotary knife blade of claim 1 wherein a radial distance between the central axis of rotation and the radially inner surface of the annular channel is substantially equal to a radial distance between the central axis of rotation and the central surface of the annular bearing race.

5. The annular rotary knife blade of claim 1 wherein a radial distance between the central axis of rotation and the radially inner surface of the annular channel is less than a radial distance between the central axis of rotation and the central surface of the annular bearing race.

6. The annular rotary knife blade of claim 1 wherein a radial distance between the central axis of rotation and the radially inner surface of the annular channel is less than a radial distance between the central axis of rotation and the inner surface of the annular driven gear.

7. The annular rotary knife blade of claim 1 wherein a radial distance between the central axis of rotation and the upper end of the annular bearing race is substantially equal to a radial distance between the central axis of rotation and the lower end of the annular bearing race.

8. The annular rotary knife blade of claim 1 wherein the lower portion of the outer wall of the body further includes a boss having a radially outer surface defining a radially outermost portion of the outer wall of the body, the outer surface of the annular driven gear being radially inward of the radially outer surface of the boss.

9. An annular rotary knife blade for rotation about a central axis of rotation in a power operated rotary knife, the rotary knife blade comprising:
- a body and a blade section extending axially from the body, the body including an upper end and a lower end spaced axially apart and an inner wall and an outer wall spaced radially apart, the outer wall of the body including an upper portion adjacent the upper end of the body, a lower portion adjacent a lower end of the body, and a middle portion disposed between the upper and lower ends of the body, the body and the blade section being radially centered about the central axis of rotation;
- the blade section extending from the body;
- the upper portion of the outer wall of the body including an annular bearing race, the middle portion of the outer wall of the body including an annular channel axially below the annular bearing race, and the lower portion of the outer wall of the body including an annular driven gear;
- the annular bearing race extending radially into the upper portion of the outer wall of the body and including a first bearing surface and a second bearing surface, the first bearing surface and the second bearing surface converging radially inwardly toward a central surface bridging the first and second bearing surfaces, the central surface defining a radially innermost region of the annular bearing race; and
- the annular driven gear including set of gear teeth formed in the outer wall of the body for rotatably driving the annular rotary knife blade about the central axis of rotation, the annular driven gear including an inner surface and a radially spaced apart outer surface, the inner surface defining a radially innermost region of the annular drive gear and the outer surface defining a radially outermost region of the annular driven gear, the inner surface of the annular driven gear being radially outward of the central surface of the annular bearing race.

10. The annular rotary knife blade of claim 9 wherein the annular channel includes a radially inner surface, the radially inner surface of the annular channel being radially inward of the first end and the second end of the annular bearing race and being radially inward of the inner surface of the annular driven gear.

11. The annular rotary knife blade of claim 9 wherein a section of the upper portion of the outer wall of the body extending axially above and axially below the annular bearing race includes a cylindrical section, the annular bearing race extending radially into the cylindrical section and an upper end of the annular bearing race is axially spaced from the upper end of the body.

12. The annular rotary knife blade of claim 9 wherein the annular channel is substantially rectangular in cross section and includes a radially inner surface and a radial distance between the central axis of rotation and the radially inner surface of the annular channel is substantially equal to a radial distance between the central axis of rotation and the central surface of the annular bearing race.

13. The annular rotary knife blade of claim 9 wherein the annular channel includes a radially inner surface and a radial distance between the central axis of rotation and the radially inner surface of the annular channel is less than a radial distance between the central axis of rotation and the central surface of the annular bearing race.

14. The annular rotary knife blade of claim 9 wherein the annular channel includes a radially inner surface and a radial distance between the central axis of rotation and the radially inner surface of the annular channel is less than a radial distance between the central axis of rotation and the inner surface of the annular driven gear.

15. The annular rotary knife blade of claim 9 wherein the lower portion of the outer wall of the body further includes a boss having a radially outer surface defining a radially outermost portion of the outer wall of the body, the outer surface of the annular driven gear being radially inward of the radially outer surface of the boss.

16. An annular rotary knife blade for rotation about a central axis of rotation in a power operated rotary knife, the rotary knife blade comprising:
- a body and a blade section extending axially from the body, the body including an upper end and a lower end spaced axially apart and an inner wall and an outer wall spaced radially apart, the outer wall of the body including an upper portion adjacent the upper end of the body, a lower portion adjacent a lower end of the body, and a middle portion disposed between the upper and lower ends of the body, the body and the blade section being radially centered about the central axis of rotation;
- the blade section extending from the body;
- the upper portion of the outer wall of the body including an annular bearing race, the middle portion of the outer wall of the body including an annular channel axially below the annular bearing race, and the lower portion of the outer wall of the body including an annular driven gear axially below the annular channel;
- the annular bearing race extending radially into the upper portion of the outer wall of the body and including a first bearing surface and a second bearing surface, the first bearing surface and the second bearing surface bridged by a central surface including a radially innermost region of the annular bearing race; and
- the annular driven gear including set of gear teeth formed in the outer wall of the body for rotatably driving the annular rotary knife blade about the central axis of rotation, the annular driven gear including an inner surface and a radially spaced apart outer surface, the inner surface defining a radially innermost region of the annular drive gear and the outer surface defining a radially outermost region of the annular driven gear, the inner surface of the annular driven gear being radially outward of the radially innermost region of the annular bearing race.

17. The annular rotary knife blade of claim 16 wherein the annular channel includes a radially inner surface, the radially inner surface of the annular channel being radially inward of the first end and the second end of the annular bearing race and being radially inward of the inner surface of the annular driven gear.

18. The annular rotary knife blade of claim 16 wherein a section of the upper portion of the outer wall of the body extending axially above and axially below the annular bearing race includes a cylindrical section, the annular bearing race extending radially into the cylindrical section and an upper end of the annular bearing race is axially spaced from the upper end of the body.

19. The annular rotary knife blade of claim 16 wherein the annular channel is substantially rectangular in cross section and includes a radially inner surface and a radial distance between the central axis of rotation and the radially inner surface of the annular channel is substantially equal to a radial distance between the central axis of rotation and the of the radially innermost region of the annular bearing race.

20. The annular rotary knife blade of claim 16 wherein the annular channel includes a radially inner surface and a radial distance between the central axis of rotation and the radially inner surface of the annular channel is less than a radial distance between the central axis of rotation and the radially innermost region of the annular bearing race.

* * * * *